US008274724B2

(12) United States Patent
Borchers et al.

(10) Patent No.: US 8,274,724 B2
(45) Date of Patent: Sep. 25, 2012

(54) OPTICAL BEAM CONTROL BASED ON FLEXURE ACTUATION WITH POSITIONING SENSING AND SERVO CONTROL

(75) Inventors: Bruce Borchers, Scotts Valley, CA (US); Robert Stark, Saratoga, CA (US)

(73) Assignee: Prysm, Inc., San Jose, CA (US)

( * ) Notice: Subject to any disclaimer, the term of this patent is extended or adjusted under 35 U.S.C. 154(b) by 0 days.

(21) Appl. No.: 13/243,731

(22) Filed: Sep. 23, 2011

(65) Prior Publication Data

US 2012/0194891 A1 Aug. 2, 2012

(51) Int. Cl.
*G02B 26/08* (2006.01)

(52) U.S. Cl. ............... 359/224.1; 359/199.3; 359/200.7

(58) Field of Classification Search .... 359/198.1–199.4, 359/200.6–200.8, 221.2, 224.1–224.2
See application file for complete search history.

(56) References Cited

U.S. PATENT DOCUMENTS

2003/0077026 A1* 4/2003 Huang et al. .................... 385/18
2007/0086048 A1* 4/2007 Steinert et al. ............... 358/1.15

\* cited by examiner

*Primary Examiner* — James Phan
(74) *Attorney, Agent, or Firm* — Perkins Coie LLP

(57) ABSTRACT

Implementations of actuators that use flexures to provide support to actuators and pivoting mechanisms to the actuators. Such actuators can be electromagnetically activated actuators that include a magnet stator and a coil rotor mounted on a flexure. A positioning sensor, such as a capacitor sensor, is provided to measure and monitor positioning of the actuator and is coupled to a feedback circuit which uses the measured positioning of the actuator to control the actuator.

16 Claims, 32 Drawing Sheets

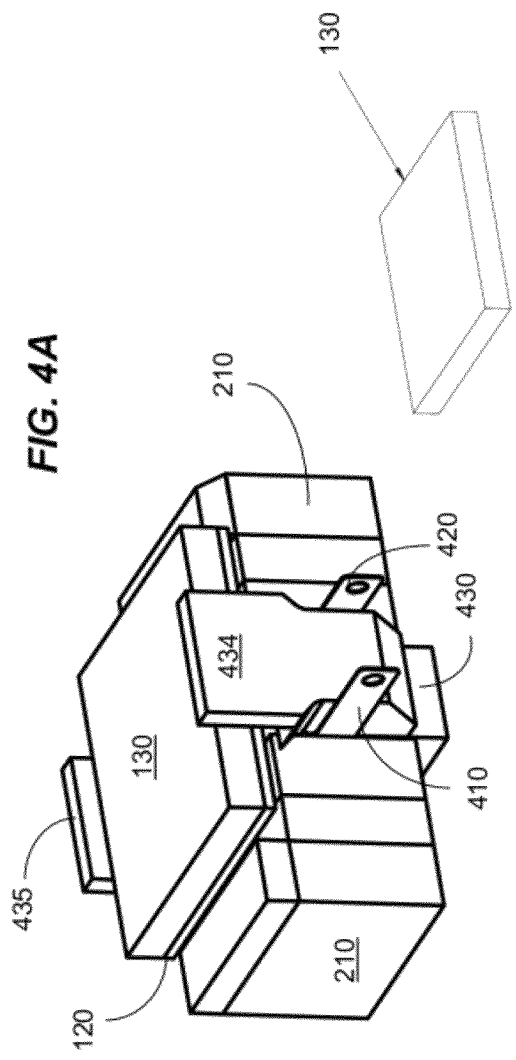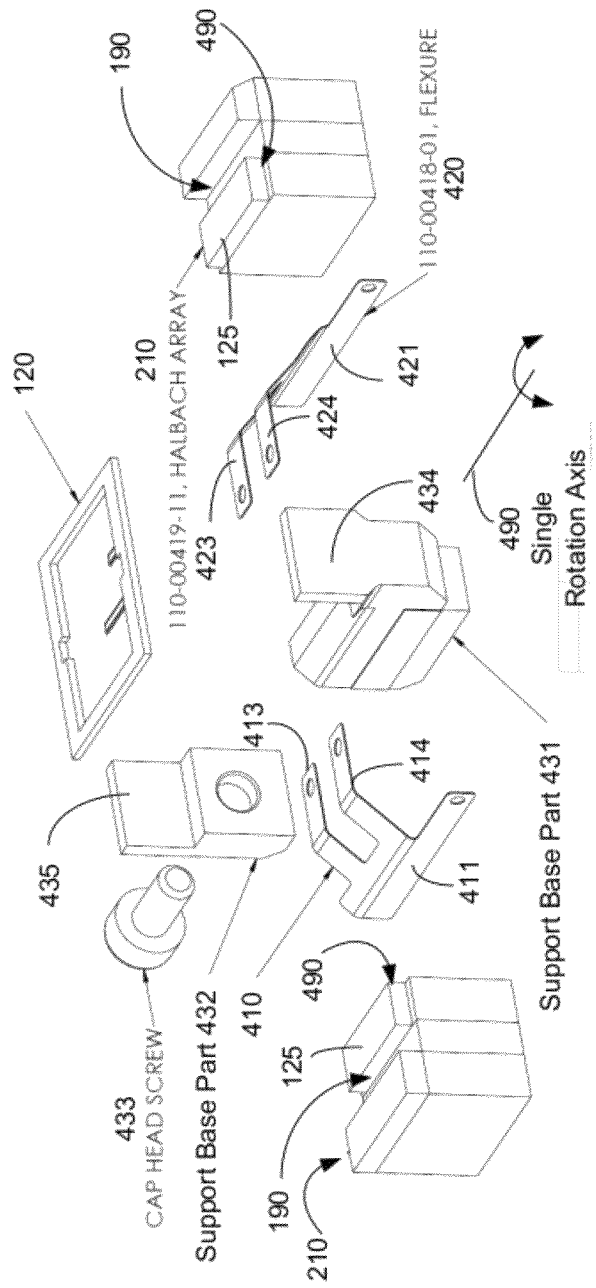

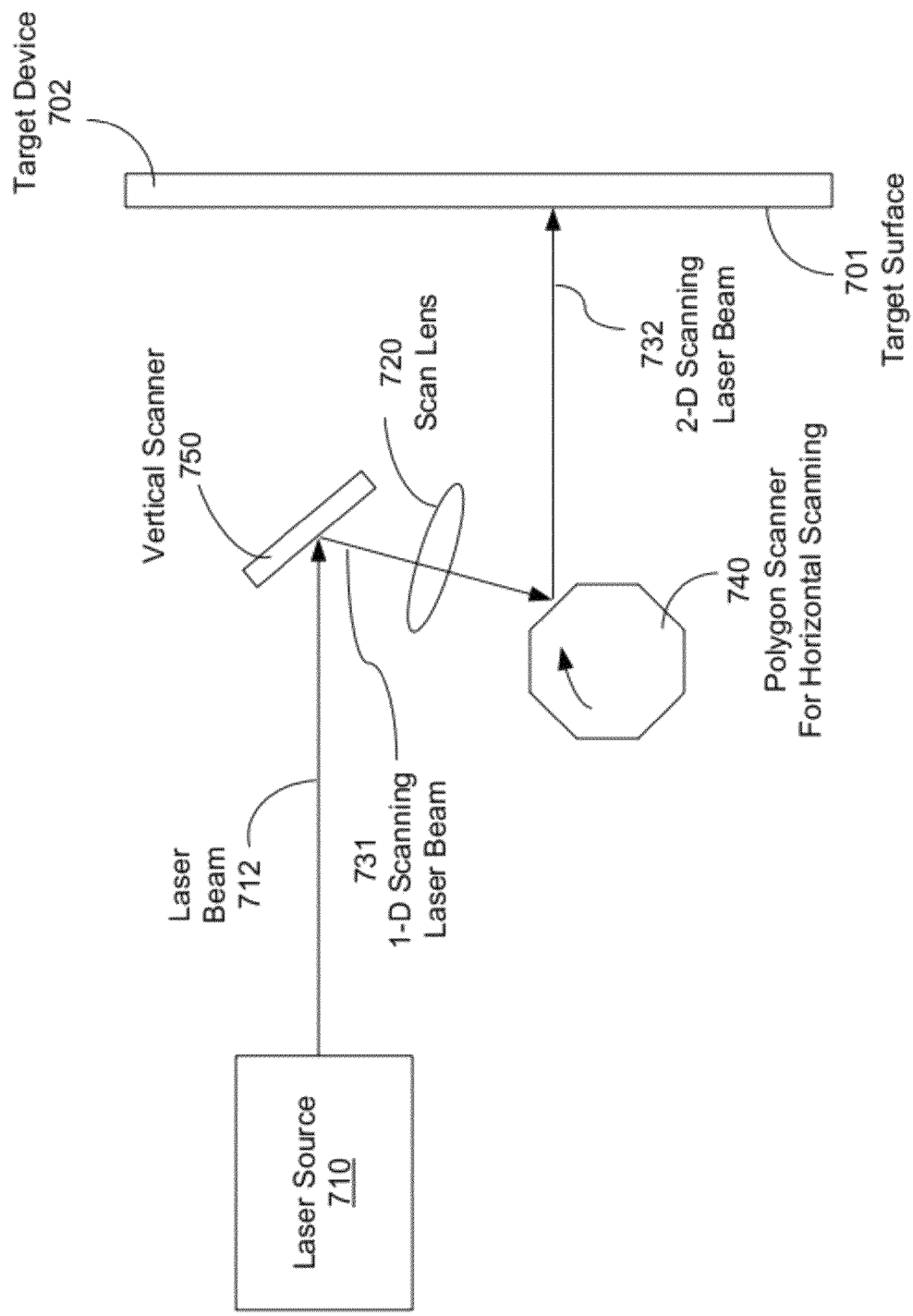

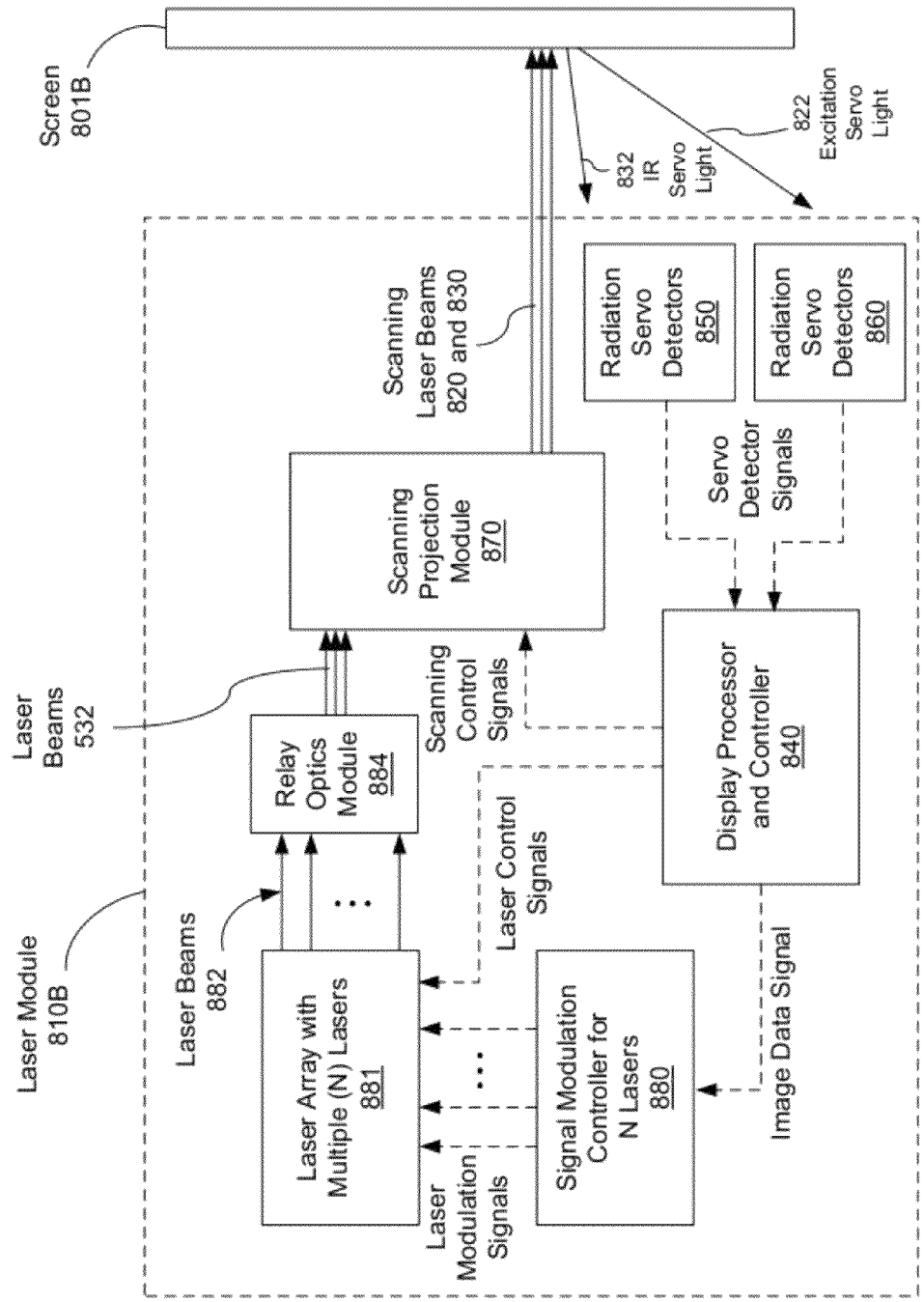

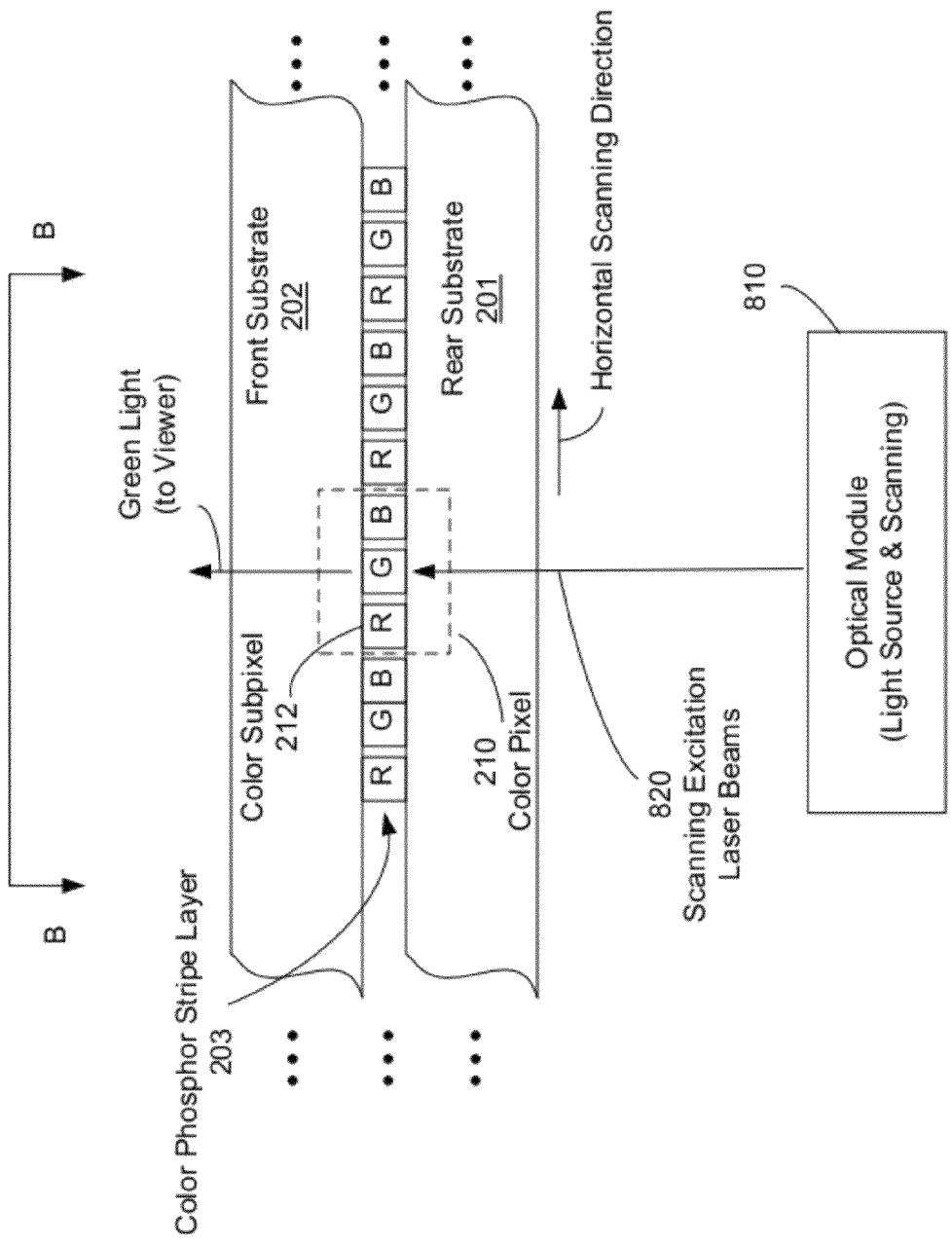

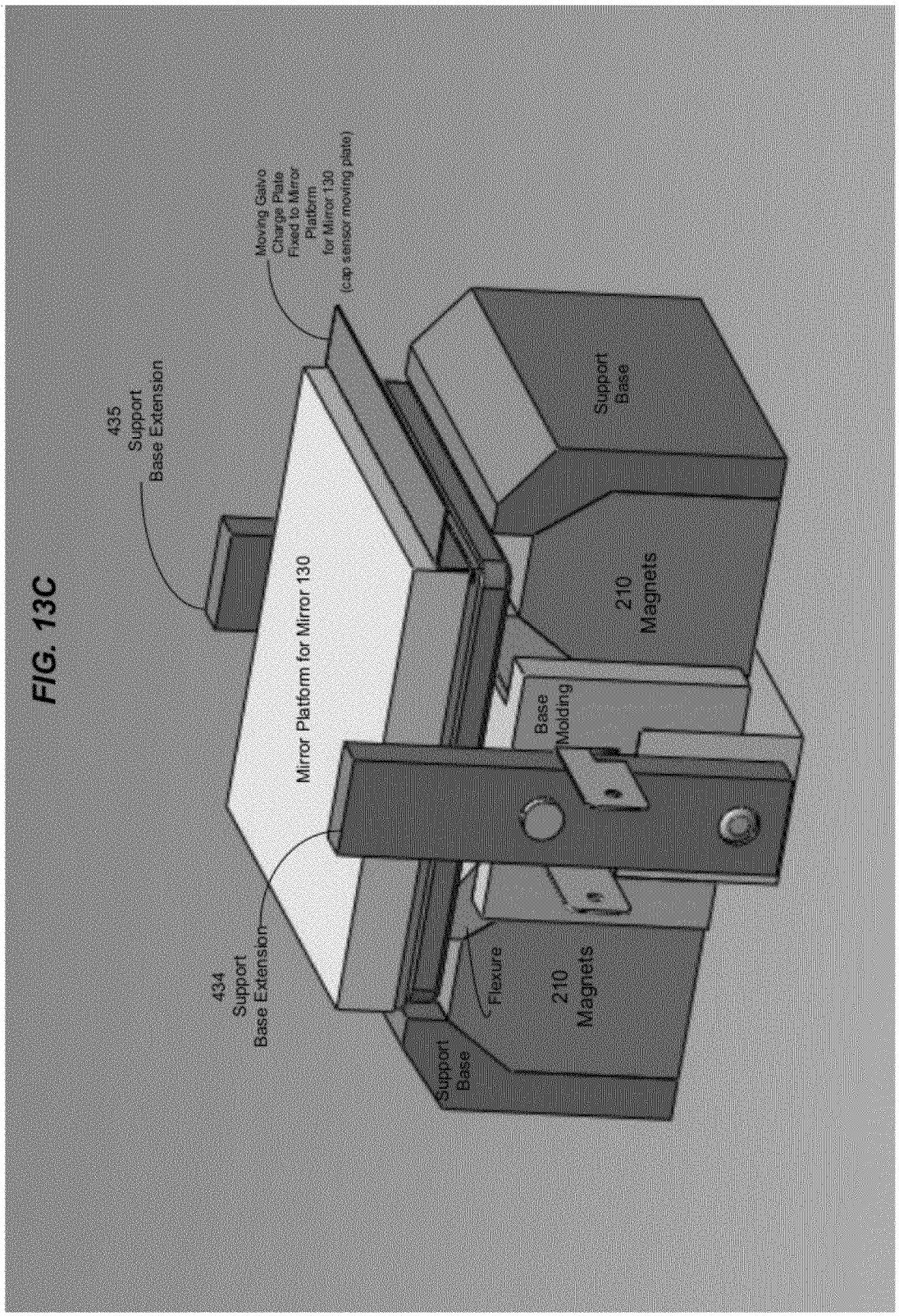

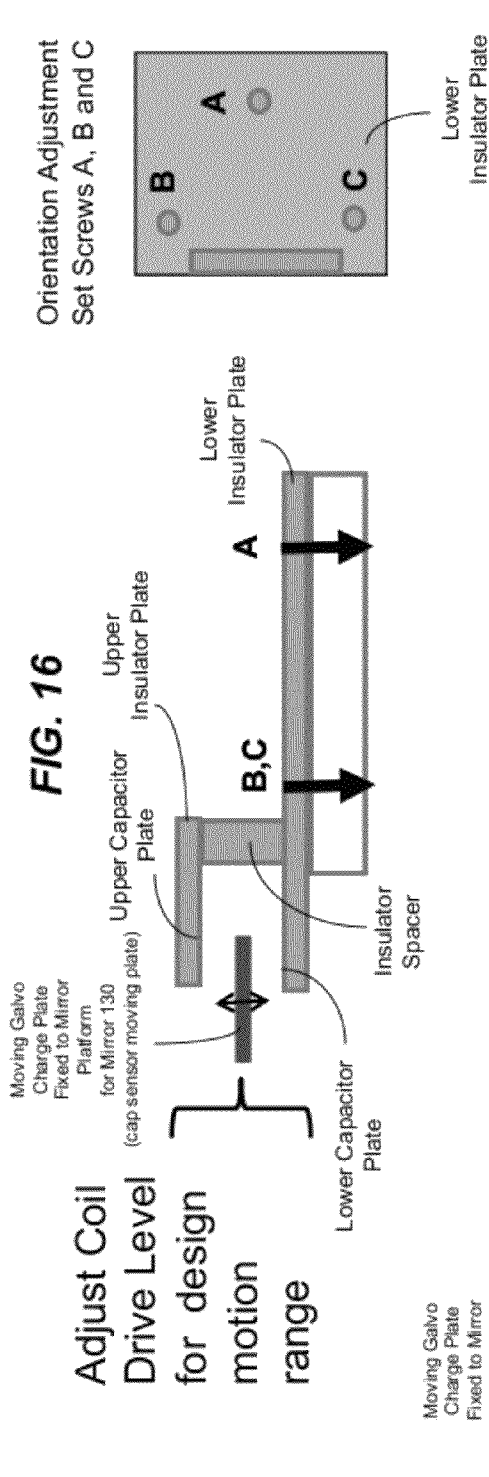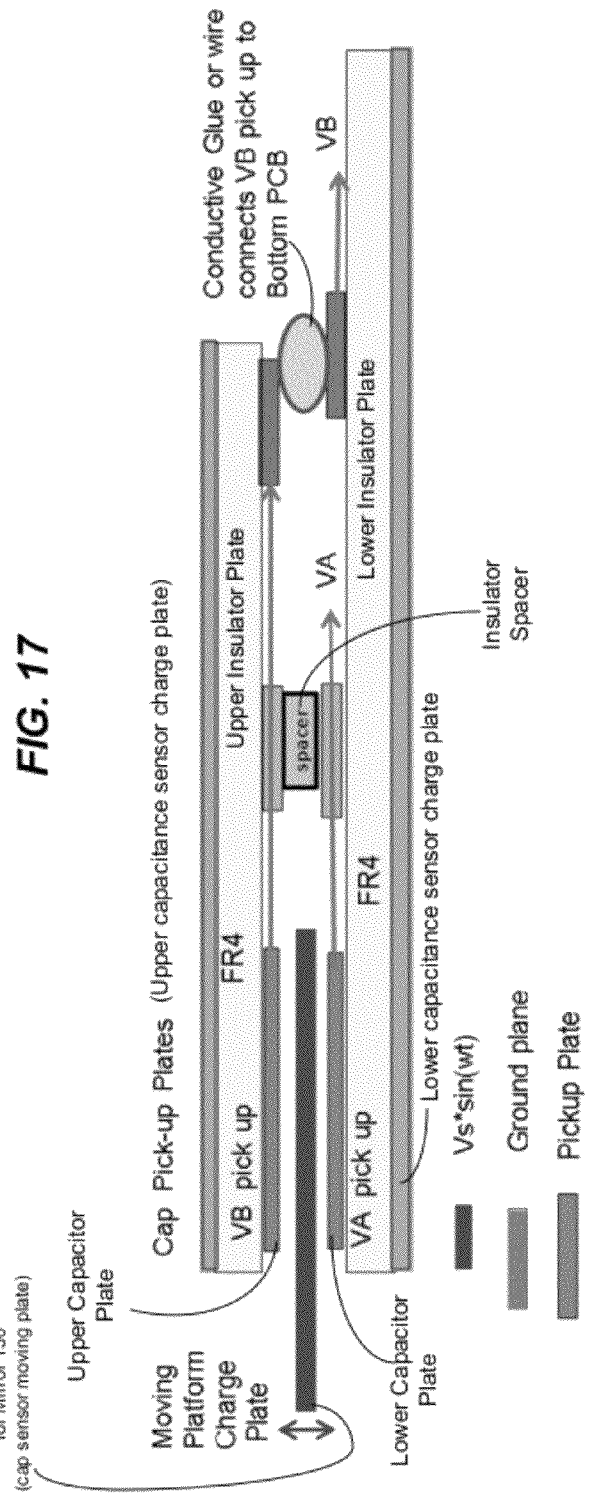
FIG. 16
FIG. 17

FIG. 23A
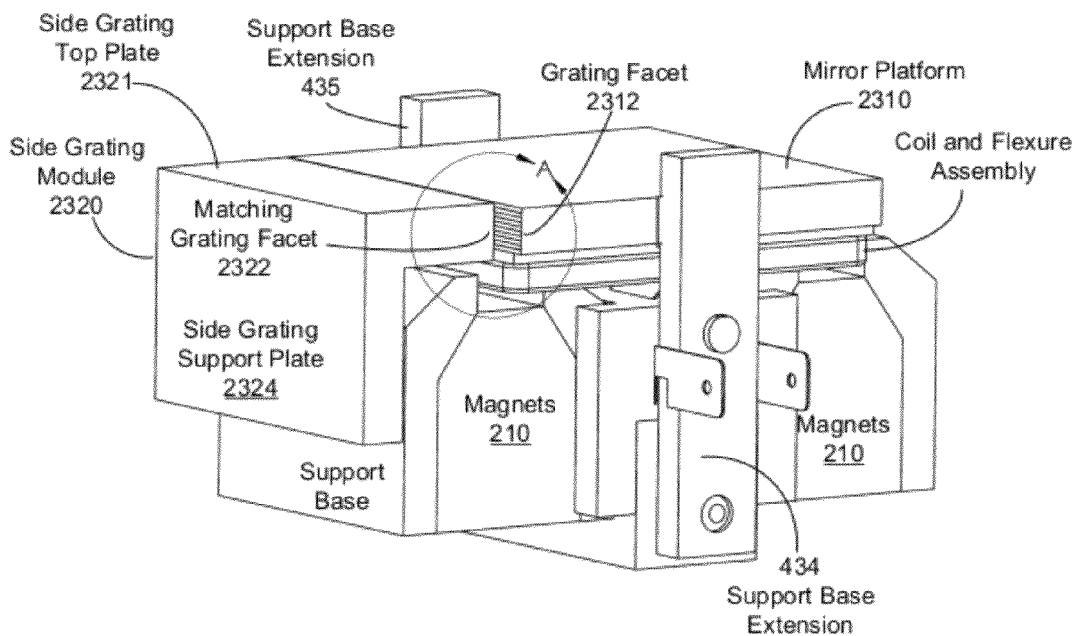
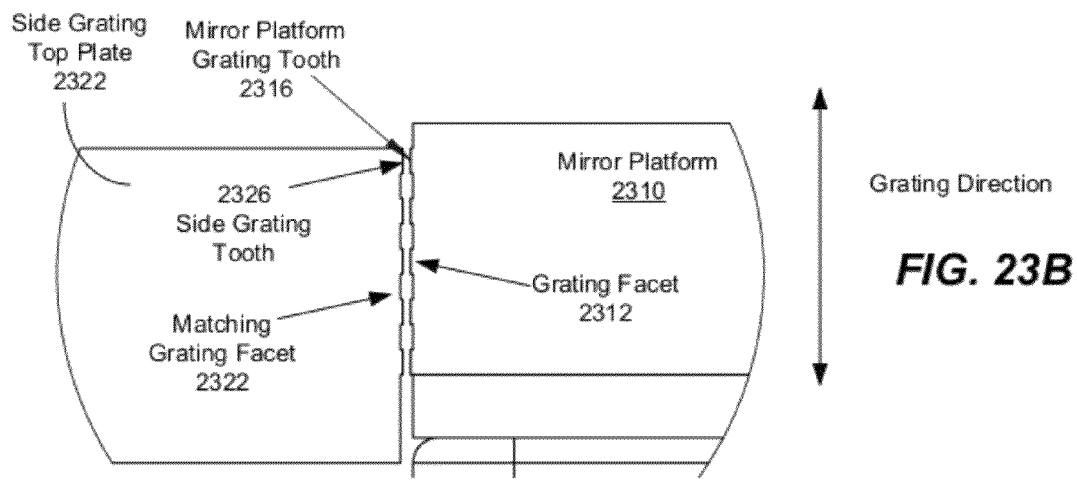
FIG. 23B
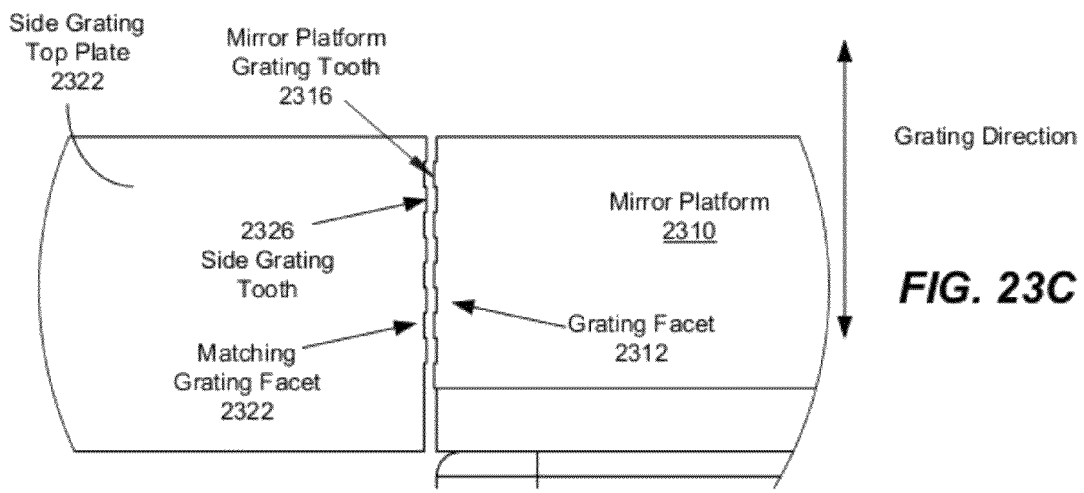
FIG. 23C

OPTICAL BEAM CONTROL BASED ON FLEXURE ACTUATION WITH POSITIONING SENSING AND SERVO CONTROL

PRIORITY CLAIM AND RELATED PATENT APPLICATION

This patent document claims the priority of U.S. Provisional Application No. 61/437,578 entitled "OPTICAL BEAM CONTROL BASED ON FLEXURE ACTUATION WITH POSITIONING SENSING AND SERVO CONTROL" and filed Jan. 28, 2011 by Bruce Borchers and Robert Stark, which is incorporated by reference as part of the disclosure of this document.

BACKGROUND

This patent document relates to actuators and applications of such actuators, including uses of such actuators in optical beam steering and scanning devices and systems.

An actuator is a device that can be activated by energy to cause motion or movement of a component attached or coupled to the actuator. Electromagnetically activated actuators can be configured to use a current-carrying coil in a magnetic field to electromagnetically cause rotation of the coil by controlling the direction and amplitude of the current in the coil. Bearing based galvonometers are examples of such electromagnetically activated actuators with coils.

SUMMARY

This document provides exemplary implementations of actuators that use flexures to provide support to the actuators and pivoting mechanisms to the actuators. Such actuators can be electromagnetically activated actuators that include a magnet stator and a coil rotor mounted on a flexure. The flexure can be designed, in some implementations, to eliminate the need for support bearings that tend to suffer from mechanical wear or fatigue after repetitive uses, to provide repeatable positioning operations with reduced mechanical wear and fatigue. The flexure, and to achieve a high positioning accuracy at a fast response speed. The power consumption of such flexure actuators can also be significantly reduced or minimized in some implementations. Examples of applications of such actuators in optical steering and scanning are provided.

For example, a flexure actuator device is provided to include a support base, a first flexure including a first flexure base that is fixed to the support base and first flexure extensions that flex with respect to the fixed first flexure base and the support base, and a second flexure including a second flexure base that is fixed to the support base and one or more second flexure extensions that flex with respect to the fixed second flexure base and the support base. The second flexure is positioned and oriented to have the first and second flexure extensions to cross. This device also includes an actuator engaged to distal ends of the first and second flexure extensions to rotate around a single rotation axis as the first and second flexure extensions deform when the actuator is actuated to rotate. The actuator may be, for example, a conductor coil engaged to distal ends of the first and second flexure extensions and to rotate around the single rotation axis when an electrical current in the conductor coil electromagnetically interacts with a magnetic field present at the conductor coil.

For another example, a method for operating a flexure actuator device to direct light is provided to include directing an input laser beam to a mirror engaged to a flexure actuator device. This device includes a support base, first and second flexures, and a conductor coil engaged to the mirror to rotate with the conductor coil. The first flexure includes a first flexure base that is fixed to the support base and first flexure extensions that flex with respect to the fixed first flexure base and the support base. The second flexure includes a second flexure base that is fixed to the support base and second flexure extensions that flex with respect to the fixed second flexure base and the support base. The conductor coil is engaged to distal ends of the first and second flexure extensions to rotate around a single rotation axis as the first and second flexure extensions deform when an electrical current in the conductor coil electromagnetically interacts with a magnetic field present at the conductor coil. In this method, the electrical current is controlled to be at different current values to set the mirror at respective different orientations to reflect the input laser beam along different directions set by the different orientations of the mirror.

For another example, a display device is provided to include a light source to produce one or more laser beams that are modulated to carry images to be displayed, and a beam scanning module that scans the one or more laser beams along two different directions on a screen surface to display the images and includes a first scanner to scan the one or more laser beams along a first direction and a second scanner to scant the one or more laser beams along a second, different direction. The first scanner includes a mirror and a flexure actuator device that engages the mirror to rotate the mirror for scanning the one or more laser beams along the first direction. The flexure actuator device includes a support base, first and second flexures, a conductor coil engaged to the mirror to rotate the mirror. The first flexure includes a first flexure base that is fixed to the support base and first flexure extensions that flex with respect to the fixed first flexure base and the support base. The second flexure includes a second flexure base that is fixed to the support base and second flexure extensions that flex with respect to the fixed second flexure base and the support base. The conductor coil is engaged to distal ends of the first and second flexure extensions to rotate around a single rotation axis as the first and second flexure extensions deform when an electrical current in the conductor coil electromagnetically interacts with a magnetic field present at the conductor coil.

For another example, an actuator device includes a conductor coil electrically connected to receive and carry an electrical current which electromagnetically interacts with a magnetic field present at the conductor coil to move the conductor coil, a coil support that is engaged to the conductor coil to confine movement of the conductor coil as a rotation around a rotation axis, a first Halbach magnet array of first permanent magnets located at a first side of the coil support to produce a first high magnetic flux density at a first side of the conductor coil, and a second Halbach magnet array of second permanent magnets located at a second, opposite side of the coil support to produce a second high magnetic flux density at a second side of the conductor coil. The first and second Halbach magnet arrays operate collectively to rotate the conductor coil around the rotation axis. The coil support may include, in one example, two flexures that are crossed with each other and are engaged to the conductor coil to confine the movement of the conductor coil to rotate around a location where the two flexures are crossed.

For another example, a method for operating an actuator is provided to include engaging an actuator to a support base by first and second flexures fixed to the support base. The first flexure includes a first flexure base that is fixed to the support base and first flexure extensions that flex with respect to the fixed first flexure base and the support base, and the second flexure includes a second flexure base that is fixed to the support base and one or more second flexure extensions that flex with respect to the fixed second flexure base and the support base. The second flexure is positioned and oriented to have the first and second flexure extensions to cross, and the actuator is engaged to distal ends of the first and second flexure extensions to rotate around a single rotation axis as the first and second flexure extensions deform when the actuator is actuated to rotate. This method also includes electrically coupling the actuator being to the first flexure extension to receive an electrical actuator drive signal through the first flexure extension to cause the actuator to rotate and to maintain at a position; providing a conductive sensing plate that is fixed in position relative to the actuator and to move with the actuator; providing a capacitor sensing device, that is fixed in position relative to the support base and includes two electrically conductive plates separated from each other to form a gap, to insert part of the conductive sensing plate into the gap; using a third flexure, that includes a third flexure base that is fixed to the support base and a third flexure extension connected to the third flexure base at one end and connected to the conductive sensing plate on the other end, to form an electrically conductive path that is electrically isolated from the first flexure and the electrical actuator drive signal therein; and applying an electrical sensor signal which is conducted to the conductive sensing plate. This method uses first and second electrical signals from the electrically conductive plates to produce a position signal indicating a relative position of the conductive sensing plate relative one of the electrically conductive plates, and operates a servo control circuit coupled to the position sensing circuit and the actuator to produce a servo control signal based on the position signal and to control the actuator based on the position signal.

For yet another example, an actuator device is provided to include a support base; a first flexure including a first flexure base that is fixed to the support base and first flexure extensions that flex with respect to the fixed first flexure base and the support base; and a second flexure including a second flexure base that is fixed to the support base and one or more second flexure extensions that flex with respect to the fixed second flexure base and the support base. The second flexure is positioned and oriented to have the first and second flexure extensions to cross. In this device, an actuator is engaged to distal ends of the first and second flexure extensions to rotate around a single rotation axis as the first and second flexure extensions deform when the actuator is actuated to rotate and the actuator is electrically coupled to the first flexure extension to receive an electrical actuator drive signal through the first flexure extension to cause the actuator to rotate and to maintain at a position. A platform is fixed to the actuator and to move with the actuator, and includes a first side grating facet that has electrically conductive first grating teeth that are electrically connected to one another. A side grating module is fixed to the support base and separated from the platform and the actuator so that platform and the actuator move relative to the side grating module. This side grating module includes a second side grating facet that has electrically conductive second grating teeth that are electrically connected to one another and positioned adjacent to the first grating teeth and separated from the first grating teeth by a gap. This device includes a position sensing circuit coupled to the first grating teeth and the second grating teeth to apply an electrical sensor signal and a servo control circuit coupled to the position sensing circuit and the actuator. The position sensing circuit includes a processing circuit that receives first and second electrical signals from the first and second grating teeth, respectively, and produces a position signal from the received first and second electrical signals indicating a relative position of the platform relative to the side grating module. The servo control circuit is operable to produce a servo control signal based on the position signal and operable to control the actuator based on the position signal.

These and other examples, implementations and applications of electromagnetically activated actuators based on flexures are described in detail in the drawings, the detailed description and the claims.

BRIEF DESCRIPTION OF THE DRAWINGS

FIGS. 4A and 4B show an implementation of the electromagnetically activated actuator in FIGS. 1 and 2.

FIGS. 7A, 7B and 7C show examples of scanning display systems using an electromagnetically activated actuator.

FIGS. 8A, 8B and 8C show examples of scanning laser display system having a light-emitting screen made of laser-excitable light-emitting materials with feedback from the screen for beam alignment feedback control.

FIGS. 9A, 9B, 10, 11A, 11B and 12 show examples of display systems and operations based on the system in FIGS. 8A and 8B.

FIGS. 13A through 22 show various implementations of capacitor position sensor based flexure actuator.

FIGS. 23A, 23B and 23C illustrate an example of a charged grating capacitor sensing design for measuring and controlling the positioning of the mirror platform supported by the flexure actuator.

DETAILED DESCRIPTION

Figure 1:
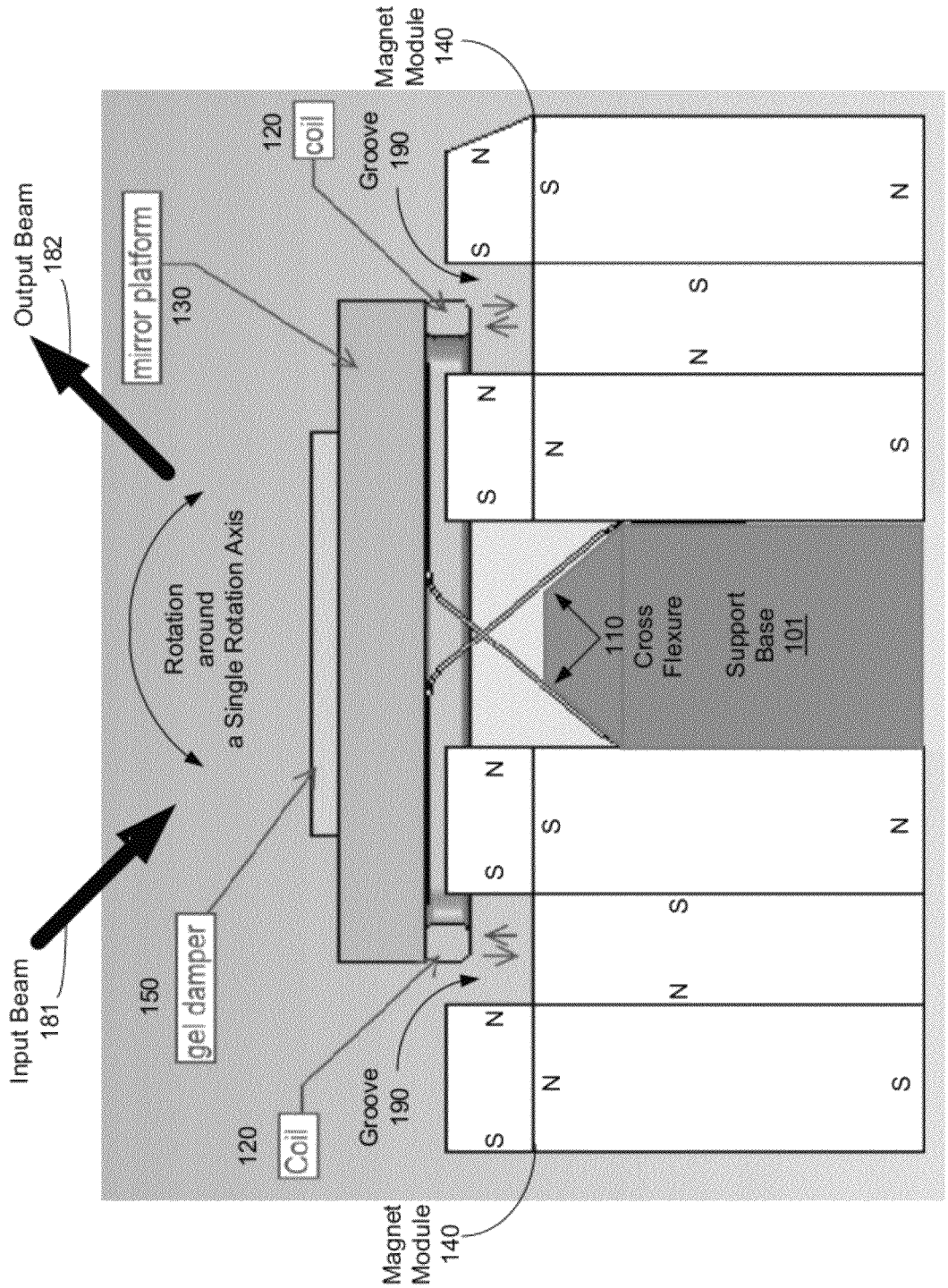
FIGS. 1 and 2 show two views of an example of an electromagnetically activated actuator with a magnet stator and a coil rotor mounted on a flexure.
Figure 2:
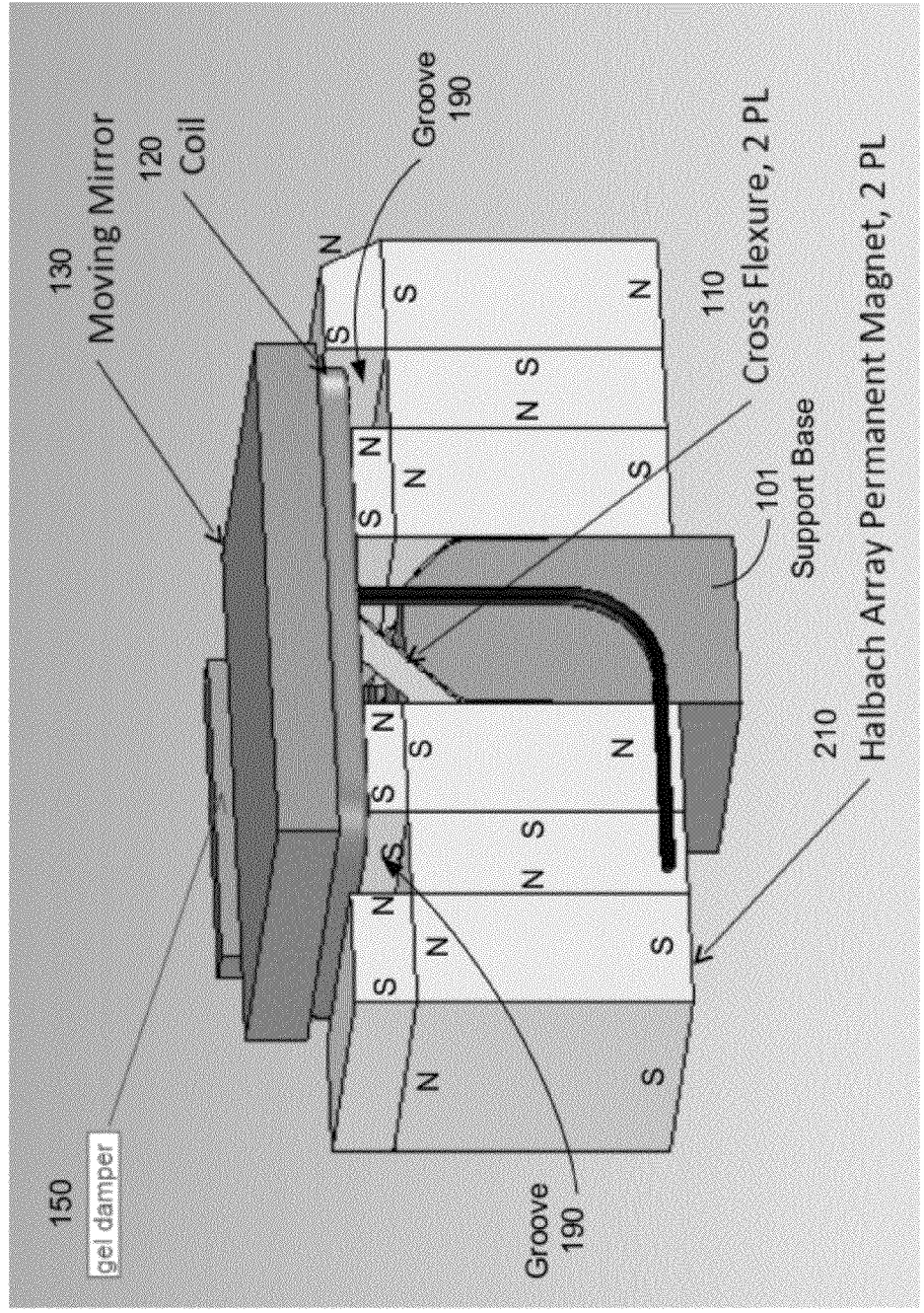

FIGS. 1 and 2 show two views of an example of an electromagnetically activated actuator device with a magnet stator and a coil rotor mounted on a flexure. The flexure is designed to provide support to the actuator and a pivoting mechanism to the actuator. The electromagnetically activated actuator based on a coil is an example of various actuator designs and other actuator designs can also be used with the present flexure design.

The illustrated actuator device includes a support base 101, a conductor coil 120 as a rotor, and a flexure 110 that connects to the coil 120 and the support base 101 to movably suspend the conductor coil 120 relative to the support base 101. A magnet module 140, which may include two Halbach magnet arrays, is fixed in position relative to the support base 101 to produce a magnetic field with a desired spatial field distribution pattern at the conductor coil 120 to electromagnetically cause the conductor coil 120 to rotate, in response to an electrical current that is supplied to the conductor coil 120, around a single rotation axis defined by the flexure 110 and the manner that the flexure 110 is engaged to the support base 101. The magnet module 140 has a groove 190 with magnetic materials as walls in which a side of the coil 120 is placed to be exposed to a high magnetic flux area inside the groove 190. In some implementations, the groove 190 is designed to be sufficiently large so that the side of the coil 120 in the groove 190 remains substantially inside the groove 190 at different orientations of the coil 120.

In this example, the support base 101 and the magnetic module 140 are separate components and are fixed in position relative to each other. In other implementations, the magnetic module 140 may be structured to produce the desired magnetic field at the coil 120 and to engage to the flexure 110 as a support base. The flexure 110 includes two different flexure parts in a cross configuration to provide the desired mechanical suspension of the conductor coil 120 and the desired constraint to the movement of the conductor coil 120 so that the conductor coil 120 rotates around the single rotation axis. In FIG. 1, the single rotation axis is perpendicular to the paper as marked by the arrowed line indicating the rotation. This flexure based design can be used to eliminate mechanical bearings, minimize rotational inertia, and can provide accurate positioning of the conductor coil 120 and a fast response speed.

Referring to FIG. 1, the magnet module 140 is designed to produce a dense magnetic flux density at the location of the conductor coil 120 and the electromagnetic interaction of the current flowing inside the conductor coil 120 and the magnetic field of the magnet module 140 causes the conductor coil 120 to rotate. The current is controlled to change its magnitude and thus to control the rotation and/or position of the conductor coil 120. The direction of the rotation of the conductor coil 120 is controlled by changing the direction of the current inside the conductor coil 120.

A control circuit is provided to supply and control the direction and magnitude of the current to the conductor coil 120. The control circuit can control the current to cause various modes of movement or motion at the conductor coil 120. The current can be set in various current variation patterns to cause various rotation patterns at the conductor coil 120: a continuous rotation over an angular range, a periodic back and forth oscillation within an angular range, discrete positions, and others. For example, such a flexure actuator can be used to control a mirror that is engaged to the conductor coil 120 for controlling an optical beam reflected by the mirror in some applications including the scanning beam systems described herein. In one mode of operation of such a scanning beam system, the flexure actuator can be controlled to set the mirror at two or more discrete orientations where each discrete orientation is controlled with a desired orientation accuracy. In operation, the control circuit sets a pre-set current at a given magnitude and direction to cause the conductor coil 120 to rotate to a particular angle and stay there until the current is changed. As described below, a positioning sensor can be provided to monitor the actual positioning of the conductor coil 120 and the current set at a particular magnitude can be adjusted based on the monitored positioning information in a feedback control configuration to ensure that the positioning or rotation angle of the conductor coil 120 is maintained at the desired angle within a permissible tolerance range.

In one implementation of the flexure actuator, the magnet module 140 can include two permanent magnet modules placed on two sides of the support base 101. As an example, multiple magnets may be used to form a Halbach array 210 in FIG. 2 for each of the two modules 140 to produce a sufficiently high or dense magnetic flux density at the coil 120. The two Halbach arrays 210 are structured to have opposite polarity in their magnetic fields. Therefore, with the current flowing in one direction inside the coil 120, one of the two magnet modules 210 has a magnetic attraction to the coil induced field while the other magnet module 210 is set to repel the coil induced field. The result is the teeter-totter effect to efficiently generate a force and a torque on the conductor coil 120 to move the conductor coil 120.

Figure 3:
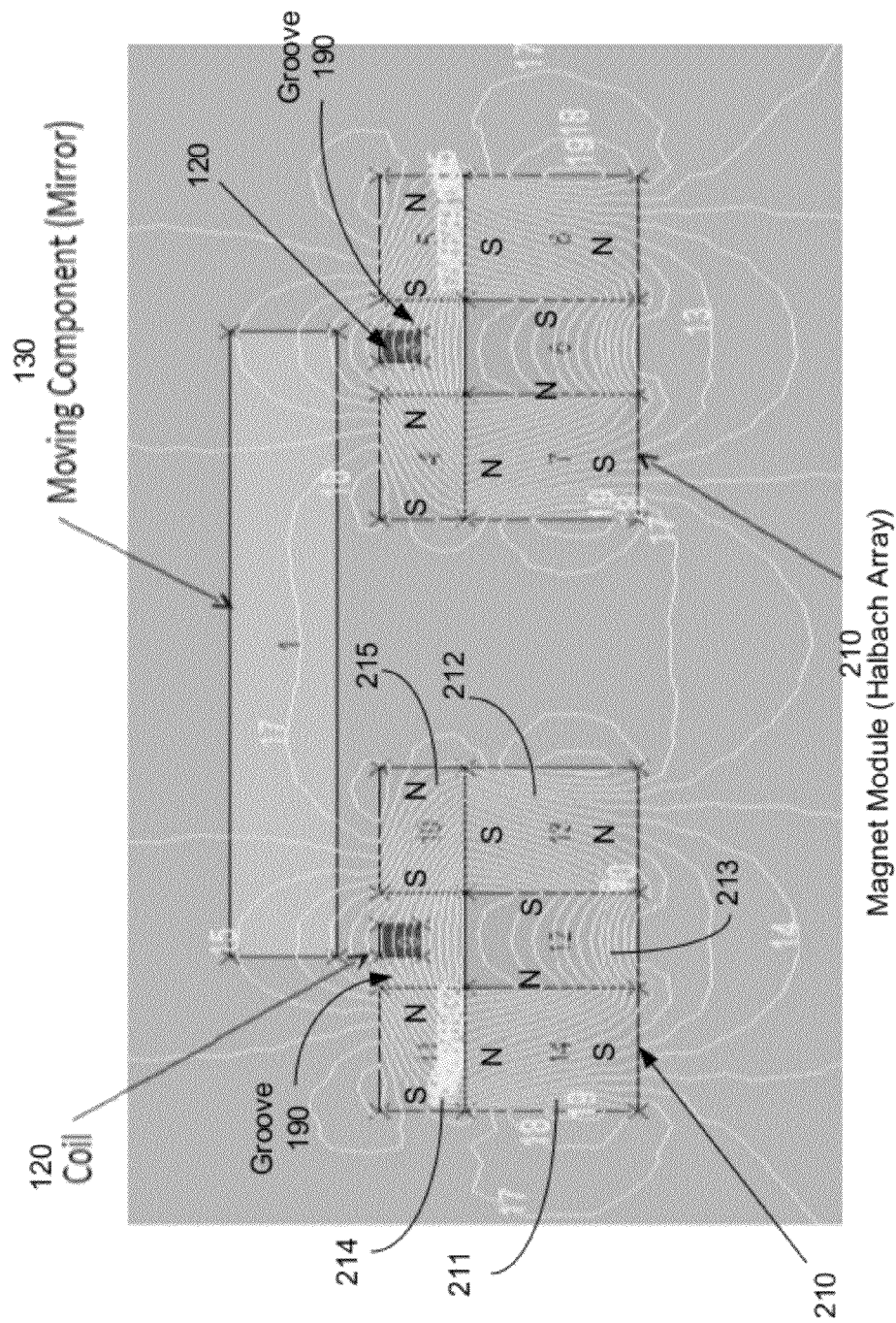
FIG. 3 shows operations of the magnet module and the conductor coil in the actuator in FIGS. 1 and 2.

FIG. 3 shows an example of using two Halbach arrays 210 in FIG. 2. Each Halbach array 210 is formed by five permanent magnets 211, 212, 213, 214 and 215. The magnetic polarities (indicated by "N" and "S") of the give permanent magnets 211, 212, 213, 214 and 215 are arranged as shown to produce desired high magnetic flux densities at the two parallel sides of the coil 120 to exerting a torque on the coil 120 to rotate. Each Halbach array 210 includes three magnets 211, 212 and 213 on the bottom and two top magnets 214 and 215 that are positioned on top of the bottom magnets 211, 212 and 213. The two top magnetic 214 and 215 are spaced from each other to form the groove 190 which is a cavity indent surrounded by permanent magnets 214, 215 and 213. The spatial distribution of the magnetic flux is illustrated, showing the highest flux density inside the groove 190 where a respective side of the coil 210 is located. In some implementations, the dimensions of the magnets 214 and 215 and the spacing between the magnets 214 and 215 are set to render the groove 190 to be sufficiently large so that the side of the coil 120 in the groove 190 remains substantially inside the groove 190 at different orientations of the coil 120. The sizes, dimensions and locations of the five permanent magnets are designed with respect to one another to produce a strong magnetic field flux density at two opposite sides of the coil 120 to change the orientation of the coil 120 at a high speed. This design of using two Halbach arrays with a conductor coil to form an electromagnetic actuator is advantageous than various other galvonometer designs because the two Halbach arrays are configured to provide efficient electromagnetic interactions between the magnets and the coil. Other designs may also be used.

In FIGS. 1 and 2, a damper 150 is provided between the support base 101 and the conductor coil 120 to dampen a motion of the conductor coil 120 relative to the support base 101. Two such dampers 150 may be provided on two opposite sides of the conductor coil 120 to provide symmetric damping.

Such an actuator in FIGS. 1 and 2 can be used in various applications. As an example, FIGS. 1 and 2 show a mirror 130 engaged to the conductor coil 120 so that the mirror 130 rotates with the conductor coil 120 around the single rotation axis. This actuated mirror device can be used to steer or scan an optical beam in, e.g., a beam scanning device such as scanning a laser beam in a scanning beam display system described in this document. As shown in FIG. 1, an input beam 181 is directed onto the mirror 130 and is reflected by the mirror 130 as an output beam 182 along a desired output direction dictated by the orientation of the mirror 130. When the input beam 181 is at a fixed input direction to the mirror 130, the rotation of the mirror 130 changes the output direction of the output beam 182.

FIGS. 4A and 4B show an exemplary implementation of the actuator shown in FIGS. 1 and 2. FIG. 4A shows the assembled actuator and FIG. 4B is an exploited view of the actuator to show various components or parts of the actuator.

In this example, the flexure 110 in FIGS. 1 and 2 is implemented as a two-part flexure assembly: a first flexure 410 and a second flexure 420. This two-part flexure assembly is engaged to a support base 430 as an example of the support base 101 in FIGS. 1 and 2. The first flexure 410 includes a first flexure base 411 that is fixed to the support base 430 and two first parallel flexure extensions 413 and 414 that flex with respect to the first flexure base 411 and the support base 430. The first flexure base 411 in this example is elongated along the single rotation axis 490 of the conductor coil 120 to provide rigidity against any motion of the first flexure 410 in a direction different from the single rotation axis. The two first parallel flexure extensions 413 and 414 are elongated along a direction that is perpendicular to the single rotation axis conductor coil 120 to flex around the first flexure base 411.

Similarly, the second flexure 420 includes a second flexure base 421 that is fixed to the support base 430 and two second parallel flexure extensions 423 and 424 that flex with respect to the second flexure base 421 and the support base 430. The second flexure base 421 in this example is elongated along the single rotation axis of the conductor coil 120 to provide rigidity against any motion of the second flexure 420 in a direction different from the single rotation axis. The two second parallel flexure extensions 423 and 424 are elongated along a direction that is perpendicular to the single rotation axis conductor coil 120 to flex around the second flexure base 421. Alternatively, the second flexure 420 may include the second flexure base and one flexure extension that flexes with respect to the second flexure base 421, or may include three or more flexure extensions.

The first and the second flexures 410 and 420 are positioned and oriented to have the first flexure extensions 413 and 414 to spatially cross with the second flexure extensions 423 and 424 so that the actuator engaged to the distal ends of the first and second flexure extensions rotate or pivot approximately around the location of the cross. In the illustrated example, the first and the second flexures 410 and 420 are positioned and oriented to have the first flexure extensions 413 and 414 to spatially interleave with the second flexure extensions 423 and 424 in position along a direction parallel to the direction of the single rotation axis. Under the cross configuration, the conductor coil 120 is engaged to distal ends of the first and second flexure extensions 413, 414, 423 and 424 to rotate around the single rotation axis as the first flexure extensions 413 and 414 counter act to the second flexure extensions 423 and 424 and vice versa when the conductor coil 120 is in motion. When viewed along the single rotation axis, the first flexure extensions 413 and 414 and the second flexure extensions 423 and 424 cross one another as shown in FIG. 1. As illustrated, the distal ends of the first flexure extensions 413 and 414 that are engaged to the conductor coil 120 are located above the second flexure base 421, and the distal ends of the second flexure extensions 423 and 424 that are engaged to the conductor coil 120 are located above the first flexure base 411. Therefore, the crossed flexures 410 and 420 provide a bearing-free pivoting mechanism by crossing two flexures 410 and 420 of equal lengths for the flexure extensions 413, 414, 423 and 424 and having one side of the cross flexures to be attached to the stationary base 430 and the other sides to be joined onto the free floating platform of the conductor coil 120. In operation, if the conductor coil 120 is tilted by the electromagnetic interaction between the current in the coil and the magnetic field, one side of the conductor coil 120 is pulled down as the other side is pushed up so that the pulled-down side of the conductor coil 120 causes one flexure side to bend down while causing the other flexure side to be up. The mutual pressures constrain the rotational tilt motion of the conductor coil 120 and the friction associated with the rotation of the coil 120 is negligibly small because the flexure design is free of a friction between two components moving relative to each other as the conductor coil 120 rotates. This aspect allows the device to consume low power and a minimal counter-force is sufficient to maintain the tilt of the conductor coil 120 when holding the conductor coil 120 at a fixed position. To reduce the overall mass to be moved by the actuator, the coil 120 can be directly attached to the mirror 130. To further reduce added materials and the mass of the actuator, the flexures 410 and 420 are electrically connected to the coil 120 for directing the current flow to and from a current generator that supplies the current to the coil 120.

The crossed flexures 410 and 420 in FIGS. 4A and 4B are designed to allow the coil-mirror assembly to rotate around one axis. The remaining five degrees of freedom of motion are constrained by the flexure geometry. The off axis stiffness of the flexures 410 and 420 can be designed to be much higher than the stiffness around the single rotation axis, e.g., about 1,000 times greater than the on axis stiffness. This can be achieved by designing the shape of the flexure bases 411 and 421, the engagement of the flexure bases 411 and 421 to the support base, and the widths of the flexure extensions 413, 414, 423 and 424 to achieve a desired aspect ratio of the flexure cross section and thus the large difference between the off-axis stiffness and the on-axis stiffness. The flexure design can be configured to keep the parasitic resonance at high frequencies, e.g., greater than 12 KHz.

This flexure actuator design can be used to achieve one or more advantages in implementations. For example, this flexure actuator design can be used to eliminate a motor shaft, moving magnets, and bearing assemblies to reduce friction in the actuator operation and the rotational inertia of the actuator. For another example, the cross flexure can be structured to mitigate mechanical wear in bearing or bushing used in some other actuator designs. By minimizing stress in the flexures during deflection, the cross flexure design can be configured to operate at low actuation/holding torques, to have a high parasitic resonance, a low rotational inertia, a low flexure stresses when deflected and to keep the stress below the endurance limit of the flexure material for a practically near infinite operating life. In addition, the cross flexures can be used as coil leads to conduct the electrical current to the coil 120 to minimize or avoid use of flexible leads that are used for conducting the current for coils in other designs. This use of the cross flexures as coil leads can further enhance the reliability of the actuator device because flexible leads are subject to mechanical fatigue due to movement of the flexible leads with the coil and the fatigue can lead to breakage of the flexible leads.

The support base 430 shown in FIG. 4A includes several components as shown in FIG. 4B. The support base 430 has two support base parts 431 and 432 that are engaged to each other by a fastener 433, e.g., a cap head screw. The flexure bases 411 and 421 are engaged to the support base part 431 in this example. Referring to FIG. 4A, the support base 430 includes two protruded extensions 434 and 435 on the opposite sides of the conductor coil 120 and the mirror 130. A first damper is located between and in contact with the protruded extension 434 and the first side surface of the coil 120 or the mirror 130 to dampen a motion of the conductor coil 120 relative to the support base 430. A second damper is located between and in contact with the protruded extension 435 and the side surface of the coil 120 or the mirror 130 to dampen the motion of the conductor coil 120 relative to the support base 430. Such dampers are represented by the part 150 in FIGS. 1 and 2 and can be made from a gel, a silicone damping material, or other suitable materials.

The flexure based actuator in FIGS. 4A and 4B can be designed to quickly and accurately move from one position to another position in a tilt-rotated manner. The flexure design allows a stationary and stable positional state and provides minimal power consumption to maintain the stationary stable positional state. This actuator can perform repeatable rotation operations without degradation of the performance. For example, a fast operation time less than 100 μs can be achieved in transitioning the actuator between either of two pre-determined mirror positions. The cross flexure design can be used to achieve a small angular rotation (e.g., 0.06 degrees) and a fine angular resolution, e.g., 0.0006 degrees or about 10 μrad. The average power consumption of the actuator can be low, e.g., 0.6 watts. A relatively large payload can be used with this design, e.g., a 9 mm×9 mm mirror that weights about 0.2 grams. The conductor coil 120 may have multiple conductor windings (e.g., 15 turns) to provide sufficient torque due the electromagnetic interaction between the coil 120 and the magnetic field of the magnetic module 140. In some implementations, the mirror 130 can be maintained at a steady state position to better than 0.00006 degrees or about 1 μrad, while maintaining an average hold current of less than 50 mA plus or minus perturbations caused by the feedback mechanism as described below. The lifetime for such a flexure can be practically infinite and the life of the actuator using such a flexure may depend on the life of the engagement mechanism for the flexure, such as the adhesive used, and other components such as the laser diode used for optical monitoring of the flexure-mirror assembly for a feedback control described below. A long lifecycle of more than $10^{13}$ cycles for such an actuator should be achievable.

FIG. 4B further shows that the permanent magnet 125 of the Halbach array 210 that is located inside the loop of the coil 120 has a cut out feature 490 at each of the two opposite ends of the magnet 150. These cut out features 490 are provided to further enhance the magnetic flux density inside the groove 190 to provide high-speed switching operations of the coil 120.

Figure 5A:
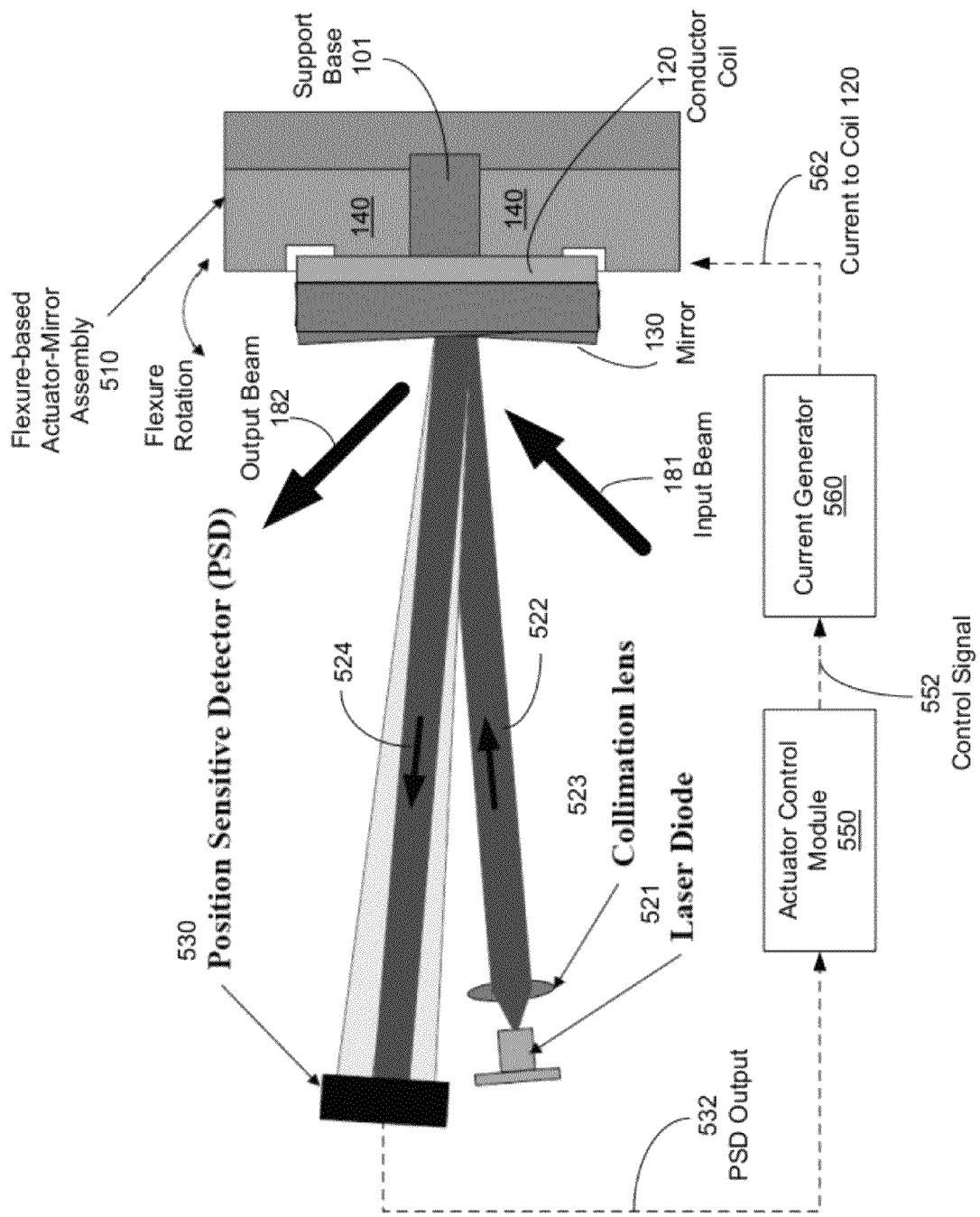
FIGS. 5A and 5B illustrate an example of an actuator feedback control for an actuator-mirror assembly based on the designs in FIGS. 1-4B.
Figure 5B:
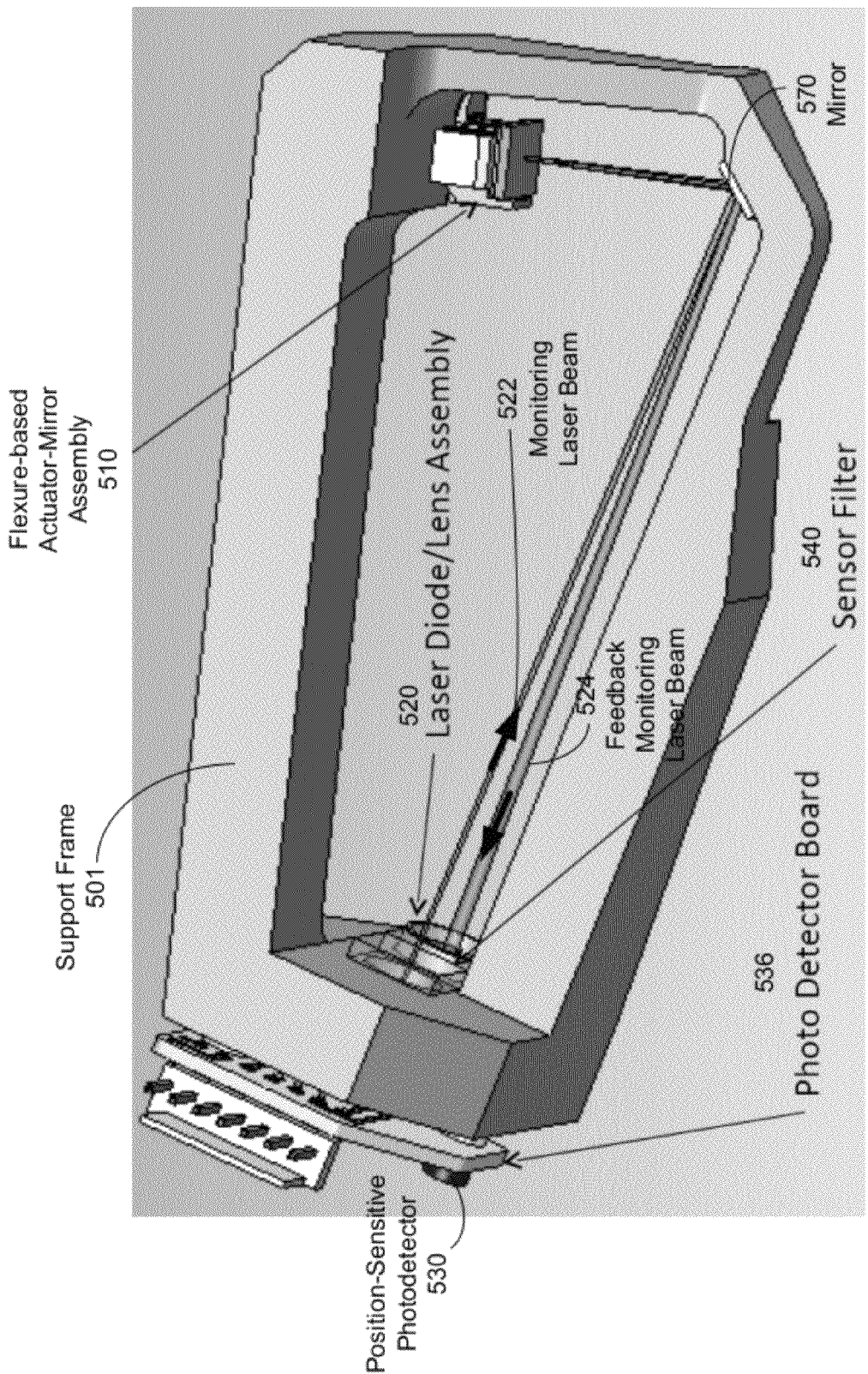

In some applications, the flexure-based actuator may include a feedback control mechanism that monitors the orientation of the actuator and provides a feedback signal to stabilize the actuator position at a desired position against any fluctuations or drifts in the actuator position. FIGS. 5A and 5B illustrate an example of an actuator feedback control for an actuator-mirror assembly based on the designs in FIGS. 1-4B.

Referring to FIG. 5A, the feedback control for a flexure-based actuator-mirror assembly 510 includes a laser diode 521 that produces a monitoring laser beam 522 towards the mirror 130. A collimation lens 523 may be used to collimate the laser beam 522. This monitoring laser beam 522 is different from and is an addition to an optical beam to be redirected by the mirror 130. The monitoring laser beam 522 can be at a wavelength different form the wavelength of the optical beam to be redirected by the mirror 130. For example, if the optical beam to re-directed by the mirror 130 is a visible beam, the monitoring laser beam 522 may be an invisible beam, e.g., an IR beam. Upon reflection by the mirror 130, the reflected beam 524 is directed into a position sensitive detector (PSD) 530 that is located at a fixed known location with respect to the flexure-based actuator-mirror assembly 510. The positions of the laser diode 521 and PSD 530 are fixed relative to the flexure-based actuator-mirror assembly 510 so that each position of the beam 524 on the sensing surface of the PSD 530 corresponds to a particular orientation of the mirror 130. As such, the position of the beam 524 on the PSD 530 can be used to measure the orientation of the mirror 130. Therefore, if the orientation of the mirror 130 deviates from a desired orientation, the actual beam position of the beam 524 on the PSD 530 deviates from a desired beam position on the PSD 530. This difference in position on PSD 530 can be used as an error signal to adjust the mirror 130 to reduce the error.

In FIG. 5A, the feedback control includes an actuator control module 550 that receives the PSD output 532 from the PSD 530. The control module 550 compares the beam position on the PSD 530 in the received PSD output 532 to a desired beam position on the PSD 530 and determines an error in the PSD position for the beam 524. Based on this error, the control module 550 generates a control signal 552 to a current generator 560 that supplies the electric current 562 to the conductor coil 120 to adjust the orientation of the conductor coil 120 and thus the orientation of the mirror 130 to reduce the error. As illustrated, an input beam 181 is directed onto the mirror 130 and is redirected by the mirror 130 as an output beam 182. The beams 522 and 524 which are used for monitoring the orientation of the mirror 130 so that the input beam 181 can be redirected as the output beam 182 at a desired output direction at a given moment.

Turning to FIG. 5B, a support frame 501 is provided to hold the PSD 530, the laser diode 521, the flexure-based actuator-mirror assembly 510 in fixed positions relative to one another. An optical sensor filter 540 may be inserted in front of the PSD 530 to filter the light so that only the light of the feedback monitoring laser beam 524 is received by the PSD 530 while other light, such as light from the beams 181 and 182 shown in FIG. 5A, is rejected by the filter 540. The laser diode 521 and the collimation lens 523 can be included in a laser diode-lens assembly 520 mounted on the support frame 501. An extension mirror 570 on the support frame 501 can be used to guide light of the beams 522 and 524 between the flexure-based actuator-mirror assembly 510 and the PSD 530 and the laser diode-lens assembly 520. This extension mirror 570 may be used to increase the optical path length from the laser diode-lens assembly 520 to the assembly 510 and to the PSD 530 to increase the change of the beam position of the feedback monitoring laser beam 524 on the PSD 530 with respect to a change in the tilt of the mirror 130 in the assembly 510.

Figure 6:
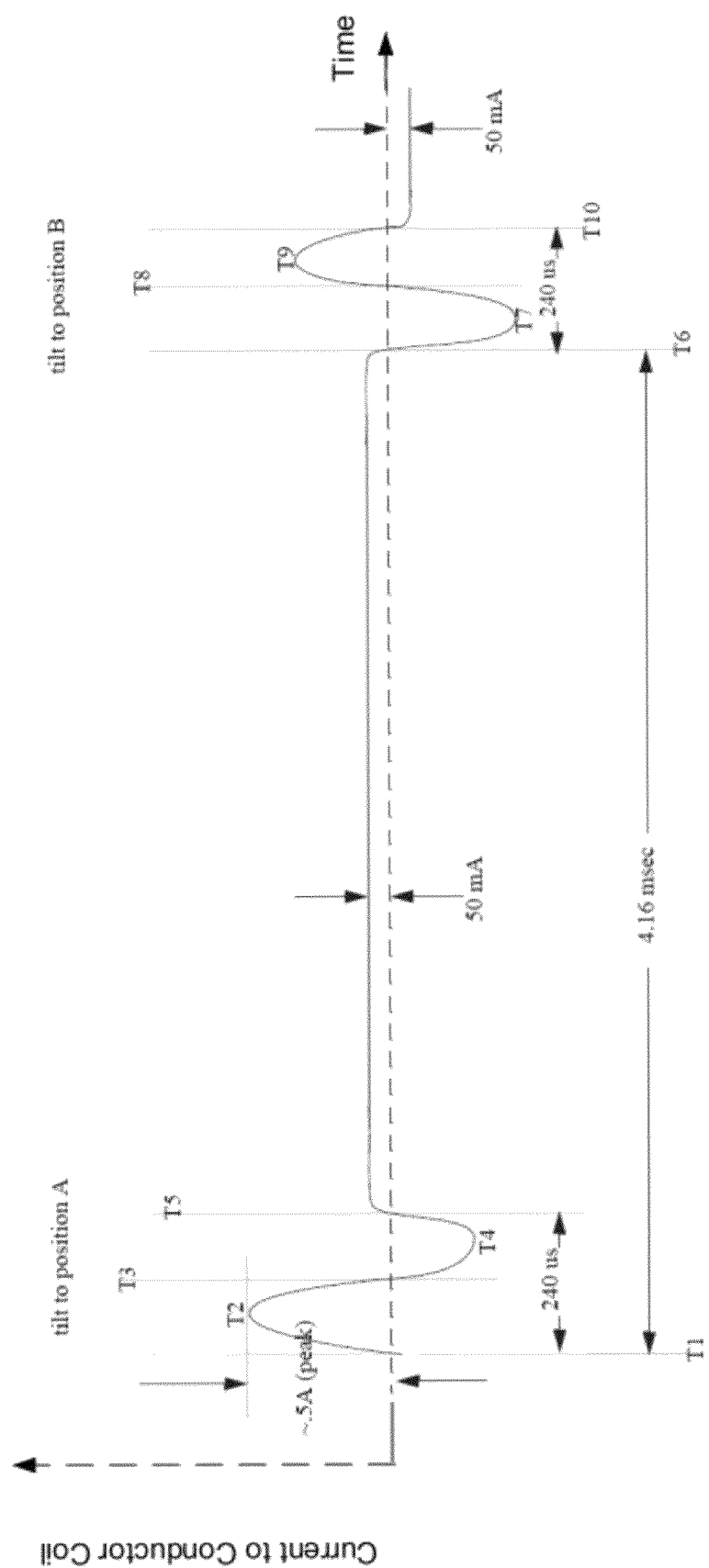
FIG. 6 shows an operation of the electromagnetically activated actuator in FIGS. 1 and 2.

In operating the flexure actuator described in this document, the electrical current supplied to the conductor coil 120 can be controlled, prior to setting the electrical current to a desired fixed value for achieving a desired mirror orientation, to reverse the direction of the electrical current from a desired direction of the electrical current for achieving the desired mirror orientation. This operation can be used to reduce over shoot of the mirror 130 beyond the desired mirror orientation. FIG. 6 illustrates an example of this current control operation for setting the mirror 130 in two orientations. Referring back to FIG. 5A, when the flexure is in a first position, the feedback monitoring laser beam 524 is to be at a beam position on the PSD 530 of the first pre-identified target point and when the flexure is in the second position, the feedback monitoring laser beam 524 is to be at a second beam position on the PSD 530 corresponding to the second pre-identified target point. Any offset form either point is used in the feedback loop to the current driven through the coil windings creating offset positioning of the steady state position of the mirror.

In the example shown in FIG. 6, the nominal steady state current through the winding is nearly 50 mA. If one of the target positions is near the power off position of the flexure module, then the steady state current may be less. By integrating the actuator and sensor into a rigid assembly ultra stable angular measurement can be achieved. For example, the flexure assembly can be designed with a first parasitic resonance at 12 Khz, but the current through the windings is set at a transition speed of 4 Khz below the first parasitic resonance, so from the first mirror position to the second mirror position current flows in one direction through the windings up to 1 A for 60 usec to accelerate the rotation of the mirror to the second position, followed immediately by a transition to a second reverse current through the windings of again up to 1 A, then the current is altered to achieve the steady state position for the mirror which may be nearly 50 mA based on the final position of the mirror. The maximum current applied to accelerate the mirror and then decelerate the mirror is based on position of the mirror in terms of the expected stress of the flexures. The current first and second polarity is based on the direction of the rotation in relation to the winding orientation in the coil to the two magnets. Mechanical and/or electronic damping can be used to minimize first resonance ringing in the actuator. In this implementation a gel is used on the edge of the platform to help dampen movement and better retain a stable stationary position.

In FIG. 6, the switching period between the two mirror positions A and B is 4.16 msec. The current through the coil winding is sent at time T1 in one polarity (e.g. positive) of a current approximately 0.5 A peak. To slow the tilt motion of the mirror, the current is reduced beginning at time T2. To decelerate the tilt of the mirror, a reverse current is applied at time T3 to a max reverse current at time T4, where the current returns to a stable state at time T5. Here the current is at a normalized value to hold the mirror in place, where the current is applied to create a electromagnetic force to counter the force of the bent-to-position flexure. This steady state current is modulated by the feedback circuit to correct for any drift of the flexure-mirror platform or a variation in the input laser beam directed to the mirror. The current mostly normalizes to a steady state current of typically 50 mA. The reverse action takes place to tilt the mirror back from the position A to position B. This process begins with a current in the opposite direction of the steady current used for holding the coil at the position A at time T6, reduces the magnitude of the applied current after reaching at a peak of 0.5 A at time T7, reverses the direction of the current at T8 to increase the current amplitude to a peak at T9, and then reduces the magnitude to ultimately reach a steady state current at time T10 for holding the mirror at a steady state position B.

Among various applications that can implement the present flexure-based actuator, the following examples describe scanning-beam systems for producing optical patterns by using two beam scanners to scan one or more optical beams in raster scanning patterns. Some laser printing systems use a scanning laser beam to print on a printing surface of a printing medium (e.g., paper). Some display systems use 2-dimensionally scanned light to produce images on a screen.

Figure 7A:
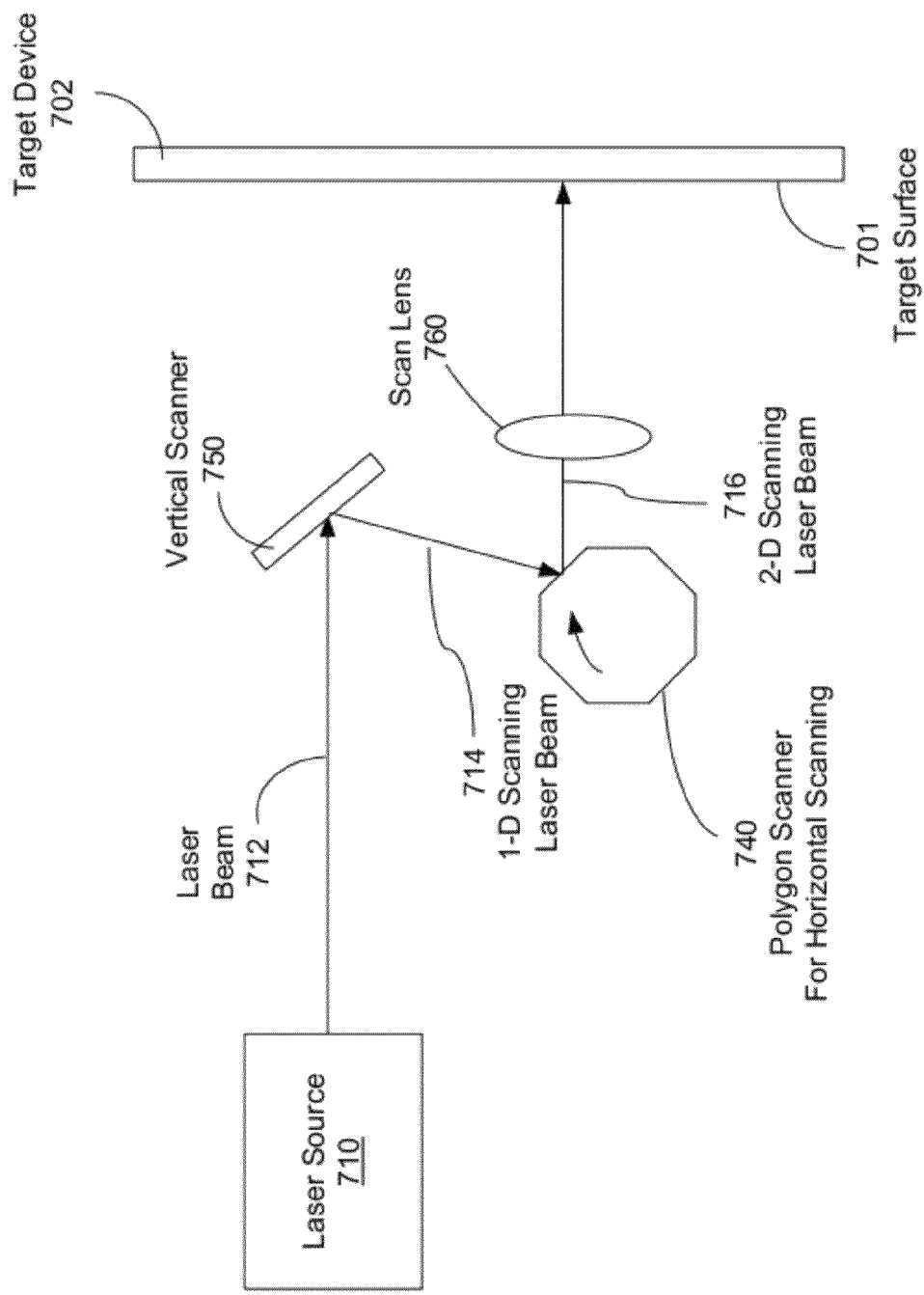
Figure 7B:
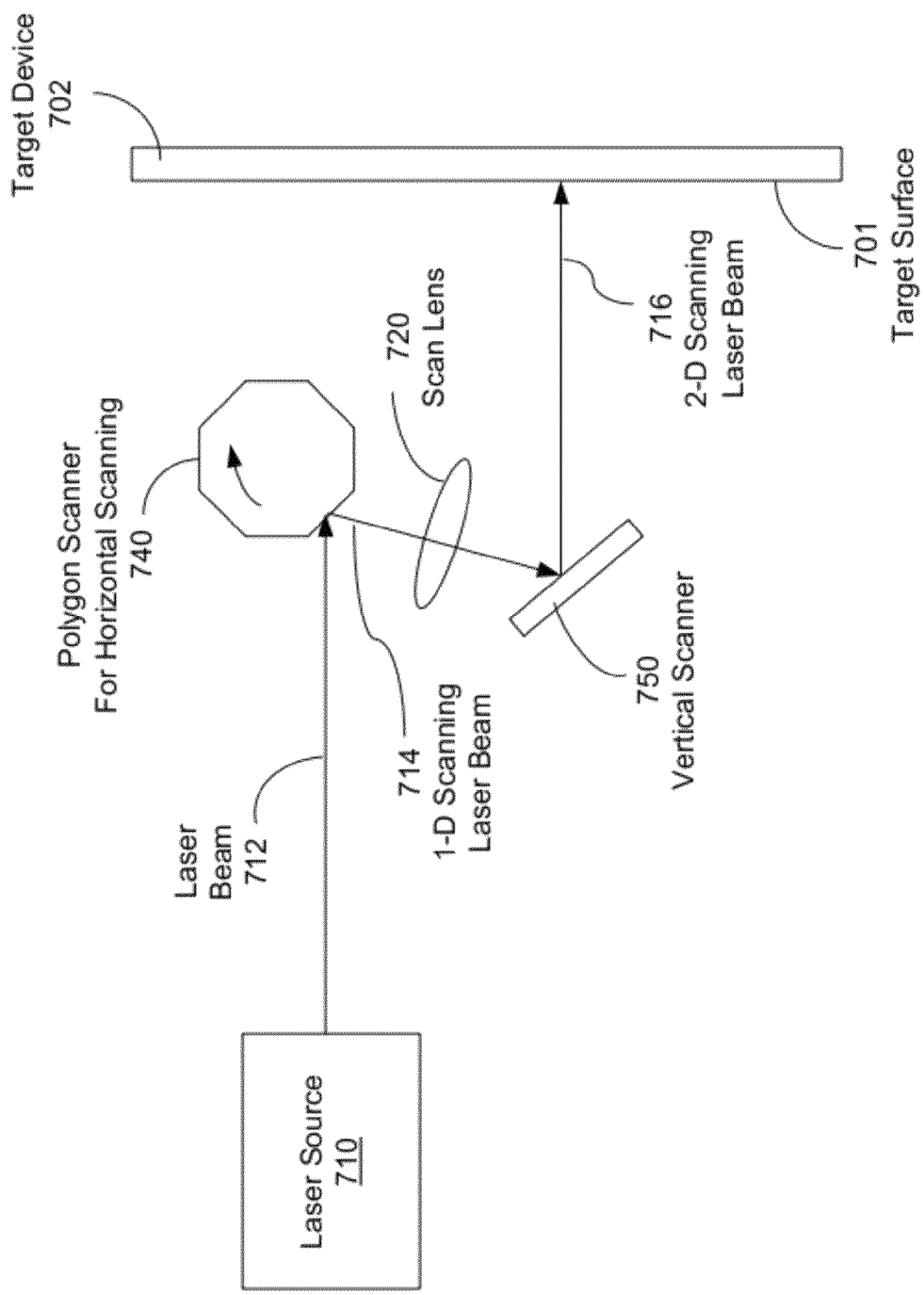

FIGS. 7A, 7B and 7C show examples of scanning beam systems that use two scanners: a polygon scanner with multiple reflective facets to provide horizontal scanning and a vertical scanning mirror such as a galvo-driven mirror to provide vertical scanning. A laser source 710 is provided to produce at least one laser beam 712. Depending on the specific applications, this single beam can be a beam of a particular wavelength, e.g., a visible color, UV light or other wavelengths. In some applications, multiple beams 712 may be generated from the laser source 710 and are scanned. In some implementations, the different beams 712 may be of different wavelengths, e.g., red, green and blue colors in the visible range, while in other implementations, the different beams 712 may be of the same or similar wavelengths, e.g., UV light. Two scanners, a polygon horizontal scanner 740 and a vertical scanner 750, are used to scan the beams 712 onto a surface 701 on a target device 702, e.g., a screen. Notably, the vertical scanner 750 can be implemented by using the present flexure-based actuator-mirror assembly. In operation, one facet of the polygon scanner 740 scans one horizontal line as the polygon scanner 740 spins to change the orientation and position of the facet and the next facet scans the next horizontal line. The horizontal scanning and the vertical scanning are synchronized to each other to project images on the screen 702. Such a two-scanner optical scanning system can be in a pre-objective optical design as shown in FIG. 7A where a scan lens 760 is placed in the optical path downstream from the polygon scanner 740 and the vertical scanner 750 to focus a scanning beam onto the target surface 701, e.g., a screen. Because the scan lens 760 is positioned downstream from the polygon scanner 740 and the vertical scanner 750, the beam entering the scan lens 760 is scanned along the vertical and horizontal directions. Therefore, the scan lens 760 is designed to focus the 2-dimensionally scanned beam onto the target surface. In this example, the vertical scanner 750 is placed upstream from the polygon scanner 740. Alternatively, the order of the two scanners 740 and 750 may be reversed.

FIGS. 7B and 7C show two exemplary implementations of a post-objective scanning system where a scan lens is placed in an optical path between the two scanners. In the example in FIG. 7B, the first scanner is the polygon scanner 740. The beam 712 is scanned along the first direction (e.g., the horizontal direction) by the polygon scanner 740 as a 1-D scanning beam 714. The second scanner downstream from the polygon scanner 740 is the vertical scanner 750, e.g., a galvo mirror constructed by engaging a mirror to a galvanometer and operates to scan the horizontally scanning beam 714 along the vertical direction as a 2-D scanning beam 116 to a target surface 701. A scan lens 720 is placed between the two scanners 740 and 750. In this post-objective design, the scan lens 720 can be structured to have high optical performance in focusing the 1-D scanning beam 114 along the scanning direction of the first scanner 140 only. Hence, such a scan lens does need to exhibit high optical performance along the second scanning direction (i.e., the vertical direction in this example) because the beam 714 is not scanned along the second scanning direction at the position of the scan lens 720. Therefore, the scan lens 720 can be a 1-D scan lens, e.g., a 1-D f theta lens. Due to the design of the scan lens 720, the focusing of the beam 116 on the target surface 701 does not change with the horizontal scanning. In addition, the vertical scanner 750 in FIG. 7B scans at a much smaller rate as the second scanner than the scan rate of the first horizontal scanner 740 and thus a focusing variation caused by the vertical scanning on the target surface 701 varies with time at the slower vertical scanning rate. This allows a focusing adjustment mechanism to be implemented in the system of FIG. 7B with the lower limit of a response speed at the slower vertical scanning rate rather than the high horizontal scanning rate. In practical devices, this particular arrangement of two scanners 740 and 750 allows easy implementation of the dynamic focusing adjustment to maintain the proper focusing of the 2-D scanning beam on the target surface as the vertical scanner 750 scans along the vertical direction.

When multiple beams 712 are used, each facet of the polygon scanner 740 simultaneously reflects the horizontal scan for a number of laser beams on the surface 701. The surface 701 is divided into a number of swath regions and each region corresponds to one polygon facet. In one implementation, multiple passes of the polygon scanner 740 can be used for the horizontal scanning with the beams at one vertical level for one pass and a slight vertical position offset for the next pass to achieve a vertical resolution set by the vertical position offset. The vertical scanner 750 is used to generate this slight vertical position offset. Assuming the polygon scanner 740 rotates once every 4.16 msec, then the vertical scanner 750 tilts one direction or the opposite direction once per revolution of the polygon scanner 740, e.g., once per 4.16 msec in the example in FIG. 6.

FIG. 7C illustrates an example of a post-objective scanning system where the vertical scanner 750 is upstream to the polygon scanner 740. The laser beam 712 from the laser 710 is directed to the vertical scanner 750 which scans the beam in the vertical direction as the 1-D scanning beam 731 and directs the beam 731 through the scan lens 720 to the downstream polygon canner 740. The output beam 732 from the polygon scanner 740 is a 2-D scanning beam and is directed to the target surface 701. In one implementation, the scan lens 720 can be designed to image the reflective surface of the vertical scanner 750 onto the reflecting facet of the polygon scanner 740 so that a relatively small polygon facet of a compact polygon can be used to reduce power consumption and the dynamic range of the polygon.

The scanning-beam systems described above can be configured as display systems with either a passive screen or active screen as the target device 702. A passive screen does not emit light but makes light of the one or more scanning beams visible to a viewer by one or a combination of mechanisms, such as optical reflection, optical diffusion, optical scattering and optical diffraction. For example, a passive screen can reflect or scatter received scanning beam(s) to show images. An active screen emits light by absorbing the one or more scanning beams and the emitted light forms part of or all of the light that forms the displayed images. Such an active screen may include one or more fluorescent materials to emit light under optical excitation of the one or more scanning beams received by the screen to produce images. Screens with phosphor materials under excitation of one or more scanning excitation laser beams are described here as specific implementation examples of optically excited fluorescent materials in various system.

Figure 8A:
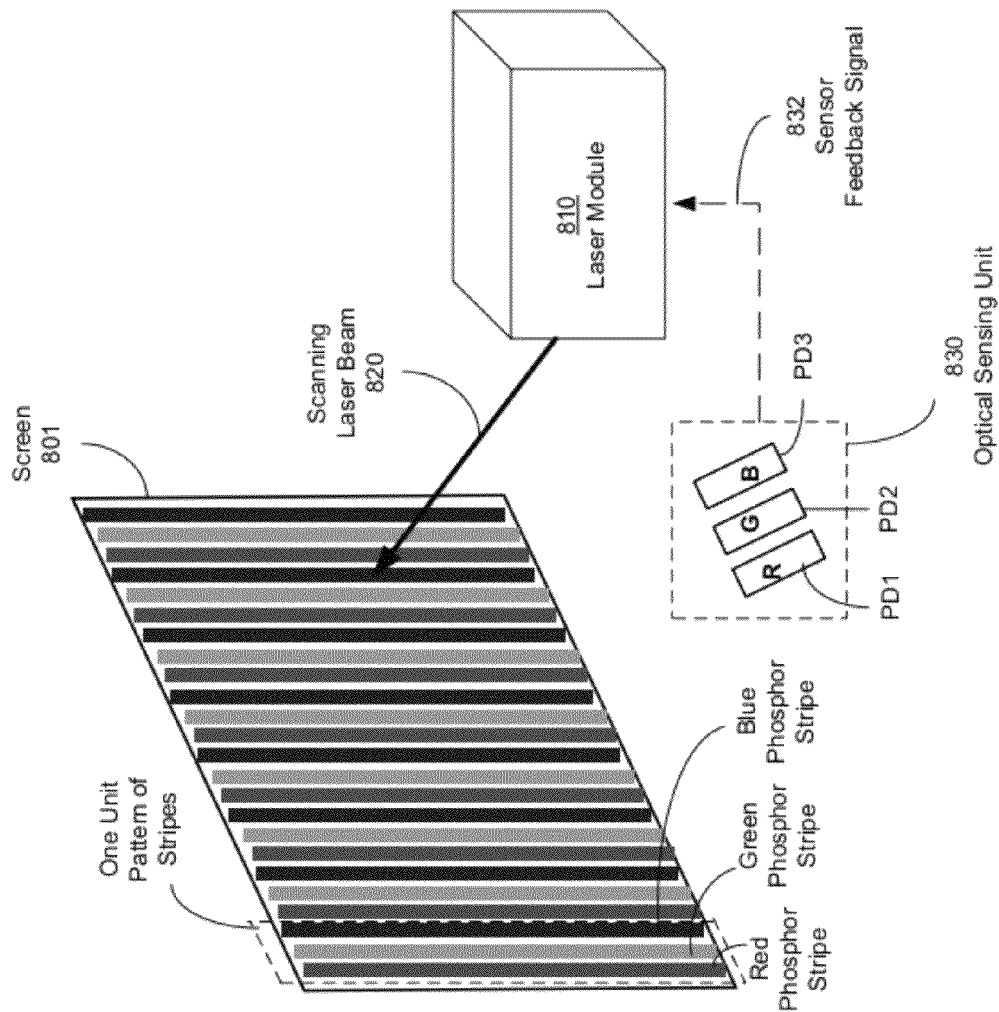

FIG. 8A shows an example of a scanning beam display system that use a fluorescent screens with fluorescent materials to emit light under optical excitation to produce images. Various screen designs with fluorescent materials can be used. In one implementation, for example, three different color phosphors that are optically excitable by the laser beam to respectively produce light in red, green, and blue colors suitable for forming color images can be formed on the screen as repetitive red, green and blue phosphor stripes in parallel. Various examples described in this application use screens with parallel color phosphor stripes for emitting light in red, green, and blue to illustrate various features of the laser-based displays. Phosphor materials are one type of fluorescent materials. Various described systems, devices and features in the examples that use phosphors as the fluorescent materials are applicable to displays with screens made of other optically excitable, light-emitting, non-phosphor fluorescent materials. At least one scanning laser beam is used to excite color light-emitting materials deposited on a screen to produce color images. The scanning laser beam is modulated to carry images in red, green and blue colors or in other visible colors and is controlled in such a way that the laser beam excites the color light-emitting materials in red, green and blue colors with images in red, green and blue colors, respectively. Hence, the scanning laser beam carries the images but does not directly produce the visible light seen by a viewer. Instead, the color light-emitting fluorescent materials on the screen absorb the energy of the scanning laser beam and emit visible light in red, green and blue or other colors to generate actual color images seen by the viewer. The excitation optical beam that excites a fluorescent material on the screen can be at a frequency or in a spectral range that is higher in frequency than the frequency of the emitted visible light by the fluorescent material. Accordingly, the excitation optical beam may be in the violet spectral range and the ultra violet (UV) spectral range, e.g., wavelengths under 420 nm.

In FIG. 8A, the laser-based display system uses a screen having color phosphor stripes. Alternatively, color phosphor dots may also be used to define the image pixels on the screen. The system includes a laser module 810 to produce and project at least one scanning laser beam 820 onto a screen 801. The screen 801 has parallel color phosphor stripes in the vertical direction where red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 8A as red, green and blue. Other color sequences may also be used. The laser beam 820 is at the wavelength within the optical absorption bandwidth of the color phosphors and is usually at a wavelength shorter than the visible blue and the green and red colors for the color images. As an example, the color phosphors may be phosphors that absorb UV light in the spectral range from about 380 nm to about 420 nm to produce desired red, green and blue light. The laser module 810 can include one or more lasers such as UV diode lasers to produce the beam 820, a beam scanning mechanism to scan the beam 820 horizontally and vertically to render one image frame at a time on the screen 801, and a signal modulation mechanism to modulate the beam 820 to carry the information for image channels for red, green and blue colors. Such display systems may be configured as rear scanner systems where the viewer and the laser module 110 are on the opposite sides of the screen 101. Alternatively, such display systems may be configured as front scanner systems where the viewer and laser module 110 are on the same side of the screen 801.

This scanning display system can be calibrated during the manufacture process so that the on and off timing of the optical pulses carried by the scanning laser beam 820 and positions of the laser beam 820 relative to the fluorescent stripes in the screen 801 are known and are controlled within a permissible tolerance margin in order for the system to properly operate with specified image quality. However, the screen 801 and components in the laser module 810 of the system can change over time due to various factors, such as scanning device jitter, changes in temperature or humidity, changes in orientation of the system relative to gravity, settling due to vibration, aging and others. Notably, such changes can produce visible and, often undesirable, effects on the displayed images. For example, a laser pulse in the scanning excitation beam 820 may hit a subpixel that is adjacent to an intended target subpixel for that laser pulse due to a misalignment of the scanning beam 820 relative to the screen 801 along the horizontal scanning direction. When this occurs, the coloring of the displayed image is changed from the intended coloring of the image. Hence, a red flag in the intended image may be displayed as a green flag on the screen. For another example, a laser pulse in the scanning excitation beam 820 may hit both the intended target subpixel and an adjacent subpixel next to the intended target subpixel due to a misalignment of the scanning beam 820 relative to the screen along the horizontal scanning direction. When this occurs, the coloring of the displayed image is changed from the intended coloring of the image and the image resolution deteriorates. The visible effects of these changes can increase as the screen display resolution increases because a smaller pixel means a smaller tolerance for a change in position. In addition, as the size of the screen increases, the effect of a change that can affect the alignment can be more pronounced because a large moment arm associated with a large screen means that an angular error can lead to a large position error on the screen. For example, if the laser beam position on the screen for a known beam angle changes over time, the result is a color shift in the image. This effect can be noticeable and thus undesirable to the viewer.

The system in FIG. 8A implements a feedback control mechanism to maintain proper alignment of the scanning beam 820 on the desired sub-pixel to achieve desired image quality. An optical sensing module 830 is provided to receive feedback light that is emitted by the screen 801 under optical excitation of the excitation beam 820 and represents the position and other properties of the scanning beam 820 on the screen 801. The optical sensing unit 830 produces a feedback servo signal 832 to a servo control in the laser module 810 that processes this feedback servo signal 832 to extract the information on the beam positioning and other properties of the beam on the screen 801. The servo control adjusts the direction and other properties of the scanning beam 820 to ensure the proper operation of the display system.

The optical sensing unit 830 may be on the screen 801 or off the screen 801 and includes at least one optical detector to detect one of the red, green and blue light emitted from the screen 801. In the illustrated example, three optical detectors PD1, PD2 and PD3 are provided in the sensing unit 830 to detect the red, green and blue fluorescent light, respectively. Each optical detector is designed to receive light from a part of or the entire screen. A bandpass optical filter can be placed in front of each optical detector to select a designated color while rejecting light of other colors.

Figure 8B:
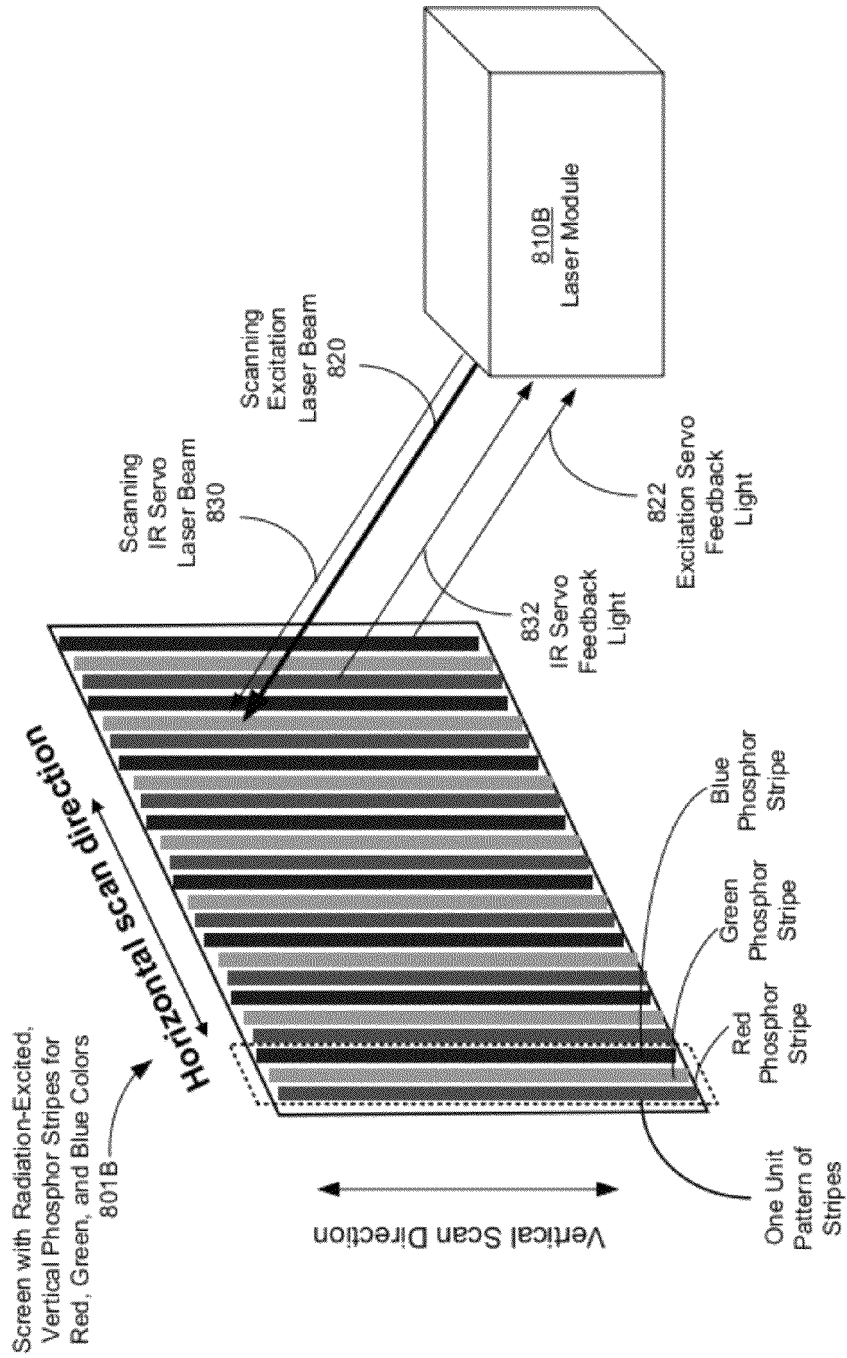

FIG. 8B illustrates an example of a laser-based display system using a screen having color phosphor stripes and an IR servo mechanism. The system includes a laser module 810B to produce and project at least one scanning laser beam 820 onto a screen 801B. The screen 801B has parallel color phosphor stripes in the vertical direction and two adjacent phosphor stripes are made of different phosphor materials that emit light in different colors. The laser beam 820 is at the wavelength within the optical absorption bandwidth of the color phosphors and is usually at a wavelength shorter than the visible blue and the green and red colors for the color images. The laser module 810B can include one or more lasers such as UV diode lasers to produce the beam 820, a beam scanning mechanism to scan the beam 820 horizontally and vertically to render one image frame at a time on the screen 801B, and a signal modulation mechanism to modulate the beam 820 to carry the information for image channels for red, green and blue colors. Such display systems in FIGS. 8A and 8B may be configured as rear projection systems where the viewer and the laser module 810B are on the opposite sides of the screen 801B. Alternatively, such display systems may be configured as front projection systems where the viewer and laser module 810B are on the same side of the screen 801B.

A scanning display system can be calibrated during the manufacture process so that the laser beam on-off timing and position of the laser beam relative to the fluorescent stripes in the screen 801B are known and are controlled within a permissible tolerance margin in order for the system to properly operate with specified image quality. However, the screen 801B and components in the laser module 801B of the system can change over time due to various factors, such as scanning device jitter, changes in temperature or humidity, changes in orientation of the system relative to gravity, settling due to vibration, aging and others. Such changes can affect the positioning of the laser source relative to the screen 801B over time and thus the factory-set alignment can be altered due to such changes. Notably, such changes can produce visible and, often undesirable, effects on the displayed images. For example, a laser pulse in the scanning excitation beam 820 may hit a subpixel that is adjacent to an intended target subpixel for that laser pulse due to a misalignment of the scanning beam 820 relative to the screen along the horizontal scanning direction. When this occurs, the coloring of the displayed image is changed from the intended coloring of the image. Hence, a red pixel in the intended image may be displayed as a green pixel on the screen. For another example, a laser pulse in the scanning excitation beam 820 may hit both the intended target subpixel and an adjacent subpixel next to the intended target subpixel due to a misalignment of the scanning beam 820 relative to the screen along the horizontal scanning direction. When this occurs, the coloring of the displayed image is changed from the intended coloring of the image and the image resolution deteriorates. The visible effects of these changes can increase as the screen display resolution increases because a smaller pixel means a smaller tolerance for a change in position. In addition, as the size of the screen increases, the effect of a change that can affect the alignment can be more pronounced because a large moment arm in scanning each excitation beam 820 associated with a large screen means that an angular error can lead to a large position error on the screen. For example, if the laser beam position on the screen for a known beam angle changes over time, the result is a color shift in the image. This effect can be noticeable and thus undesirable to the viewer.

Implementations of various alignment mechanisms can be provided to maintain proper alignment of the scanning beam 820 on the desired sub-pixel to achieve desired image quality. These alignment mechanisms include reference marks on the screen, both in the fluorescent area and in one or more peripheral area outside the fluorescent area, to provide feedback light that is caused by the excitation beam 820 and represents the position and other properties of the scanning beam on the screen. The feedback light can be measured by using one or more optical servo sensors to produce a feedback servo signal. FIGS. 8A and 8B provide two examples for such feedback controls. A servo control in the laser module 810B processes this feedback servo signal to extract the information on the beam positioning and other properties of the beam on the screen and, in response, adjust the direction and other properties of the scanning beam 820 to ensure the proper operation of the display system.

For example, a feedback servo control system can be provided to use peripheral servo reference marks positioned outside the display area unobservable by the viewer to provide control over various beam properties, such as the horizontal positioning along the horizontal scanning direction perpendicular to the fluorescent stripes, the vertical positioning along the longitudinal direction of the fluorescent stripes, the beam focusing on the screen for control the image sharpness, and the beam power on the screen for control the image brightness. For another example, a screen calibration procedure can be performed at the startup of the display system to measure the beam position information as a calibration map so having the exact positions of sub-pixels on the screen in the time domain. This calibration map is then used by the laser module 810B to control the timing and positioning of the scanning beam 820 to achieve the desired color purity. For yet another example, a dynamic servo control system can be provided to regularly update the calibration map during the normal operation of the display system by using servo reference marks in the fluorescent area of the screen to provide the feedback light without affecting the viewing experience of a viewer. The system in FIG. 8A uses the emitted colored light as the feedback for controlling beam alignment on the screen.

FIG. 8B shows another design that uses designated IR feedback light for controlling beam alignment on the screen.

In FIG. 8B, the laser module 810B also produces an invisible servo beam 830 such as an IR beam and scans the servo beam 830 on to the screen 801B along with the excitation beam 820. Different from the excitation beam 820, the servo beam 830 is not modulated to carry image data. The servo beam 830 can be a CW beam. The stripe dividers on the screen 801B can be made reflective to the light of the servo beam 830 and to produce feedback light 832 by reflection. The servo beam 830 has a known spatial relation with the excitation beam 820. Therefore, the positioning of the servo beam 830 can be used to determine the positioning of the excitation beam 820. This relationship between the servo beam and excitation beams can be determined by using reference servo marks such as a start of line mark in a non-viewing area of the screen 801B. The laser module 801B receives and detects the feedback light 832 to obtain positioning information of the servo beam 830 on the screen 801B and use this positioning information to control alignment of the excitation beam 820 on the screen. The servo beam 830 is invisible and does not produce any noticeable visual artifact on the screen 801B during the normal operation of the system when images are produced on the screen 801B. For example, the servo beam 830 can have a wavelength in a range from 780 nm to 820 nm. For safety concerns, the screen 801B can be made to have a filter that blocks the invisible servo beam 830 from exiting the screen 801B on the viewer side. In this regard, a cutoff absorbing filter with a bandpass transmission range only in the visible spectral range (e.g., from 420 nm to 680 nm) may be used to block the servo beam 830 and excitation beam 820. The servo control of the excitation beam 820 based on the servo beam 830 can be performed dynamically during the normal operation of the system. This servo design avoids manipulation of the image-producing excitation beam 820 during the normal display mode for servo operations and thus avoids any visual artifacts that may be caused by the servo-related manipulation of the image-producing excitation beam 820.

In addition, in some implementations, the scattered or reflected excitation light by the screen 801B may also be used for servo control operations during a period when the system does not show images, e.g., during the startup period of the system or when the excitation beam 820 is outside the active display area of the screen 801B. In such a case, the scattered or reflected excitation light, labeled as light 822, can be used as servo feedback light for servo control of the horizontal alignment of each laser. This is different from the design as in FIG. 8A where emitted colored light from the phosphors on the screen (rather than the excitation light) is used as the feedback light for the alignment feedback control.

In some implementations based on the invisible servo beam 830, the servo beam 830 can be directed along with the one or more excitation beams 820 through the same optical path. The servo beam 830 is invisible and can be overlapped with a scanning path of one excitation beam 820 or along its own scanning path that is different from a path of any of the excitation beams 820. The spatial relation between the servo beam 830 and each excitation beam 820 is known and fixed so that the positioning of the servo beam 830 on the screen 801B can be used to infer positioning of each excitation beam 820.

A light source for generating the servo beam 830 and a light source for generating an excitation beam 820 can be semiconductor lasers in a light source module which can be an array of lasers and at least one of the lasers in the laser array can be a servo laser that produces the servo beam 830. The location of the servo laser is known relative to each excitation laser. The servo beam 830 and each excitation beam 820 are directed through the same relay optics, the same beam scanners and the same projection lens and are projected on the screen 801B. Therefore, the positioning of the servo beam 830 on the screen 801B has a known relation with the positioning of each excitation beam 820 on the screen. This relation between the servo beam 830 and each excitation beam 820 can be used to control the excitation beam 820 based on measured positioning of the servo beam 830.

FIG. 8C illustrates a scanning beam display system based on a servo control using the invisible servo beam 830 as one exemplary implementation of the design in FIG. 8B. A display processor and controller 840 can be used to provide control functions and control intelligence based on servo detector signals from radiation servo detectors 850 that detect servo feedback light 832 from the screen 801B. A single detector 850 may be sufficient and two or more servo detectors 850 can be used to improve the servo detection sensitivity. Similarly, one or more radiation servo detectors 860 may also be used to collect excitation servo light 822 produced by scattering or reflecting the excitation beam 820 at the screen to provide additional feedback signals to the processor and controller 840 for the servo control. A scanning projection module 870 is provided to scan and project the excitation and servo beams 820 and 830 onto the screen 801B. The controller 840 includes a circuit that produces scanning control signals to the scanning module 870 for controlling the beam scanning, such as the current to the conductor coil in the flexure actuator. As illustrated, the image data is fed to the display processor and controller 840 which produces an image data signal carrying the image data to a signal modulator controller 880 for excitation lasers 881. The servo laser, which may be positioned among the excitation lasers 881, is not modulated to carry image data. The signal modulation controller 880 can include laser driver circuits that produce laser modulation signals carrying image signals with image data assigned to different lasers 881, respectively. The laser control signals are then applied to modulate the lasers 881, e.g., the currents for laser diodes to produce the laser beams 882. The display processor and controller 840 also produces laser control signals to the lasers in the lasers 881 to adjust the laser orientation to change the vertical beam position on the screen 801B or the DC power level of each laser. The display processor and controller 840 further produces scanning control signals to the scanning projection module 870 to control and synchronize the horizontal polygon scanner and the vertical scanner (which can include the flexure actuator).

In each horizontal scan, the beam 820 or 830 scans across the light-emitting stripes and the reflections produced by the stripe dividers can be used to indicate horizontal positions of the stripe dividers, spacing between two adjacent stripe dividers and horizontal positions of the horizontally scanned beam 820 or 830. Therefore, reflections from the stripe dividers can be used for servo control of the horizontal alignment between the beam 820 and the light-emitting strips.

Based on the stripe divider and possibly other reference marks, such as peripheral reference marks outside the active display area of the screen, the positioning of the servo beam 830 on the screen 801B can be measured. Because the servo beam 830 has a fixed relation with each excitation beam 820, any error in the positioning of the servo beam 830 suggests a corresponding error in each excitation beam 820. Therefore, the positioning information of the servo beam 830 can be used in the servo control to control the servo beam 830 and each excitation beam 820 to reduce an alignment error of the excitation beam.

The present servo control operates to place each optical pulse in the excitation beam 820 near or at the center of a target light-emitting stripe to excite the light-emitting material in that stripe without spilling over to an adjacent light-emitting stripe. The servo control can be designed to achieve such alignment control by controlling the timing of each optical pulse in order to place the pulse at a desired position on the screen 801B during a horizontal scan. Accordingly, the servo control, i.e., the processor and controller 640, needs to "know" horizontal positions of the light-emitting stripes in each horizontal line before each horizontal scan in order to control the timing of optical pulses during the scan. This information on horizontal positions of the light-emitting stripes in each horizontal line constitutes a two-dimensional position "map" of the active display area or light-emitting area of the screen 801B of (x, y) coordinates where x is the horizontal position of each stripe divider (or equivalently, the horizontal position of the center of each stripe) and y is the vertical position or ID number of a horizontal scan. This position map of the screen 801B can be measured at the factory and may change in time due to changes in the system components due to temperature, aging and other factors. For example, thermal expansion effects, and distortions in the optical imaging system will need corresponding adjustments in the precise timing to activate each color in a pixel. If the laser actuation does not properly correspond to the timing where the beam is directed at the central portion of a sub-pixel or stripe for the intended phosphor, the beam 820 will either partially or completely activate the wrong color phosphor. In addition, this position map of the screen 801B can vary from one system to another due to the component and device tolerances during the manufacturing.

Therefore, it is desirable to update the position map of the screen 801B and to use the updated position map for controlling the timing of pulses of the excitation beam 820 in each horizontal scan during the normal display. The position map of the screen 801B can be obtained using the feedback light 822 and 832 in a calibration scanning when the system is not in the normal display mode, e.g., during the start-up phase of the system. In addition, the servo feedback light 832 can be used in real time video display to monitor and measure changes in an existing position map of the screen 801B when the system is operating in the normal display mode to produce images on the screen 801B. This mode of the servo control is referred to as dynamic servo. The dynamic monitoring of the screen 801B can be useful when the system operates for an extended period time without a downtime because the screen 801B may undergo changes that can lead to significant changes to the position map of the screen 801B that is updated during the start-up phase of the system.

Hence, based on FIGS. 8B and 8C, the servo control can be provided using the servo beam 830 during the normal display mode when each excitation beam 820 is used for carrying optical pulses for producing images on the screen 801B and is not used for servo control. The servo beam 830 is a CW beam and is scanned over one horizontal line per screen segment with the scanning modulated excitation Laser beams 820. The servo feedback light 832 is detected by the one or more servo detectors 850 to measure an alignment error of the servo beam 830 on the screen 801B during the normal display. The alignment of each excitation laser beam 820 is adjusted based on the measured alignment error of the servo beam 830 to reduce the alignment error of the excitation laser beam 820.

Examples of feedback controls for various scanning display systems are disclosed in PCT publication No. WO 2007/095329 entitled "SERVO-ASSISTED SCANNING BEAM DISPLAY SYSTEMS USING FLUORESCENT SCREENS" and published on Aug. 23, 2007, U.S. Patent Publication No. 20070188417 entitled "SERVO-ASSISTED SCANNING BEAM DISPLAY SYSTEMS USING FLUORESCENT SCREENS" and published on Aug. 16, 2007, U.S. Patent Publication No. 20100097678 entitled "SERVO FEEDBACK CONTROL BASED ON DESIGNATED SCANNING SERVO BEAM IN SCANNING BEAM DISPLAY SYSTEMS WITH LIGHT-EMITTING SCREEN" and published on Apr. 22, 2010, and U.S. Pat. No. 7,878,657 entitled "SERVO FEEDBACK CONTROL BASED ON INVISIBLE SCANNING SERVO BEAM IN SCANNING BEAM DISPLAY SYSTEMS WITH LIGHT-EMITTING SCREENS" and issued Feb. 1, 2011, all of which are incorporated by reference as part of the disclosure of this document.

Figure 9A:
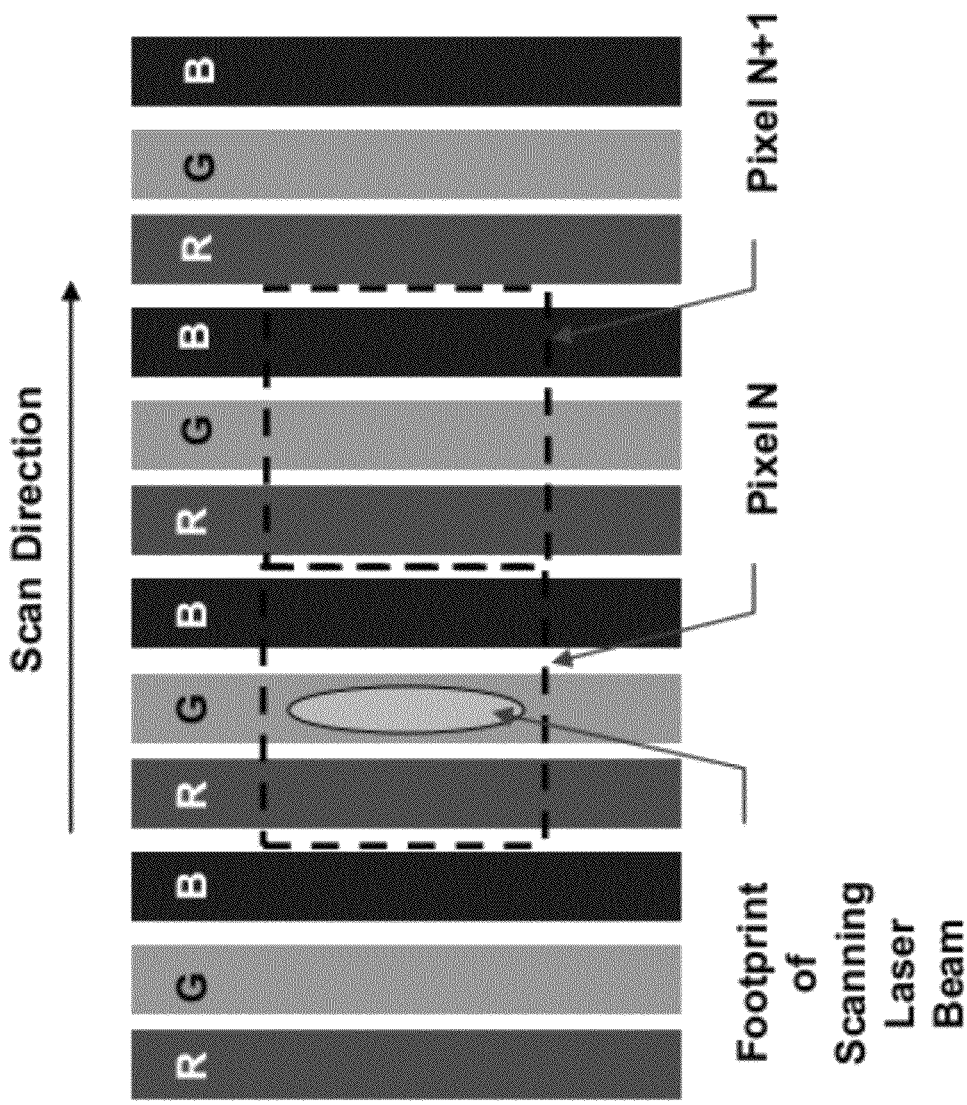

FIGS. 9A and 9B show an exemplary design of the screen 801 of FIGS. 8A AND 8B that uses a light-emitting fluorescent layer with different light-emitting regions that emit visible light by absorbing excitation light such as UV light. In this particular example, the light-emitting regions are parallel stripes (e.g., phosphor stripes) and the optical module 810 is provided to scan laser excitation light 820 modulated with optical pulses through the stripes to produce pixilated images.

FIG. 9A shows the operation of the screen 101 in a view along the direction B-B perpendicular to the surface of the screen in FIG. 9B. A set of adjacent light-emitting stripes of different colors, e.g., red light (R), green light (G) and blue light (B), are grouped to together to form a color pixel and each stripe within the set forms a subcolor pixel. In operation, each of the one or more laser beams 820 is scanned spatially across the light-emitting screen 801 to hit different color pixels at different times. Accordingly, the modulated beam 820 carries the image signals for the red, green and blue for each pixel at different times and for different pixels at different times. Hence, the modulation of the beam 820 is coded with image information for different pixels at different times to map the timely coded image signals in the beam 820 to the spatial pixels on the screen 801 via the beam scanning. The beam scanning converts the timely coded image signals in form of optical pulses into spatial patterns as displayed images on the screen 101.

Since each phosphor stripe for emitting light of a particular color is longitudinal in shape, the cross section of the beam 820 may be shaped to be elongated along the direction of the stripe to maximize the fill factor of the beam within each color stripe for a pixel. This may be achieved by using a beam shaping optical element in the laser module 810. A laser source that is used to produce a scanning laser beam that excites a phosphor material on the screen may be a single mode laser or a multimode laser. The laser may also be a single mode along the direction perpendicular to the elongated direction phosphor stripes to have a small beam spread that is confined by the width of each phosphor stripe. Along the elongated direction of the phosphor stripes, this laser beam may have multiple modes to spread over a larger area than the beam spread in the direction across the phosphor stripe. This use of a laser beam with a single mode in one direction to have a small beam footprint on the screen and multiple modes in the perpendicular direction to have a larger footprint on the screen allows the beam to be shaped to fit the elongated color subpixel on the screen and to provide sufficient laser power in the beam via the multimodes to ensure sufficient brightness of the screen.

Referring to FIG. 9B, the screen 801 includes a rear substrate 801 which is transparent to the scanning laser beam 820 and faces the laser module 810 to receive the scanning laser beam 820. A second front substrate 202 is fixed relative to the rear substrate 201 and faces the viewer in a rear projection configuration. A color phosphor stripe layer 203 is placed between the substrates 201 and 202 and includes phosphor stripes. The color phosphor stripes for emitting red, green and blue colors are represented by "R", "G" and "B," respectively. The front substrate 202 is transparent to the red, green and blue colors emitted by the phosphor stripes. The substrates 201 and 202 may be made of various materials, including glass or plastic panels. Each color pixel includes portions of three adjacent color phosphor stripes in the horizontal direction and its vertical dimension is defined by the beam spread of the laser beam 820 in the vertical direction. As such, each color pixel includes three subpixels of three different colors (e.g., the red, green and blue). The laser module 810 scans the laser beam 820 one horizontal line at a time, e.g., from left to right and from top to bottom to fill the screen 801. The laser module 810 is fixed in position relative to the screen 801 so that the scanning of the beam 820 can be controlled in a predetermined manner to ensure proper alignment between optical pulses in the laser beam 820 and each pixel position on the screen 801. As illustrated, the scanning laser beam 820 is directed at the green phosphor stripe within a pixel to produce green light for that pixel.

The systems in FIGS. 8A and 8B with the screen design in FIGS. 9A and 9B can be operated by controlling the pixels to display a pattern or image one frame at a time and to display consecutive frames over time at a suitable frame rate, e.g., 24 frames per second, 30 frames per second, 60 frames per second, 120 frames per second or 240 frames per second. Each frame is formed by controlled illumination of the pixels by various scanned illumination methods. For example, a frame can be constructed by a progressive scanning to illuminate pixels in one row at a time and sequentially scan through all rows. For another example, a frame can be constructed by an interlaced scanning to illuminate pixels in one row at a time and progressively scan through only odd-numbered rows at first and then progressively scan through only even-numbered rows.

Figure 10:
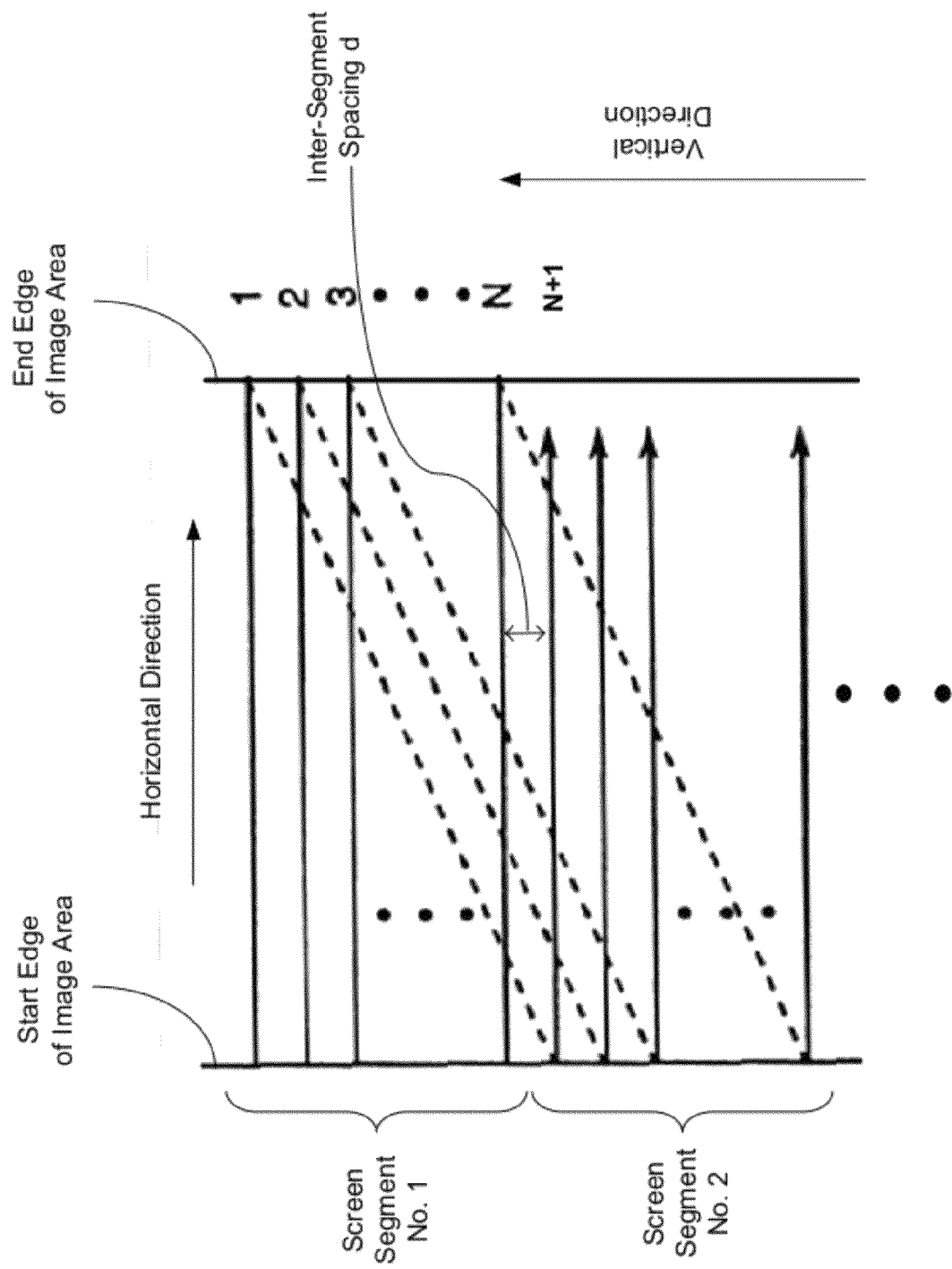

Beam scanning can be performed in various ways by the scanning module 810 in FIGS. 8A and 8B. FIG. 10 illustrates an example of simultaneous scanning of one screen segment with multiple scanning laser beams at a time and sequentially scanning consecutive screen segments. Visually, the beams 820 behaves like a paint brush to "paint" one thick horizontal stroke across the screen 801 at a time to cover one screen segment and then subsequently to "paint" another thick horizontal stroke to cover an adjacent vertically shifted screen segment. Assuming the laser array in the module 810 has 36 lasers, a 1080-line progressive scan of the screen 801 would require scanning 30 vertical screen segments for a full scan. Hence, this configuration in an effect divides the screen 801 along the vertical direction into multiple screen segments so that the N scanning beams scan one screen segment at a time with each scanning beam scanning only one line in the screen segment and different beams scanning different sequential lines in that screen segment. After one screen segment is scanned, the N scanning beams are moved at the same time to scan the next adjacent screen segment. In some implementations, one facet of the polygon can be used to scan one screen segment with multiple scanning laser beams at a time and the next polygon facet is used to scan the next screen segment. In this mode, the vertical scanner adjusts the vertical positions of all beams at the end of scanning each screen segment by one polygon facet to scan the next screen segment by the next polygon facet.

Therefore, the N diode lasers produce modulated laser excitation beams of the excitation light at the single excitation wavelength, one modulated laser excitation beam from each diode laser per one laser current control signal carrying images of different colors in the respective laser current control signal. The beam scanning scans, simultaneously and along the direction perpendicular to the phosphor stripes, the modulated laser excitation beams on to the display screen at different and adjacent screen positions along the longitudinal direction of the phosphor stripes in one screen segment of the display screen, to produce different scan lines, respectively, in the screen segment, to cause fluorescent layer of the display screen to emit light of red, green and blue colors at different times at different positions in each scan line and, to shift, simultaneously, the modulated laser excitation beams to other screen segments at different positions in the display screen along the vertical direction, one screen segment at a time, to render the images.

Hence, FIGS. 8A and 8B show exemplary display systems with a display screen that includes a fluorescent layer that absorbs an excitation light at a single wavelength and emits visible light. The fluorescent layer includes a plurality of parallel fluorescent stripes elongated along a first direction (e.g., the vertical direction) and spaced from one another along a second direction perpendicular to the first direction (e.g., the horizontal direction). At least three adjacent fluorescent stripes are made of three different fluorescent materials: a first fluorescent material that absorbs the excitation light and emits light of a first color, a second fluorescent material that absorbs the excitation light and emits light of a second color, and a third fluorescent material that absorbs the excitation light and emits light of a third color. Such a system can include a plurality of diode lasers that respond to respective laser current control signals to produce modulated laser excitation beams of the excitation light, one modulated laser excitation beam from each diode laser per one laser current control signal carrying images in the respective laser current control signal, a controller that generates the laser current control signals that respectively carry images and are applied to the one or more diode lasers; and a beam scanning mechanism. This beam scanning mechanism receives the modulated laser beams and scans, along the second direction, the modulated laser excitation beams on to the display screen at different and adjacent screen positions along the first direction in one screen segment of the display screen, to produce different scan lines along the second direction, respectively, in the screen segment, to cause the display screen to emit light of the first, second and third colors at different times at different positions in each scan line along the second direction and, to shift, simultaneously, the modulated laser excitation beams to other screen segments at different positions in the display screen along the first direction, one screen segment at a time, to render the images.

In the above designs with multiple laser beams, each scanning laser beam scans only a number of lines across the entire screen along the vertical direction that is equal to the number of screen segments, and, within each screen segment, several beams simultaneously scan multiple lines. Hence, the polygon scanner for the horizontal scanning can operate at a slower speed than a scanning speed needed for a single beam scan design that uses the single beam to scan every line of the entire screen. For a given number of total horizontal lines on the screen (e.g., 1080 lines in HDTV), the number of screen segments decreases as the number of the lasers increases. Hence, in a system that uses 36 lasers to produce 36 excitation laser beams, the galvo mirror and the polygon scanner scan 30 lines per frame while a total of 108 lines per frame are scanned when there are only 10 lasers. Hence, the use of the multiple lasers can increase the image brightness which is approximately proportional to the number of lasers used and, at the same time, can also advantageously reduce the response speeds of the scanning module.

Polygons can be designed to have polygon facets with the identical facet orientation. When such a polygon is used for the horizontal scanning, the vertical scanning is entirely achieved by the vertical adjustment of the vertical scanner. Hence, in the scanning example in FIG. 10, the vertical scanner needs to change its orientation at the end of the scanning by each polygon facet since two adjacent polygon facets are used to scan to adjacent vertical screen segments. Alternatively, a polygon can be designed to have different reflective polygon facets tilted at different tilt facet angles which increase or decrease by a fixed amount sequentially from one facet to another. Such a polygon is a 2-dimensional polygon because an input beam with a fixed direction or orientation when scanned by this polygon produces a series of different horizontal scan lines on the screen that are spaced along the vertical direction as if the beam is scanned along both the horizontal and vertical directions.

One implementation for using the combination of the vertical scanner and polygon scanner in the system in FIG. 8A or FIG. 8B is based on a two-dimensional polygon scanner with different reflective polygon facets tilted at different tilt facet angles. In this implementation, rotations of the polygon scanner are used to scan optical beams horizontally without simultaneous vertical scanning to produce horizontal scan lines on the screen and adjust vertical positions of the optical beams during a blanking time when there is no light projected onto the screen by using different facets. In some implementations, the vertical scanner is fixed in position during a full rotation of the polygon and this is not operated as a "scanner" but rather as a vertical position adjuster. This vertical scanner or adjuster, e.g., the device 750 in FIGS. 7A, 7B and 7C, can be used in combination with the two-dimensional polygon scanner to provide an additional vertical adjustment to the vertical positions of the beams during a blanking time when there is no light projected onto the screen to increase the number of horizontal lines on the screen.

This vertical adjuster can include a reflector to reflect each beam and an actuator such as the flexure actuator in FIGS. 1-4B to control the orientation of the reflector to adjust the vertical position of a beam on the screen. The vertical adjuster is operated to hold the vertical position of a beam at a fixed vertical position on the screen when the beam is being horizontally scanned on the screen. During the horizontal scanning by each facet of the polygon, the vertical adjuster in such implementations does not perform vertical scanning due to the operation of the two-dimensional polygon scanner. Therefore, this design can be used to lessen the technical performance parameters for the vertical adjuster in comparison with a vertical scanner and to allow a variety of beam deflection devices with adjust actuators to be used as the vertical adjuster, such as various 1-dimensional beam scanners, reflectors coupled with step actuators and others, to be used in scanning display systems based on the two-dimensional polygon scanner described in this document. As a specific example, a beam deflector having a reflective mirror and a sweeping or step galvanometer actuator engaged to the mirror may be used to implement the vertical adjuster.

In operation, the polygon scanner rotates to scan the scanning beams. Each polygon facet receives, reflects and scans the beams 820 simultaneously and horizontally on the screen 801 within one screen segment. The immediate next polygon facet is tilted at a different tilt angle and thus receives, reflects and scans the same beams 820 simultaneously and horizontally at different vertical positions on the screen 801 in another screen segment next to the previous screen segment along the vertical direction. The different optical beams 820 from one polygon facet are directed to different vertical positions on the screen 801. As different polygon facets sequentially take turns to perform the horizontal scanning of the beams 820 as the polygon scanner rotates, the vertical positions of beams 820 on the screen 801 are stepped vertically at different positions along the vertical stepping direction without any scanning along the vertical direction to change the position of each beam during each horizontal scan because the vertical adjuster is operated at a fixed orientation.

Figure 11A:
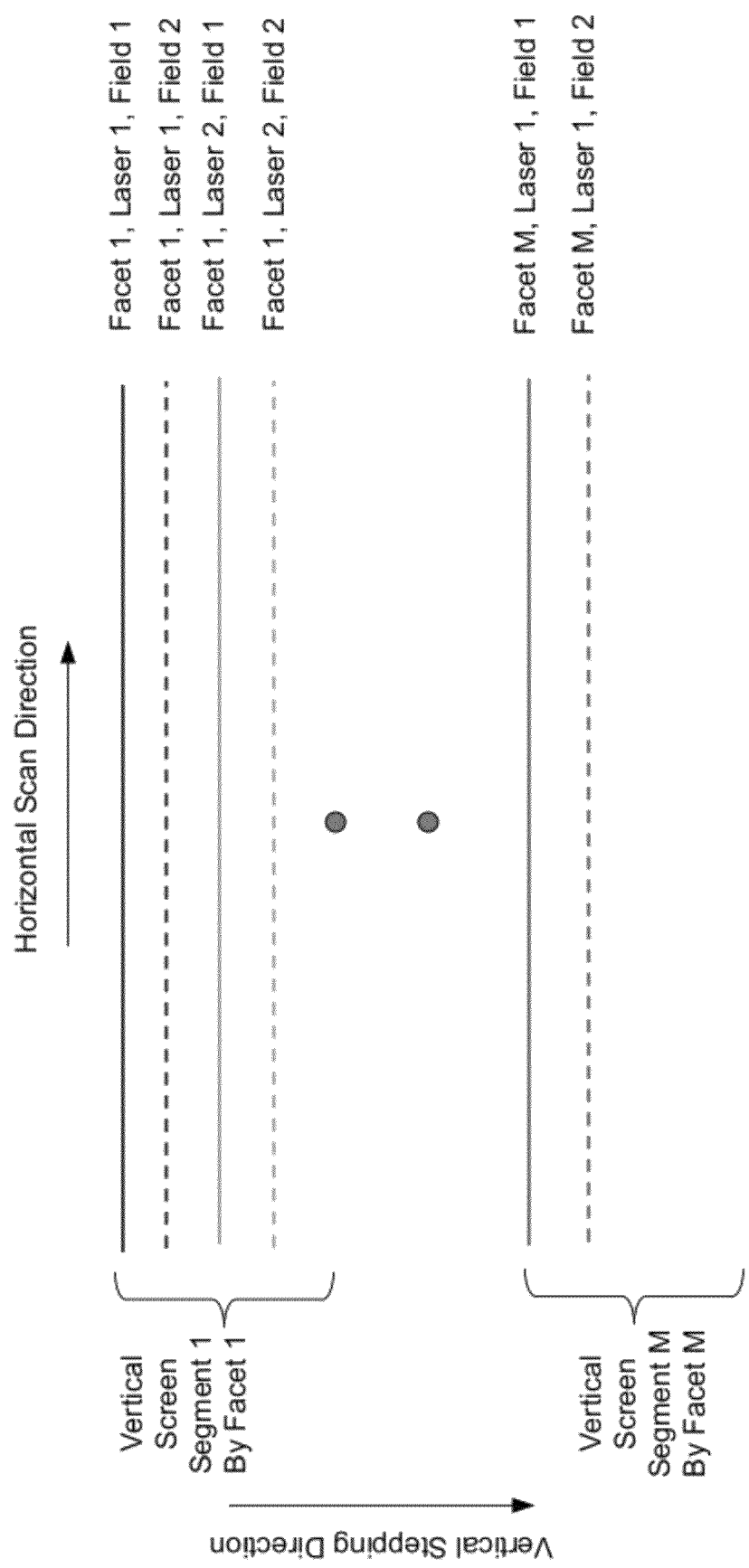

FIG. 11A illustrates one example for interlaced raster scanning for the 2D polygon scanner and the vertical adjuster. Assume there are M facets in the polygon and N optical beams 810. The tilt facet angles of the polygon facets can be designed to vertically divide the screen into M vertical segments to project N parallel horizontal scan lines in each vertical segment. In some implementations, the line spacing between two adjacent lines of the N lines can be set to allow for at least one horizontal scan line and this configuration can be used to support interlaced scanning operations. As the polygon rotates, different facets direct and scan different vertical segments at different times, one at a time. Hence, scanning by different polygon facets in one full rotation of the polygon scanner produces a frame or field of M×N horizontal scanning lines that are made of M sequential sets of N simultaneous horizontal lines. This operation provides both horizontal scanning by each facet and vertical stepping by sequentially changing the polygon facets. Therefore, in one full rotation, the polygon scanner produces one frame of a sequential sets of simultaneous horizontal scanning lines on the screen produced by the polygon facets, respectively and each polygon facet produces one set of simultaneous and horizontal scanning lines.

Notably, during each full rotation, the vertical adjuster is controlled at a fixed orientation. After completion of one full rotation of the polygon and before the next full rotation of the polygon, the vertical adjuster is operated to adjust its orientation to change vertical positions of the optical beams 12 on the screen 801 to spatially interlace horizontal scanning lines in one frame produced in one full rotation of the polygon scanner with horizontal scanning lines of a subsequent frame produced in an immediate subsequent full rotation of the polygon scanner. The vertical adjuster and the polygon scanner are synchronized to each other to perform the above interlaced raster scanning. In the example in FIG. 11A, each full frame image is formed by two frames or fields, Field 1 and Field 2, that are spatially interlaced and the line spacing between two adjacent lines produced by each facet is one horizontal scan line to facilitate the interface operation. Hence, the vertical adjuster in this example is operated to operate at two orientations, one orientation for the Field 1 and another for the Field 2, respectively. In this specific example, the rate for the vertical adjustment of the beam position is only two orientation adjustments per full frame that is produced by two full rotations of the polygon.

Interlacing two image fields is illustrated in the example in FIG. 11A. The spacing between two adjacent lines on the screen produced by reflection of beams from a single polygon facet can be set to (P-1) where P is the number of fields to be interlaced and is an integer not less than 2. Hence, the spacing between the scanning lines on the screen formed by two adjacent laser beams reflected from a one polygon facet can be one horizontal line for interlacing two fields and two horizontal lines for interlacing three fields.

In addition, the vertical adjuster can be used to stack two or more different image fields along the vertical stepping direction to form a full image. The control unit is configured to control the vertical adjuster to scan the optical beams over a first surface segment at a first fixed position of the vertical adjuster in a full rotation of the polygon scanner and to scan the optical beams over a second surface segment that is vertically displaced from and does not overlap with the first surface segment when the vertical adjuster is at a second fixed position in a subsequent full rotation of the polygon scanner.

Figure 11B:
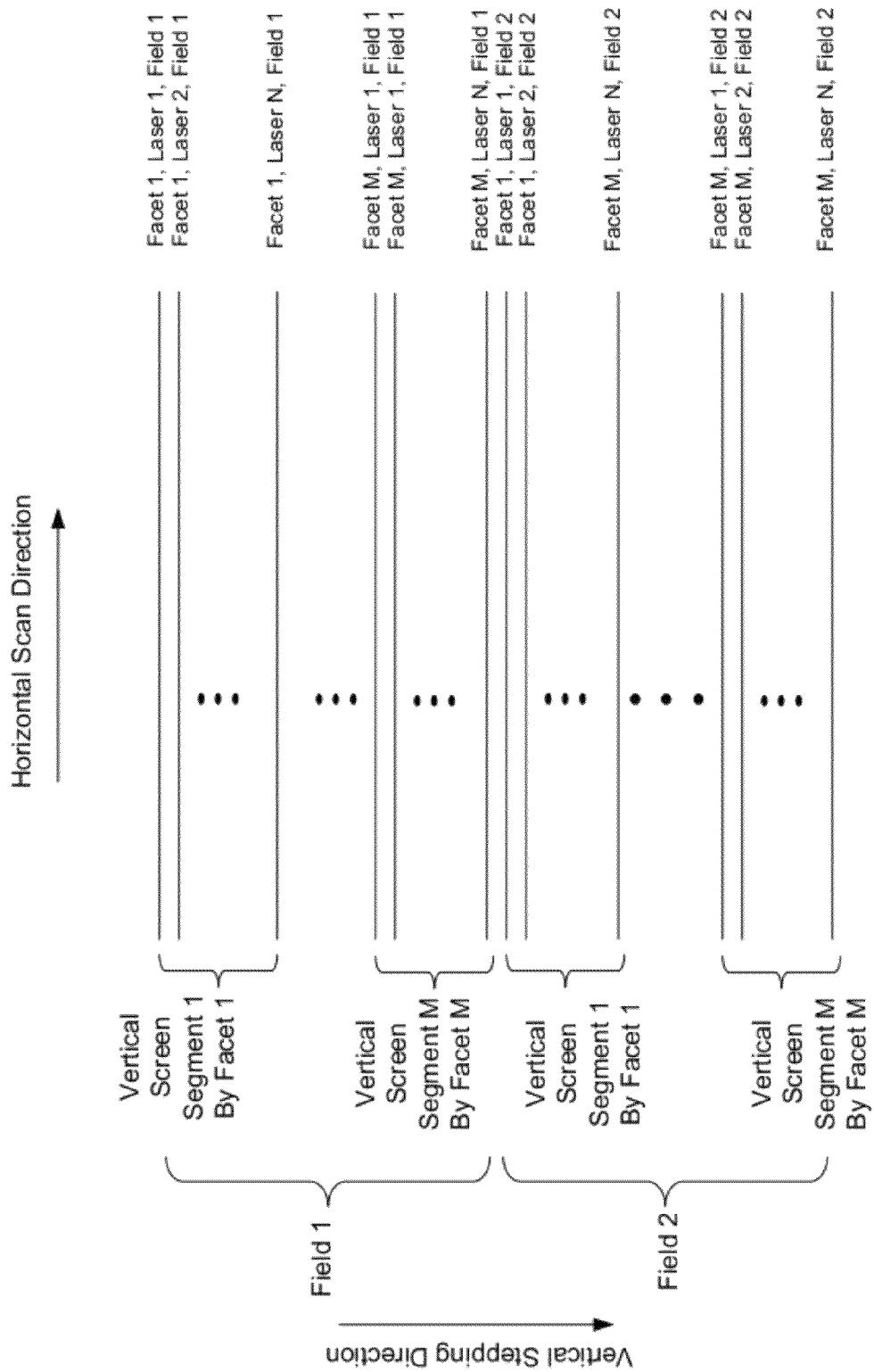

FIG. 11B shows an example of this operation mode of the vertical adjuster. In this example, one full rotation of the polygon produces Field 1 with N×M parallel horizontal lines as shown. Next, the vertical adjuster is operated during a blanking time before the next scanning for the field 2 to move the vertical positions of the beams to produce the filed 2 below the field 1. At the end of this blanking time, the light of the beams is turned on to allow the polygon scanner to project N×M parallel horizontal lines for the filed 2. This operation allows an image of 2×N×M horizontal lines to be formed on the screen.

In the above and other scanning operations, the vertical beam pointing accuracy is controlled within a threshold in order to produce a high quality image. When multiple scanning beams are used to scan multiple screen segments, this accuracy in the vertical beam pointing should be controlled to avoid or minimize an overlap between two adjacent screen segments because such an overlap in the vertical direction can severely degrade the image quality. The vertical beam pointing accuracy should be less than the width of one horizontal line in implementations.

Figure 12:
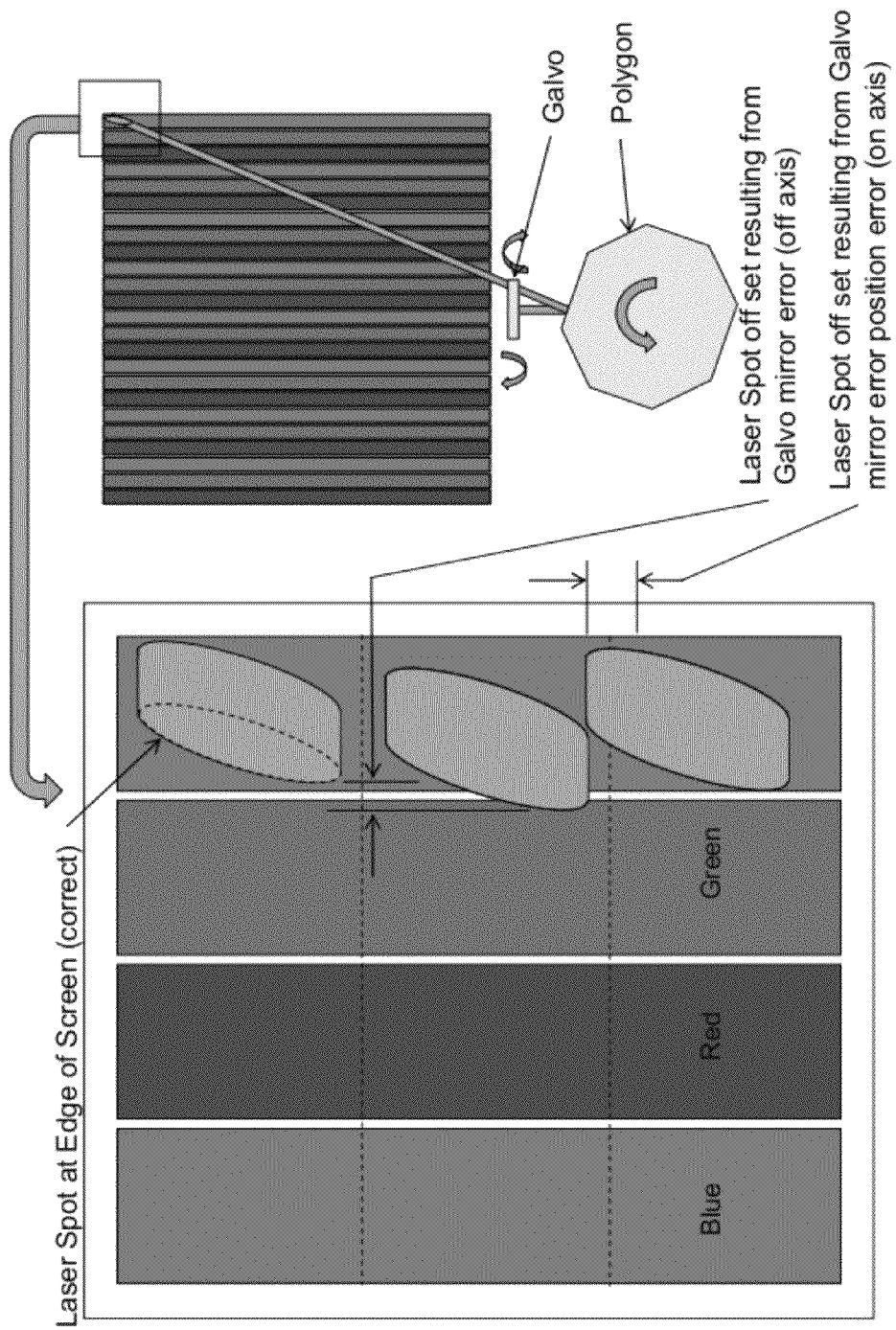

FIG. 12 illustrates two different types of beam positioning errors on the screen 801 along the horizontal and vertical directions caused by the galvo position error where the galvo mirror is based on the flexure actuator in FIGS. 1-4B and the scanning in FIG. 11A. The flexure actuator executes high-speed, small-angle movements between two fixed mirror positions for the interlaced scanning shown in FIG. 11A. This movement should be performed with very little off-axis motion in the flexure actuator to ensure high quality image quality on the screen. A feedback control can be provided to accurately control the movement of the flexure actuator.

In various applications where precise control of orientation and position of an optical beam are desired, a positioning sensor can be provided to measure and monitor the positioning of either the flexure actuator or the mirror that is engaged to and controlled by the flexure actuator. The positioning measurement is conducted in real time during operation of the flexure actuator and is fed into a servo control that uses the positioning measurement to correct any positioning error in the flexure actuator and to ensure the proper positioning of the flexure actuator within the specified positioning precision range. FIGS. 5A and 5B described above provide an example of an optical positioning sensing design for the servo control. Other positioning sensing mechanisms may also be implemented. The following sections provide an example based on capacitor positioning sensing for the flexure actuator described in FIGS. 1-4B.

Figure 13A:
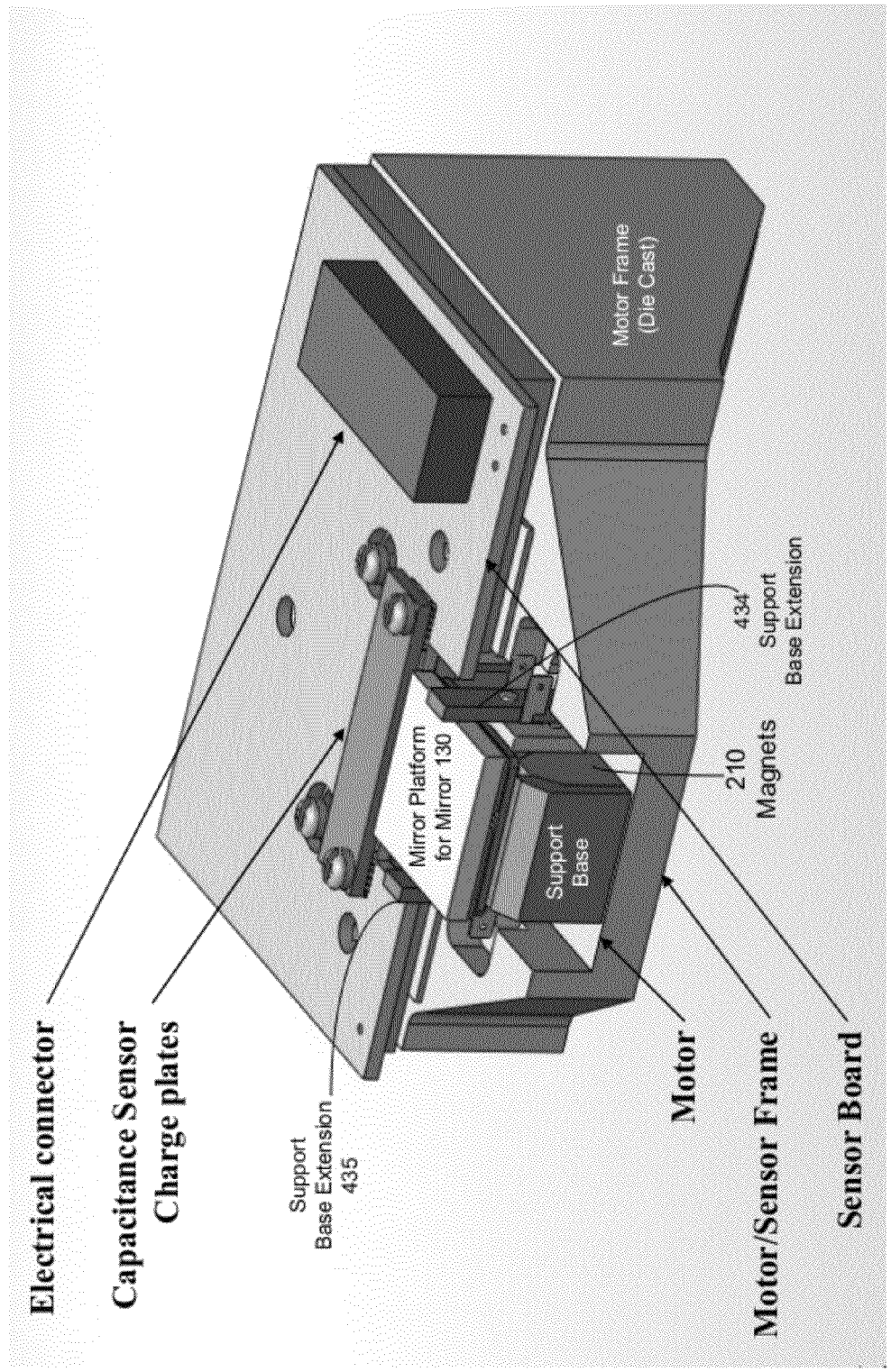
Figure 13B:
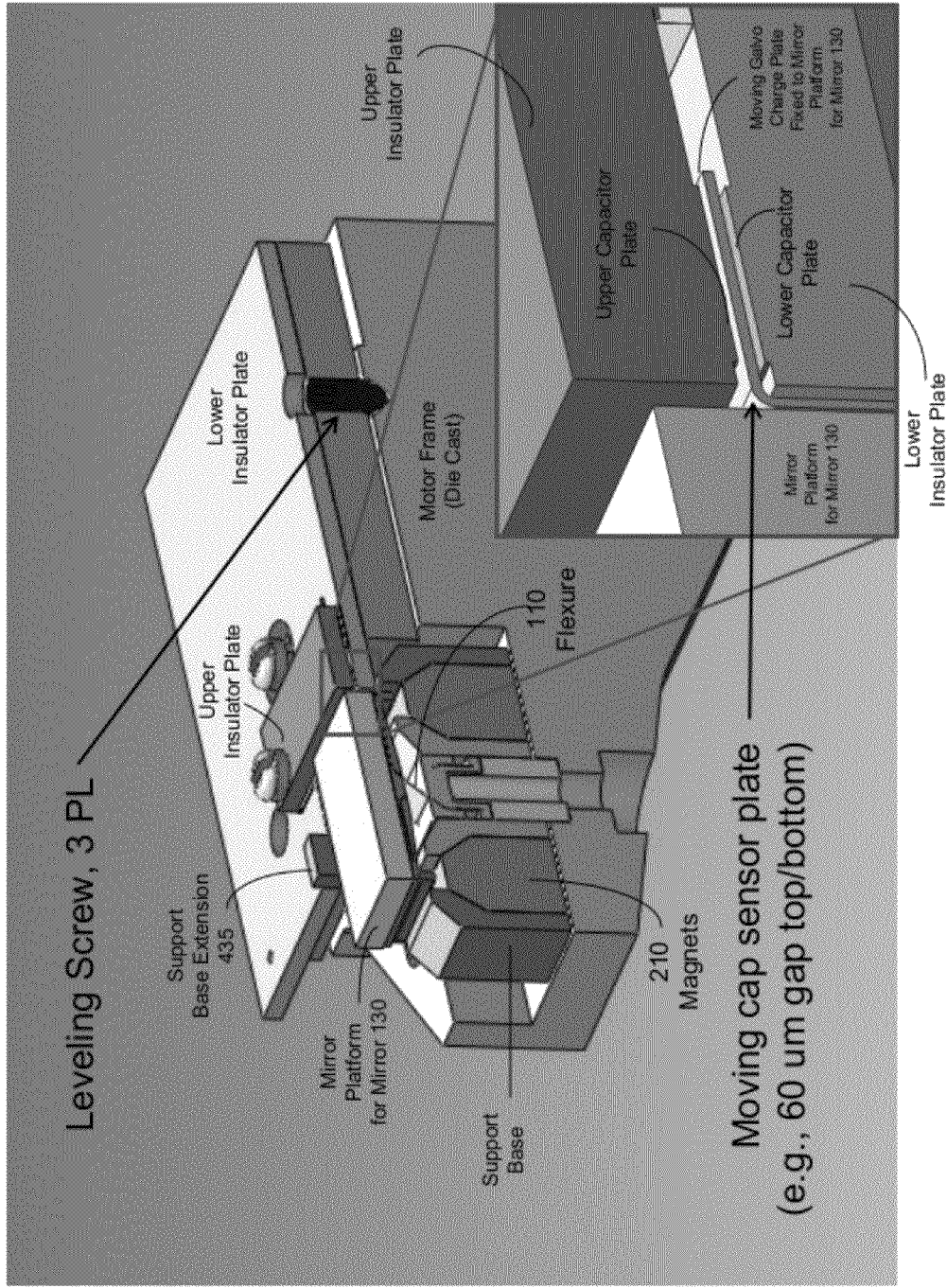

FIGS. 13A, 13B and 13C illustrate the general structure and location of an exemplary capacitor positioning sensing design for the flexure actuator in FIGS. 1-4B. A capacitor position sensor is integrated to the flexure assembly to measure the position of the mirror platform 130 and the measured position is used by the servo control to control the flexure motor by controlling the current in the coil in interaction with the magnets. A movable charge plate, also shown as cap sensor moving plate in other figures, is fixed to the mirror platform 130 and is inserted between the gap between the two capacitor conductive plates as the position sensor. Referring to FIGS. 13A and 13B, upper and lower capacitance sensor charge plates are shown on one side of the mirror platform 130. Upper and lower insulator plates are provided to support upper and lower capacitor conductive plates for the sensing capacitor and the upper and lower capacitance sensor charge plates. FIG. 13C shows the structure from another view to show the exposed movable charge plate that has a bended structure for mounting to the mirror platform 130 and for extending beneath of the mirror platform 130.

Figure 14A:
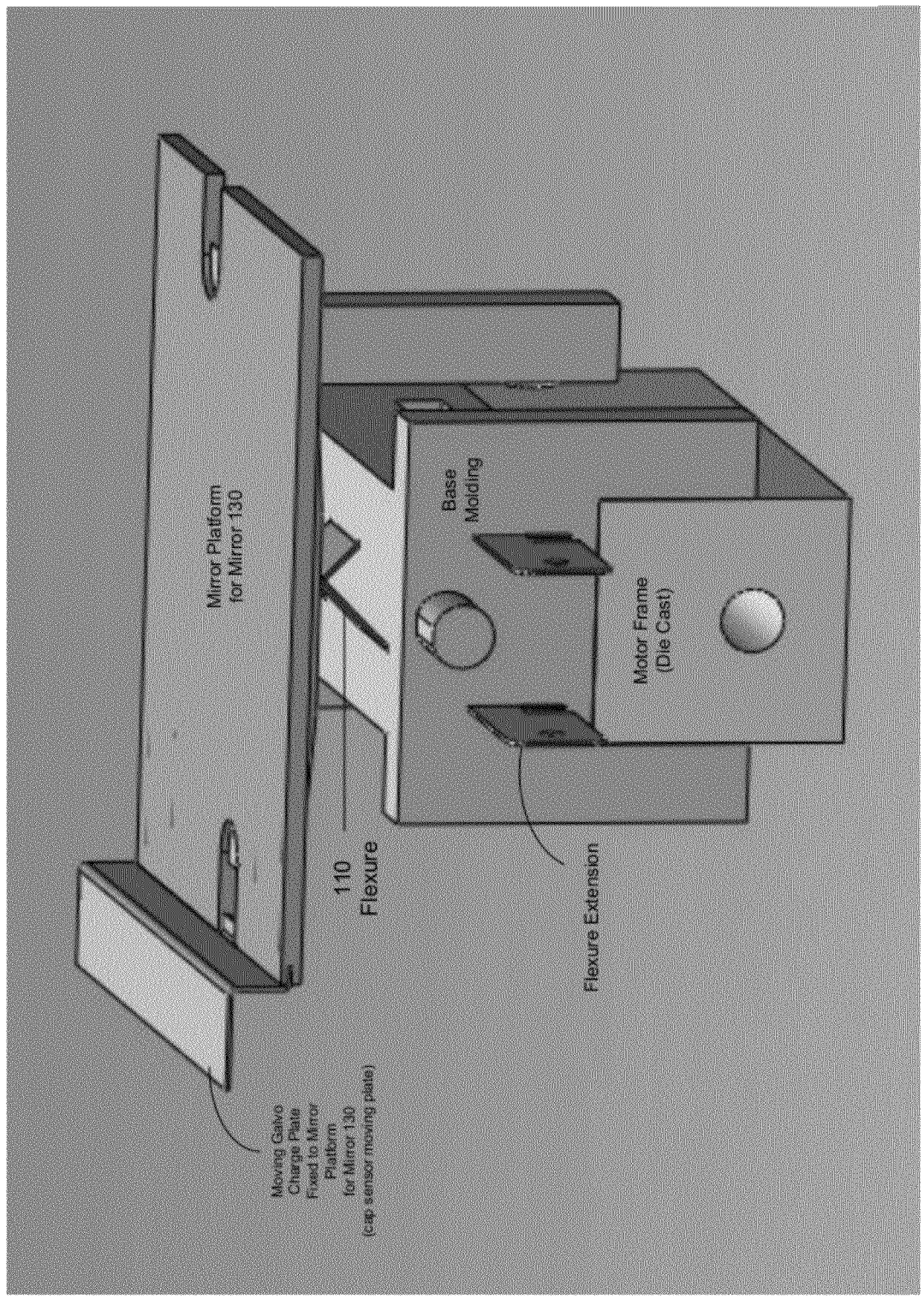
Figure 14B:
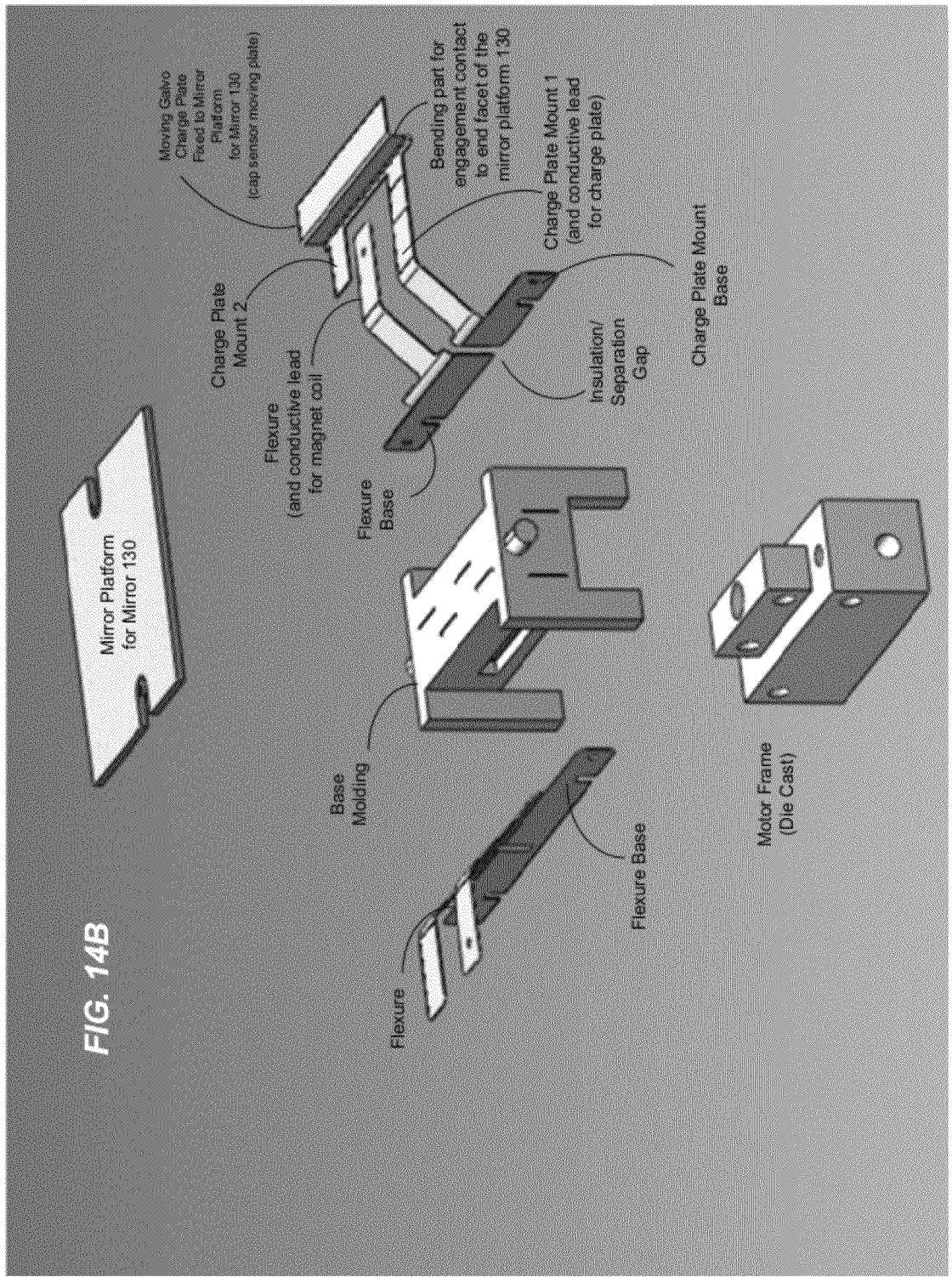

FIGS. 14A and 14B further show various structures associated with the flexure for the flexure actuator and various structures associated the capacitor sensor plate. The mirror platform 130 is mounted on top of the flexure actuator and its position and motion are controlled by the flexure actuator. The flexure has a structure that is different from the flexure shown in FIG. 4B. One of the four flexure extensions in FIG. 4B has been modified as an electrically conductive charge plate mounting arm 1 that connects to the movable charge plate and is parallel to other three remaining flexure extensions of the flexure actuator. A bottom charge plate mount base that extends substantially perpendicular to the charge plate mounting arm 1 is provided and is an extended part of the charge plate mounting arm 1. The bottom charge plate mount base provides the mechanical support and rigidity, and a mounting or anchoring for attaching to the base molding. The bottom charge plate mount base also forms part of the electrical path formed by the charge plate mounting arm 1. In combination with the bottom charge plate mount base, the charge plate mounting arm 1 provides (1) mechanical support and rigidity, (2) a mounting or anchoring for attaching the movable charge plate to the mirror platform 130, and (3) an electrical conductive path to apply a sensor signal to the movable charge plate for the position sensing operation. On the other side of the movable charge plate, a second short charge plate mounting arm 2 is formed as an integrated part of the movable charge plate to provide another mounting and anchoring part to the bottom of the mirror platform 130. Notably, since the other flexure extension that is in parallel to the charge plate mounting arm 1 and is close to the movable charge plate provides the electrical supply path for the current in the coil, electrical isolation is provided between this electrical path and the electrical path for the capacitor sensing operation. As illustrated in FIG. 14B, an insulation or separation gap is formed between the bottom charge plate mount base and the bottom flexure base so that the structure formed by the bottom charge plate mount base, the charge late mounting arm 1, the movable charge plate and the charge plate mount 2 is electrically insulated from the flexure structure. As such, the magnetic coil current that going through the flexure part is insulated from any electrical conductive part for the capacitor sensing structure.

Figure 15:
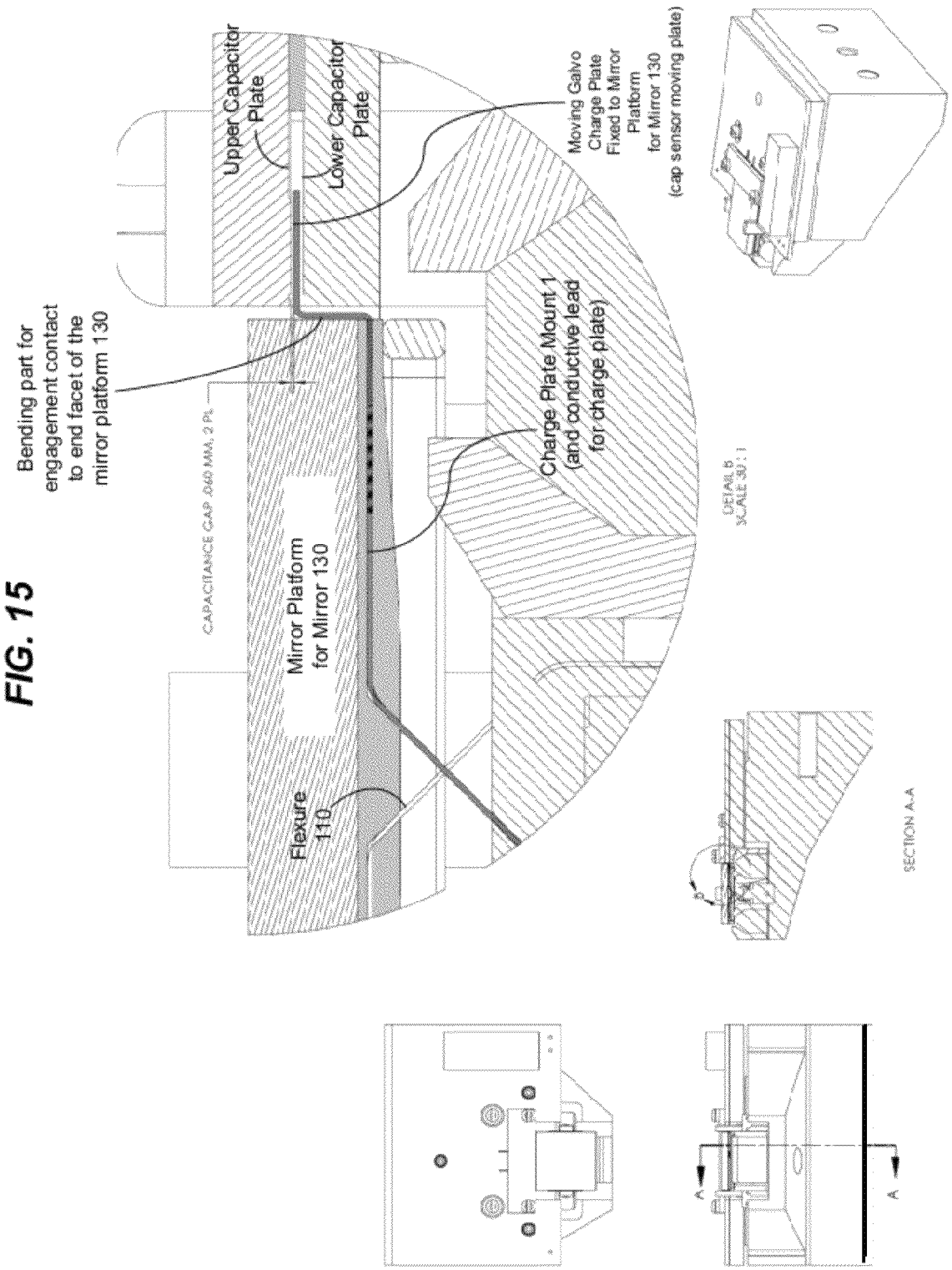

FIG. 15 shows additional structural details of the above design. Also shown in FIG. 15 is a bending part between the charge plate mounting arm 1 and the movable charge plate for engagement contact to end side facet of the mirror platform 130. An adhesive or other engagement means can be used to fix this bending part to the side facet of the mirror platform 130. FIG. 15 also provides various views of different parts of the design.

FIG. 16 shows mounting of upper and lower insulator plates by using orientation adjustment set screws (e.g., A, B and C) to ensure the capacitor plates are parallel to the movable charge plate engaged to the mirror platform 130. The adjustment set screws can be engaged to threaded holes in the underneath motor frame which may a die cast module.

Figure 18:
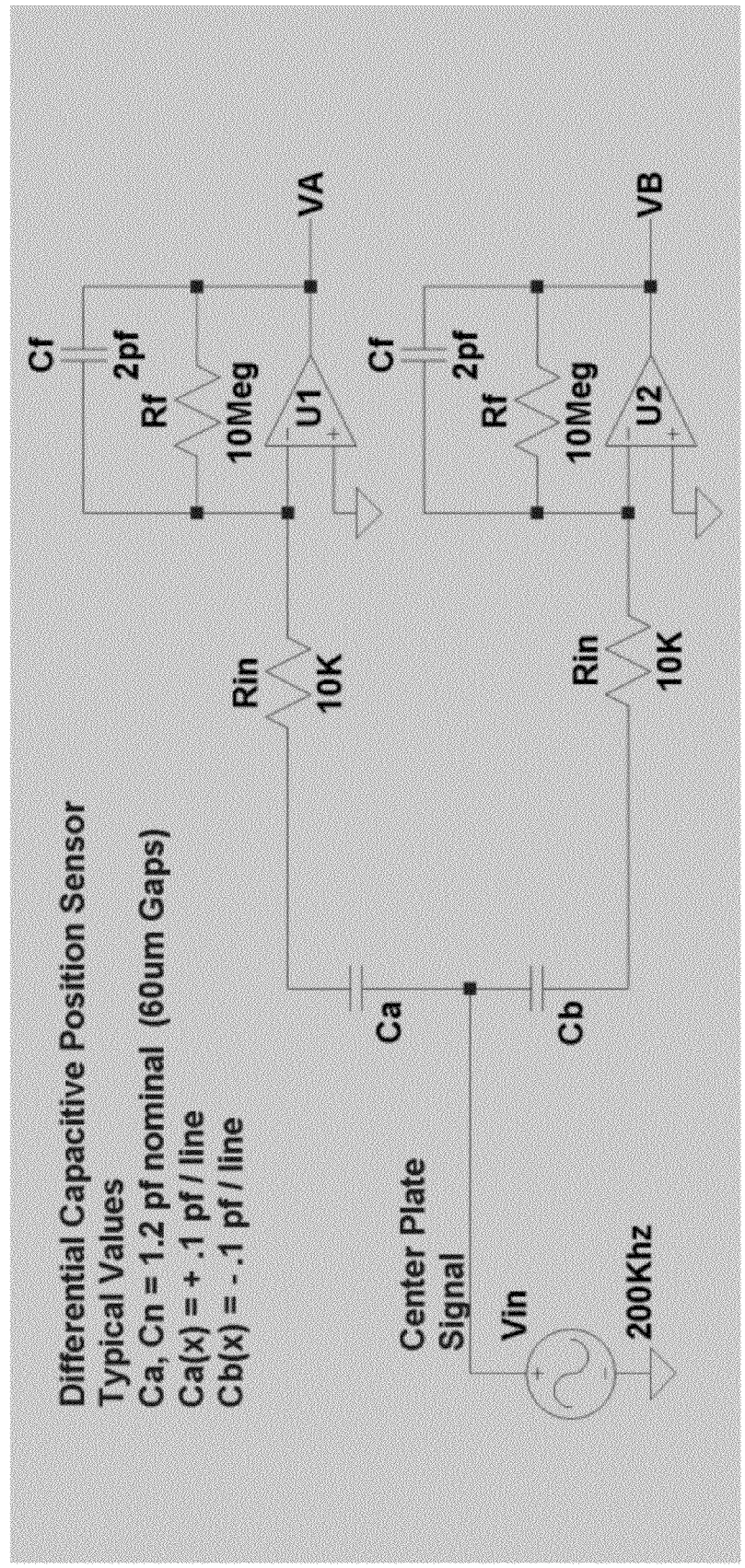
Figure 19:
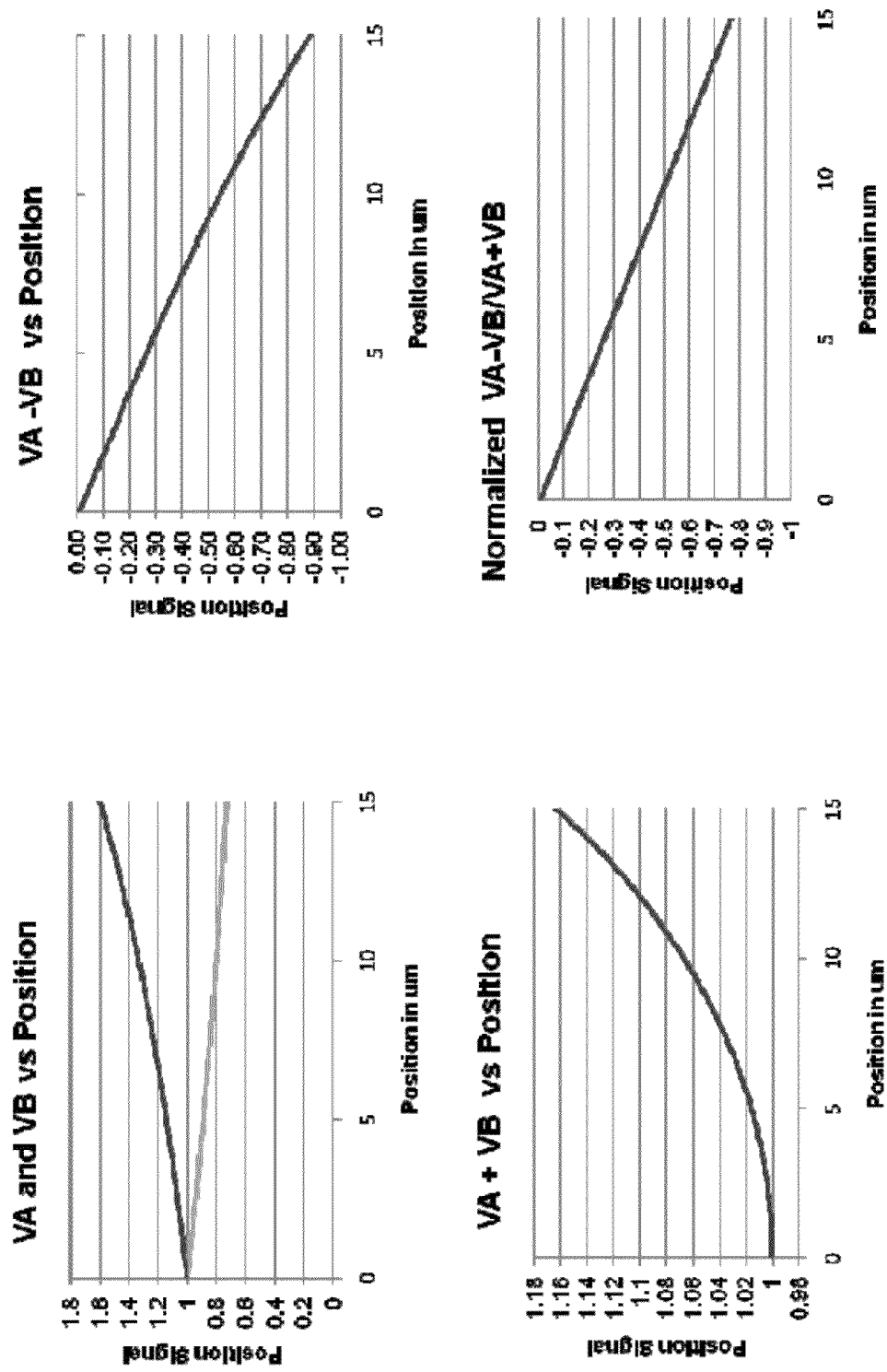

FIGS. 17, 18 and 19 illustrate an example of the circuit design and operation of the position sensing and servo control. The movable charge plate between the upper and lower capacitor plates can change electrical charges on the upper and lower capacitor plates depending on its respective distances to the upper and lower capacitor plates. This structure forms two varying capacitors Ca and Cb as shown in the circuit in FIG. 18. The capacitance values of the capacitors Ca and Cb change with the position of the movable charge plate which depends on the position of the mirror platform 130 driven by the flexure actuator. An oscillation signal source, e.g., a 200 KHz signal source as shown in FIG. 18, is used to generate and apply a sensor signal to the center charge plate. In presence of this sensor signal, two voltage output signals VA and VB are generated and the differential signal between VA and VB is produced as the output of the capacitor sensor. Two charge amplifiers connected to the respective pick up plates convert the input capacitance modulations to the voltage modulated signals VA and VB. Consider the example where the center charge plate in FIG. 18 is driven with a 200 Khz sine wave. Assuming the plate moves about 5 um for 0.06 degree of galvo rotation, the two voltages on the two plates are $VA(x)=Vin*Ca(x)/Cf$ and $VB(x)=Vin*Cb(x)/Cf$ where x is the position parameter. The differential signal between VA and VB is the position signal and the sum signal of VA and VB is used to linearize and normalize the position signal (VA-VB). FIG. 19 shows examples of related signals based on VA and VB in a sample flexure actuator.

Based on the amplitude modulated (VA-VB) signal, the signal can be demodulated either using an analog technique or digital technique.

In the analog demodulation, the modulated position signal VA-VB can be filtered by a bandpass filter to eliminate the low frequency noise and coupling components from the coil drive into the pick up plates. The filtered signal is then demodulated (recover the low frequency envelope signal) by sampling both the positive and negative peaks of VA-VB with separate track hold circuits that hold each value for ¾ of a cycle. The position signal can then be recovered by inverting one of the held signals and then switching between each every half cycle.

Figure 20:
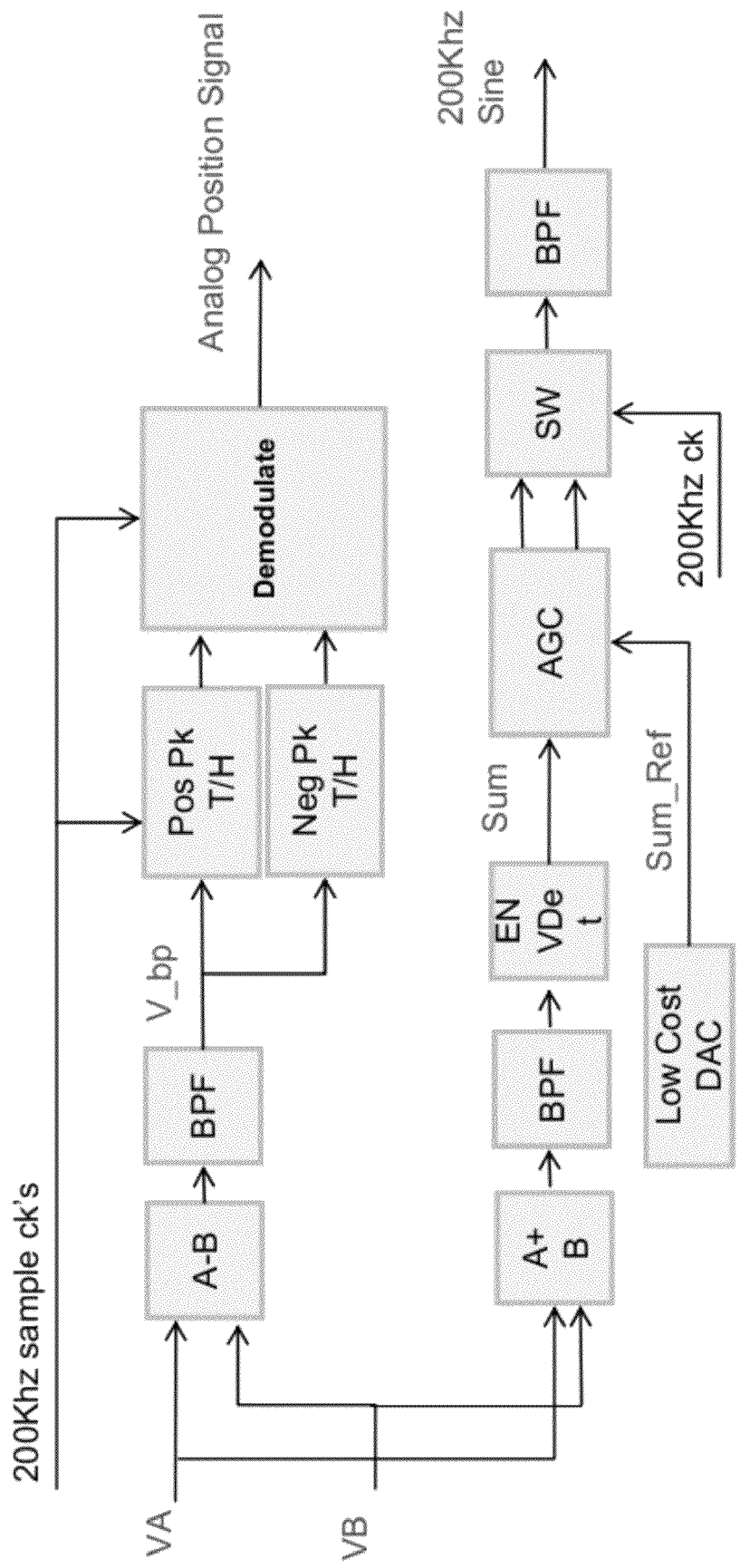

FIG. 20 shows an example circuit for the above operation. The sum signal is used to regulate the 200 Khz Sine Wave magnitude and linearize the Position signal. The AGC forces the Sum signal to equal Sum_Ref by controlling the 200 Khz Sine amplitude and can be disabled allowing the Sum_Ref signal to manually set the Sine amplitude.

Figure 21:
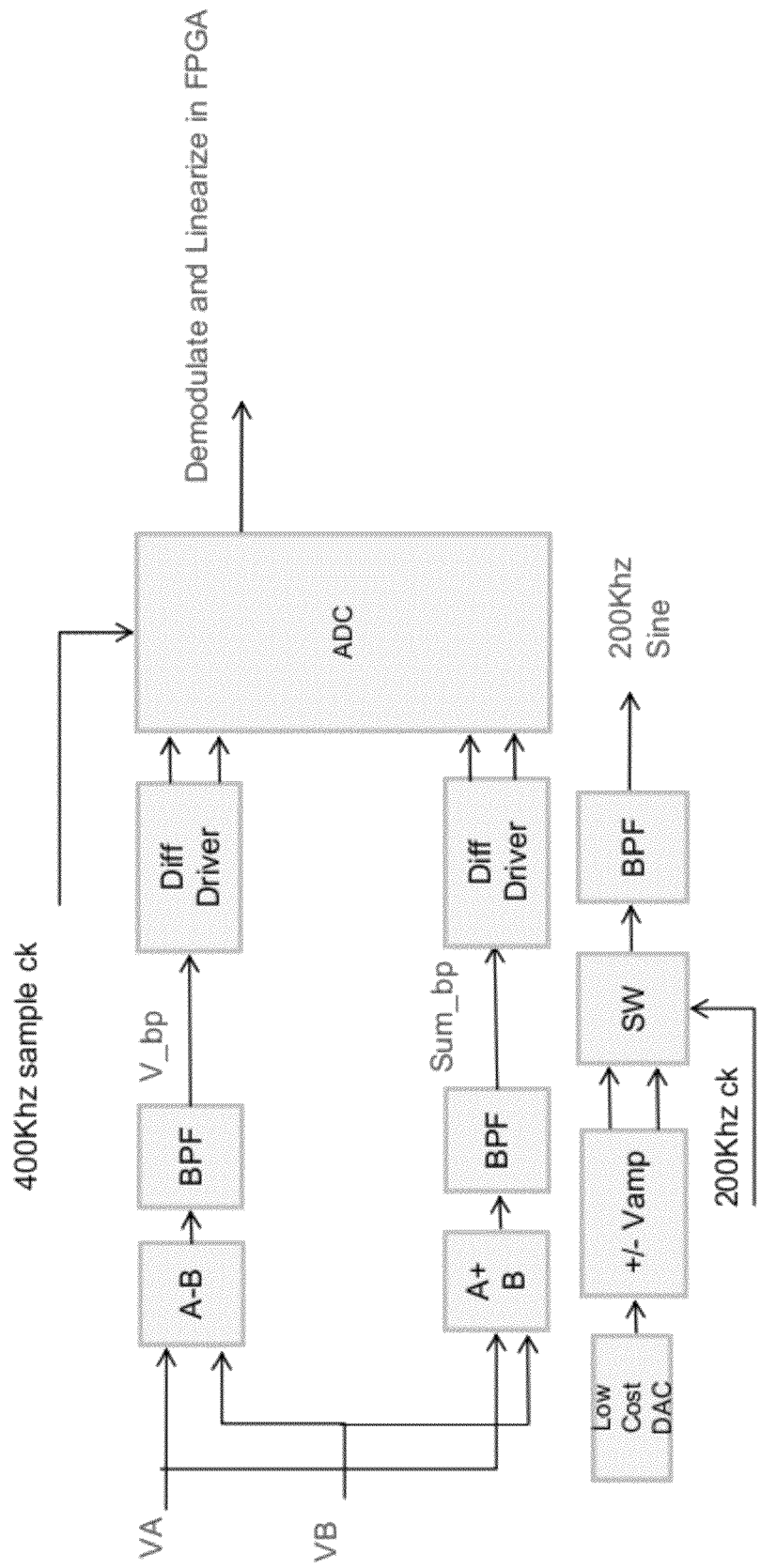
Figure 22:
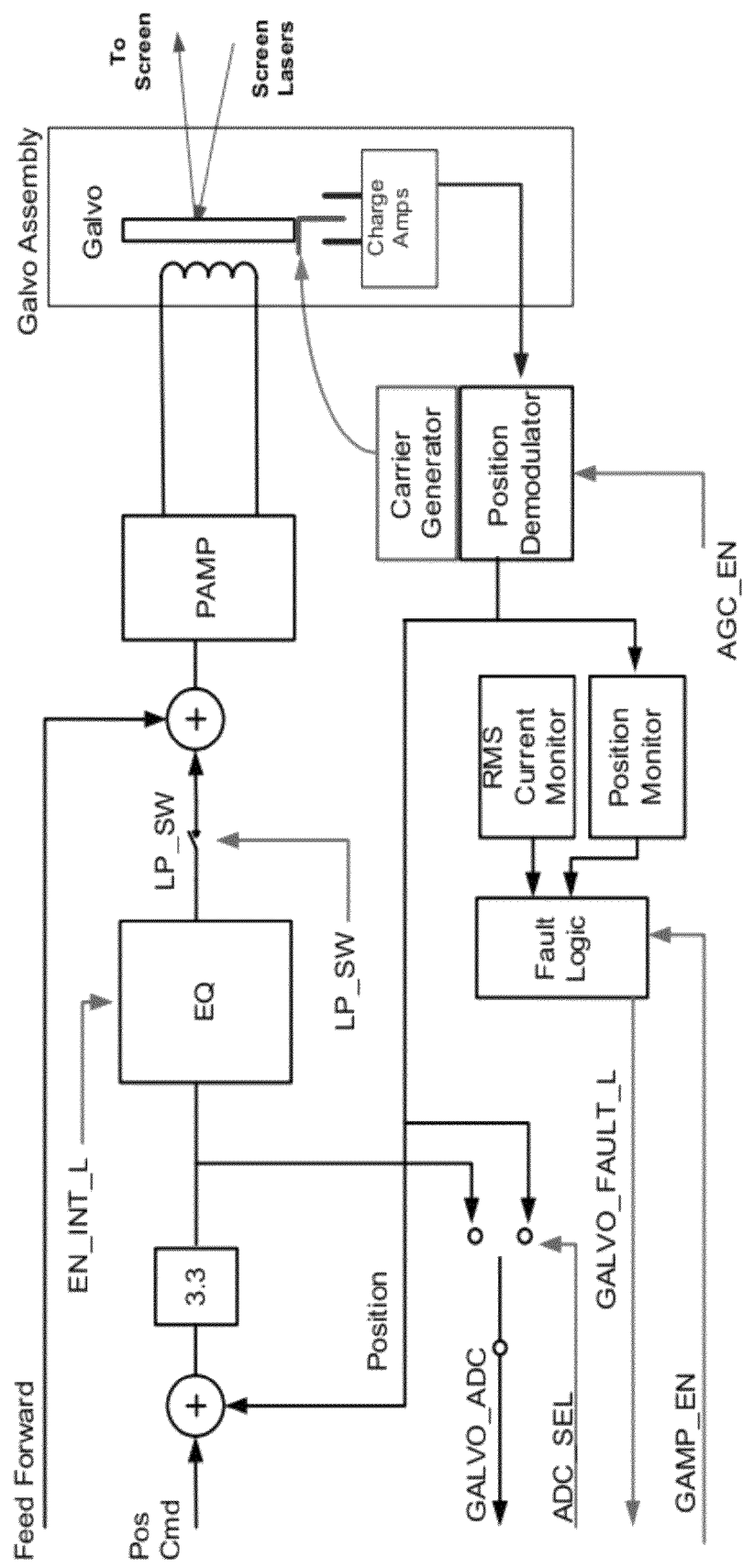

FIG. 21 shows an example of a digital circuit for digital demodulation. In this circuit, the differential signal (VA-VB) is synchronously demodulated by sampling both positive and negative peaks using an ADC converter and then demodulate in the FPGA. In demodulation, the negative peak value is inverted and the inverted value is added to the positive peak value. Using both positive and negative peaks cancels ADC sampling errors and improves signal to noise. Both peaks are averaged to produce a single sample. In the digital circuit in FIG. 21, sampling and sine generation clocks are synchronized. A one-time calibration can be performed to adjust the sampling times vs. the 200 Khz reference clock used to generate the charge plate sine wave. The 200 Khz reference clock is converted to a sine wave using a Band Pass Filter and analog switches FIG. 22 shows an example of a servo circuit based on the output from the capacitor sensor. The galvo assembly is part of a servo control loop. The servo loop uses a capacitive position detector (CPD) to control the angle of the galvo mirror. A Position command (POS CMD) and a Feed Forward waveform are synchronized to perform the closed loop scanning moves. Also shown in the figure are the screen illumination lasers that are positioned on the display screen based on galvo angle. The servo loop can be designed for 0 dB cross-over at 2 KHz or for other operating frequency ranges. The galvo mirror can be operated by the flexure actuator to switch between two galvo positions for the interlaced scanning of multiple laser beams as described above. At each of the two galvo positions, the capacitor sensor and the servo control loop operate to accurately maintain the galvo position based on the position measurements from the capacitor sensor.

Consider, for example, an implementation of the system in FIG. 8A or 8B where the galvo is required to move 0.06 degrees in 240 μs and settle and remain within +/−0.0006 degrees over the next 4 ms of the frame time. The flexure actuator needs to provide a high-speed motion to change the mirror position from the first position A to the second position B in the required time and needs to minimize the residual motion. A trajectory with a sinusoidal motion profile can be used to achieve this operation since the sinusoidal motion profile can be used to provide a low jerk to the mechanical suspension of the present flexure actuator design due to lack of step-like abrupt changes in the motion profile. In various implementations, this feature of the sinusoidal motion profile or other motion profile can be advantageous because the step in the driving current of the coil of the flexure actuator may undesirably cause a step change in the galvo torque and this step change may excite undesired mechanical suspension modes. A sinusoidal trajectory minimizes this step and therefore minimizes the excitation of mechanical resonant modes in the galvo. The sinusoidal motion trajectory can also be desirable since it is well suited for feed forward servo design. In this approach, a pre-determined coil current for performing the move is first generated as part of the feed forward and the servo is used to provide a correction term based on the servo error feedback. The feed forward waveform is generated using the motion trajectory equations of position, velocity, and acceleration vs time, and also the electro-mechanical model of the galvo.

The above described capacitor sensing and the flexure actuator structure can be implemented in various configurations. For example, the described features can be used to construct a small rotation angle position, single axis, external electro magnetic field independent, differential capacitor sensor where the external electro magnetic field is sourced in proximity to the differential capacitor sensor, and where both the electro magnetic field and the differential capacitor sensor are operating with a substantially equal peak to peak voltage. The capacitor drive signal can be an oscillation signal at a frequency of about 200 KHz.

For another example, the structures described above can be used to construct a less than 2% inertia contribution charge plate extension of a differential capacitor sensor feedback system, where the charge plate extension extends beyond the impulse driven platform controlled by the feedback system, where the charge plate extension contributes less than 2% to modes in each axis of motion, where the differential capacitor sensor feedback system includes at least two pickup plates, and where the charge plate extension is bonded by an adhesive or other means to the impulse driven platform until the extension is in proximity to the dual pickup plates. In implementations, the dual pickup plates can be affixed to a common ground and a baseplate. The impulse driven platform is affixed with a mirror for directing light based on the motion of the platform. The at least two pickup plates can be, for example, on opposite sides of the charge plate extension. The charge plate extension can be designed to move in proximity to the differential capacitor sensor feedback system. The impulse driven platform can move in a substantially rotational direction.

For yet another example, the above described features can be used to form an impulse drive platform, where the platform supports a mirror and one or more components of a servo detection system, where the servo detection system is independent of reflections off the mirror. The impulse drive platform is part of a single dimensional movement axis flexure and one or more components of the servo detection system is a charge plate extension. The charge plate extension is the single dimensional movement axis flexure. The impulse drive platform comprises two pairs of flexures where one pair of flexures comprises two distinct and isolated from each other that conduct to different electrical signals.

As an alternative to the above described capacitor sensing in FIGS. 13A through 17, FIGS. 23A, 23B and 23C illustrate an example of a charged grating capacitor sensing design for measuring and controlling the positioning of the mirror platform supported by the flexure actuator 110. In this design, a mirror platform 2310 is provided to include a grating facet 2312 on one side of the platform 2310. Referring to the expanded view in FIGS. 23B and 23C, the grating facet 2312 includes mirror platform grating teeth 2316 which can be arranged to be spaced from one another periodically along the grating facet 2312. Corresponding to the grating facet 2312, a side grating module 2320 is engaged to a support base at the grating facet side of the mirror platform 2310. The side grating module 2310 includes a side grating support structure or plate 2324 that is fixed to the support base at a fixed position, and a side grating top plate 2321 that extends towards the mirror platform 2310 and has a matching grating facet 2322 that faces the grating face 2312 and is separated by a small gap as shown in FIGS. 23A, 23B and 23C. Referring to FIGS. 23B and 23C, the grating facets 2312 and 2322 are structured to be electrically conductive (e.g., formed of a metal electrode) and have periodic grating teeth 2316 and 2326, respectively. The periodic grating teeth 2316 and 2326 may be structured so that the grating teeth 2316 on the mirror platform 2310 match the geometry of the grating teeth 2326 on the side grating top plate 2322, e.g., both have the same period and shape. The periodic grating teeth 2316 on the mirror platform 2310 form one electrically conductive piece or are electrically connected to one another, and similarly, the grating teeth 2326 on the side grating top plate 2322 form another electrically conductive piece or are electrically connected to one another. The small gap between the grating facets 2312 and 2322 is sufficiently small to allow the grating facets 2312 and 2322 to electrically coupled to form a capacitor therebetween. The capacitance between the opposing periodic grating teeth 2316 and 2326 is measured or monitored for positioning sensing. The relative positions of the opposing periodic grating teeth 2316 and 2326 on the two opposing grating facets 2312 and 2322 can be changed due to motion of the mirror platform 2310 relative to the side grating top plate 2321 to cause changes in the capacitance of this capacitor. With the position of the side grating top plate 2322 being fixed in position, as the mirror platform 2310 changes its position due to the movement of the conductor coil 120 engaged to the flexure actuator 110 (FIG. 1), the actual capacitance of this capacitor can be measured and monitored to determine the relative position of the mirror platform 2310 to the side grating top late 2321 along the grating direction.

In the example shown in FIGS. 23A, 23B and 23C, each of the opposing grating facets 2312 and 2322 is shown to have a straight or flat base profile on which the periodic grating teeth 2316 or 2326 is formed. In some implementations, each of the opposing grating facets 2312 and 2322 may be configured to have a curved base profile to allow for motion of the grating facet 2312 with respect to the grating facet 2322 without contacting each other during the motion.

The period of the grating teeth 2316 and 2326 can be in various configurations. For example, the period of the grating teeth 2316 and 2326 may be set to approximately equal to a slightly greater than the largest displacement between the opposing grating facets 2312 and 2322 caused by the motion of the mirror platform 2310. The grating period may also be made much greater than the displacement but this may lead a weaker output signal and thus the signal to noise ratio of the output signal may be reduced. For another example, the period of the grating teeth 2316 and 2326 may be set to be much smaller than the displacement between the opposing grating facets 2312 and 2322 caused by the motion of the mirror platform 2310 so that the displacement covers multiple grating periods. This configuration can be used to increase the magnitude of the signal and may improve the signal to noise ratio. The output electronics can be designed to process the multiple cycles of the output signal during one swing of the mirror platform 2310.

More specifically, FIG. 23B shows a position where a grating tooth 2316 on the mirror platform 2310 aligns with another grating tooth 2326 on the side grating top plate 2322 to have a stronger coupling between the two grating facets 2312 and 2322 than other positions such as the position shown in FIG. 23C where a grating tooth 2316 on the mirror platform 2310 aligns with a position between two adjacent grating teeth 2326 on the side grating top plate 2322. A grating capacitive sensor circuit is coupled to the two grating facets 2312 and 2322 to supply a desired electrical bias and to measure the capacitance to provide the feedback control to the flexure actuator control.

The above described flexure actuator designs provide precision beam position control and can be combined with the feedback control as described in the examples of scanning beam systems in FIGS. 8A, 8B and 8C to allow for improved beam positioning accuracy on the screen for high quality display systems and other applications. In some implementations of the above described flexure actuator designs, fast responses of the actuators can be achieved with reduced jitter.

While this patent document contains many specifics, these should not be construed as limitations on the scope of an invention or of what may be claimed, but rather as descriptions of features specific to particular embodiments of the invention. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. Variations and enhancements of the disclosed implementations and other implementations can be made based on what is described and illustrated in this document.

What is claimed is:
1. An actuator device, comprising:
a support base;

a first flexure including a first flexure base that is fixed to the support base and first flexure extensions that flex with respect to the fixed first flexure base and the support base;

a second flexure including a second flexure base that is fixed to the support base and one or more second flexure extensions that flex with respect to the fixed second flexure base and the support base, the second flexure positioned and oriented to have the first and second flexure extensions to cross;

an actuator engaged to distal ends of the first and second flexure extensions to rotate around a single rotation axis as the first and second flexure extensions deform when the actuator is actuated to rotate, the actuator being electrically coupled to the first flexure extension to receive an electrical actuator drive signal through the first flexure extension to cause the actuator to rotate and to maintain at a position;

a mirror engaged to the actuator to move with the actuator and stay with the actuator;

a conductive sensing plate fixed to the mirror or the actuator;

a capacitor sensing device fixed in position relative to the support base and including two electrically conductive plates separated from each other to form a gap into which the conductive sensing plate is partially inserted;

a third flexure comprising a third flexure base that is fixed to the support base and a third flexure extension connected to the third flexure base at one end and connected to the conductive sensing plate on the other end, the third flexure forming an electrically conductive path that is electrically isolated from the first flexure and the electrical actuator drive signal therein;

a position sensing circuit coupled to the third flexure to apply an electrical sensor signal which is conducted to the conductive sensing plate, the position sensing circuit including a processing circuit that receives first and second electrical signals from the electrically conductive plates and produces a position signal from the received first and second electrical signals indicating a relative position of the conductive sensing plate relative one of the electrically conductive plates; and a servo control circuit coupled to the position sensing circuit and the actuator, the servo control circuit operable to produce a servo control signal based on the position signal and operable to control the actuator based on the position signal.

2. The device as in claim 1, wherein:
the actuator includes a conductor coil engaged to distal ends of the first and second flexure extensions to rotate around the single rotation axis as the first and second flexure extensions deform when an electrical current in the conductor coil electromagnetically interacts with a magnetic field present at the conductor coil.

3. The device as in claim 2, wherein:
the support base includes a magnetic module that produces the magnetic field at the conductor coil.

4. The device as in claim 2, comprising:
a magnet module fixed in location relative to the support base to produce the magnetic field at the conductor coil to electromagnetically cause the conductor coil to rotate around the single rotation axis in response to the electrical current in the conductor coil.

5. The device as in claim 4, wherein:
the magnet module includes a Halbach magnet array that includes permanent magnets and a groove embedded in the permanent magnets to produce a high magnetic flux density, and one side of the conductor coil is placed inside the groove.

6. The device as in claim 4, wherein:
the magnet module includes two Halbach magnet arrays that are symmetrically located at two opposite sides of the conductor coil.

7. The device as in claim 2, wherein:
the first and second flexures are electrically conductive and are electrically connected to the conductor coil to supply the electrical current to the conductor coil.

8. The device as in claim 1, wherein:
the support base includes a first protruded extension and a second protruded extension that are located at opposite sides of the actuator, the first protruded extension is spaced from a first side surface of the actuator and the second protruded extension is spaced from a second side surface of the actuator, and
wherein the device includes a first damper pad located between and in contact with the first protruded extension and the first side surface to dampen a motion of the actuator relative to the support base, and a second damper pad located between and in contact with the second protruded extension and the second side surface to dampen the motion of the actuator relative to the support base.

9. The device as in claim 1, comprising:
a damper pad located between and in contact with the support base and a surface of the actuator to dampen a motion of the actuator relative to the support base.

10. The device as in claim 1, comprising:
a mirror engaged to the actuator to rotate with the actuator around the single rotation axis and to redirect light incident to the mirror as the actuator rotates.

11. The device as in claim 1, wherein:
the first flexure extensions are spaced along a direction parallel to the single rotation axis.

12. The device as in claim 11, wherein:
the distal ends of the first flexure extensions that are engaged to the actuator are located above the second flexure base; and
the distal ends of the second flexure extensions that are engaged to the actuator are located above the first flexure base.

13. A method for operating an actuator, comprising:
engaging an actuator to a support base by first and second flexures fixed to the support base, wherein the first flexure includes a first flexure base that is fixed to the support base and first flexure extensions that flex with respect to the fixed first flexure base and the support base, and the second flexure includes a second flexure base that is fixed to the support base and one or more second flexure extensions that flex with respect to the fixed second flexure base and the support base, the second flexure positioned and oriented to have the first and second flexure extensions to cross, and wherein the actuator is engaged to distal ends of the first and second flexure extensions to rotate around a single rotation axis as the first and second flexure extensions deform when the actuator is actuated to rotate;

electrically coupling the actuator being to the first flexure extension to receive an electrical actuator drive signal through the first flexure extension to cause the actuator to rotate and to maintain at a position;

providing a conductive sensing plate that is fixed in position relative to the actuator and to move with the actuator;

providing a capacitor sensing device, that is fixed in position relative to the support base and includes two electrically conductive plates separated from each other to form a gap, to insert part of the conductive sensing plate into the gap;

using a third flexure, that includes a third flexure base that is fixed to the support base and a third flexure extension connected to the third flexure base at one end and connected to the conductive sensing plate on the other end, to form an electrically conductive path that is electrically isolated from the first flexure and the electrical actuator drive signal therein;

applying an electrical sensor signal which is conducted to the conductive sensing plate;

using first and second electrical signals from the electrically conductive plates to produce a position signal indicating a relative position of the conductive sensing plate relative one of the electrically conductive plates; and operating a servo control circuit coupled to the position sensing circuit and the actuator to produce a servo control signal based on the position signal and to control the actuator based on the position signal.

14. The method as in claim 13, comprising:

engaging a mirror to the actuator to direct light reflected off the mirror; and controlling the actuator to control a direction of the light reflected off the mirror.

15. A display device, comprising:

a light source to produce one or more laser beams that are modulated to carry images to be displayed; and a beam scanning module that scans the one or more laser beams along two different directions on a screen surface to display the images and includes a first scanner to scan the one or more laser beams along a first direction and a second scanner to scan the one or more laser beams along a second, different direction, wherein the first scanner comprises a mirror and a flexure actuator device that engages the mirror to rotate the mirror for scanning the one or more laser beams along the first direction, and wherein the flexure actuator device includes:

a support base;

a first flexure including a first flexure base that is fixed to the support base and first flexure extensions that flex with respect to the fixed first flexure base and the support base;

a second flexure including a second flexure base that is fixed to the support base and one or more second flexure extensions that flex with respect to the fixed second flexure base and the support base, the second flexure positioned and oriented to have the first and second flexure extensions to cross;

an actuator engaged to distal ends of the first and second flexure extensions to rotate around a single rotation axis as the first and second flexure extensions deform when the actuator is actuated to rotate, the actuator being electrically coupled to the first flexure extension to receive an electrical actuator drive signal through the first flexure extension to cause the actuator to rotate and to maintain at a position;

a mirror engaged to the actuator to move with the actuator and stay with the actuator;

a conductive sensing plate fixed to the mirror or the actuator;

a capacitor sensing device fixed in position relative to the support base and including two electrically conductive plates separated from each other to form a gap into which the conductive sensing plate is partially inserted;

a third flexure including a third flexure base that is fixed to the support base and a third flexure extension connected to the third flexure base at one end and connected to the conductive sensing plate on the other end, the third flexure forming an electrically conductive path that is electrically isolated from the first flexure and the electrical actuator drive signal therein;

a position sensing circuit coupled to the third flexure to apply an electrical sensor signal which is conducted to the conductive sensing plate, the position sensing circuit including a processing circuit that receives first and second electrical signals from the electrically conductive plates and produces a position signal from the received first and second electrical signals indicating a relative position of the conductive sensing plate relative one of the electrically conductive plates; and a servo control circuit coupled to the position sensing circuit and the actuator, the servo control circuit operable to produce a servo control signal based on the position signal and operable to control the actuator based on the position signal.

16. The device as in claim 15, wherein the screen include light-emitting materials that absorb light in the one or more laser beams from the light source to emit light which produces the images.

* * * * *